(12) United States Patent
Witelson et al.

(10) Patent No.: US 10,731,370 B2
(45) Date of Patent: *Aug. 4, 2020

(54) POOL CLEANING ROBOT AND A METHOD FOR SENSING A CLEANLINESS OF A FILTERING UNIT

(71) Applicant: Maytronics Ltd., Kibbutz Yizrael (IL)

(72) Inventors: Shay Witelson, Kibbutz Yizrael (IL); Gil Hillel, Kibbutz Yizrael (IL)

(73) Assignee: MAYTRONICS LTD., Kibbutz Yizrael (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/375,012

(22) Filed: Apr. 4, 2019

(65) Prior Publication Data

US 2019/0271169 A1  Sep. 5, 2019

Related U.S. Application Data

(63) Continuation of application No. 15/231,431, filed on Aug. 8, 2016, now Pat. No. 10,260,248, which is a continuation-in-part of application No. 15/089,606, filed on Apr. 4, 2016, now Pat. No. 10,533,335, which is a continuation-in-part of application No. 14/501,098, filed on Sep. 30, 2014, now Pat. No. 9,920,545.

(60) Provisional application No. 61/890,260, filed on Oct. 13, 2013.

(51) Int. Cl.
*E04H 4/16* (2006.01)

(52) U.S. Cl.
CPC ................... *E04H 4/1654* (2013.01)

(58) Field of Classification Search
CPC .................................... E04H 4/1654
USPC ............... 210/167.16, 167.17, 143; 15/1.7
See application file for complete search history.

(56) References Cited

U.S. PATENT DOCUMENTS

| | | | | |
|---|---|---|---|---|
| 8,661,595 | B2* | 3/2014 | Bernini | E04H 4/1654 15/1.7 |
| 2009/0057238 | A1* | 3/2009 | Garti | E04H 4/1654 210/739 |
| 2010/0307545 | A1* | 12/2010 | Osaka | B08B 3/024 134/198 |
| 2013/0104321 | A1* | 5/2013 | Michelon | E04H 4/1654 15/1.7 |
| 2013/0152970 | A1* | 6/2013 | Porat | E04H 4/1654 134/18 |
| 2015/0101135 | A1* | 4/2015 | Witelson | H02J 7/02 15/1.7 |
| 2015/0292222 | A1* | 10/2015 | Tamar | H02J 7/025 210/767 |

FOREIGN PATENT DOCUMENTS

FR    2742351 A1 *  6/1977

* cited by examiner

*Primary Examiner* — Fred Prince
(74) *Attorney, Agent, or Firm* — Reches Patent

(57) ABSTRACT

A pool cleaning robot that may include a filtering unit for filtering water that passes through the pool cleaning robot; and a sensor for sensing a cleanliness of the filtering unit while the pool cleaning robot is submerged in water; wherein the sensor is a pressure sensor for sensing a pressure of fluid within the pool cleaning robot or an image sensor for imaging the filtering unit.

20 Claims, 50 Drawing Sheets

Pulling a cable that may be coupled to the pool cleaning robot during an exit process during which the pool cleaning robot exits the pool. 210

Controlling, by a controller of a system and/or the pool cleaning robot, the pulling of the cable based on an estimated or an actual amount of the fluid within the pool cleaning robot 220

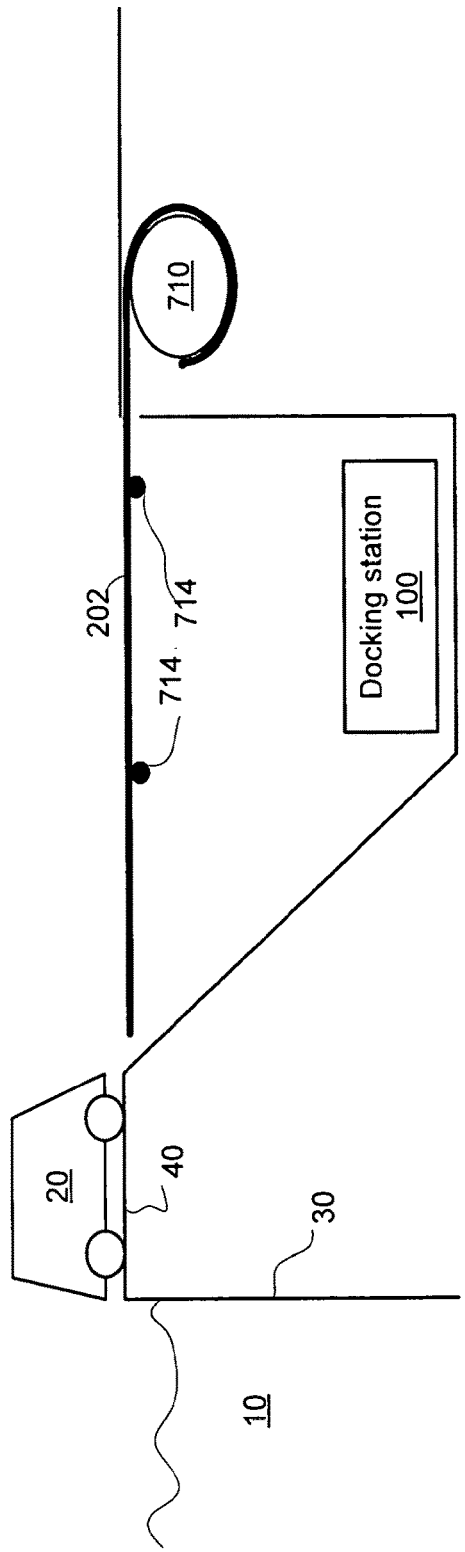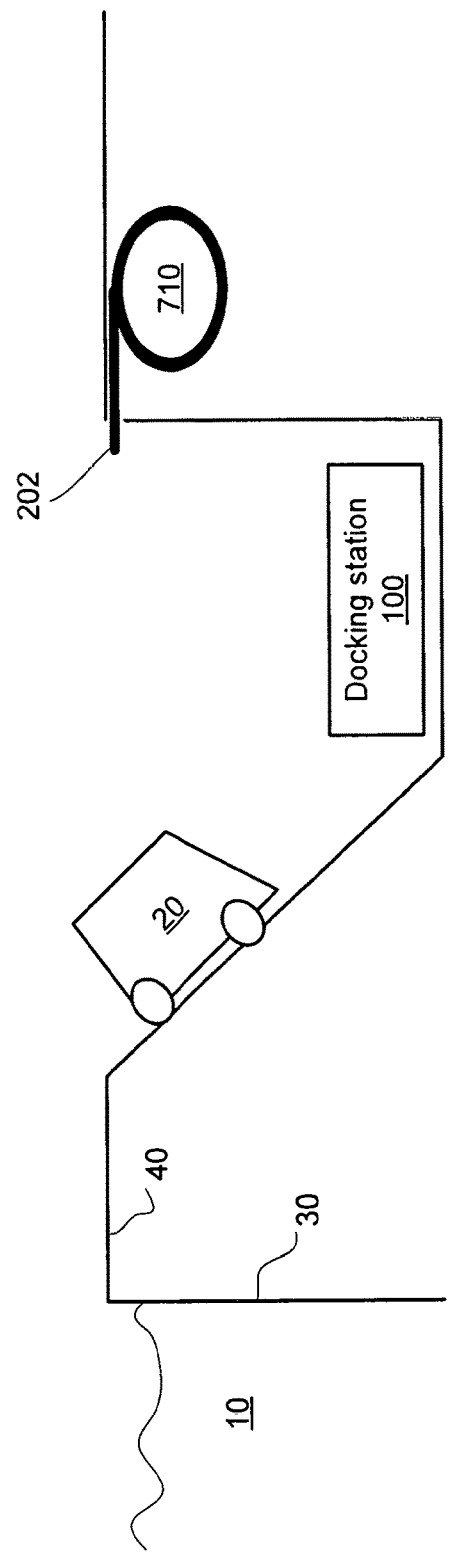
FIG. 41A
FIG. 41B

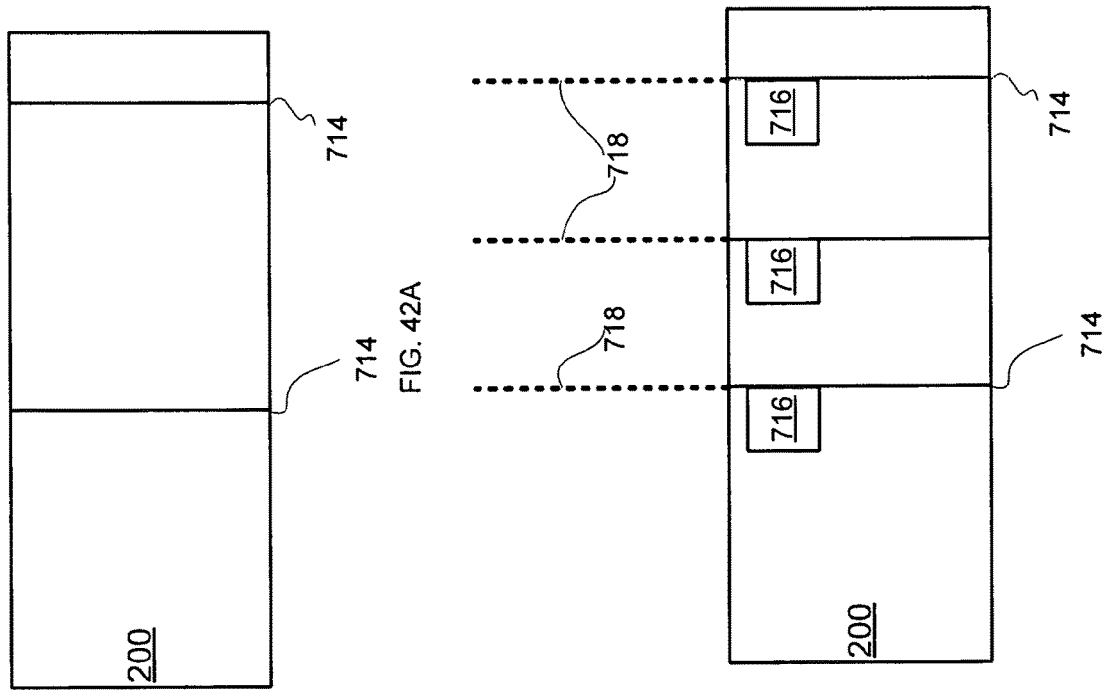

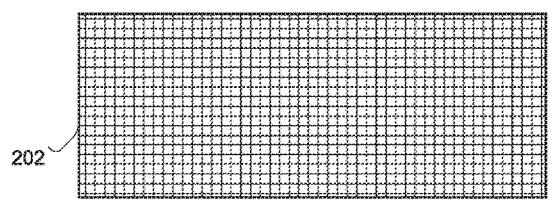
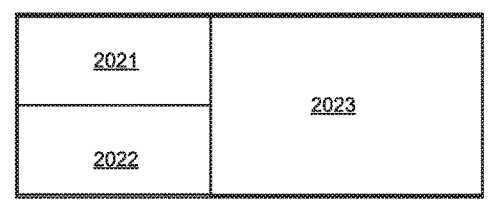
FIG. 43A
FIG. 43B
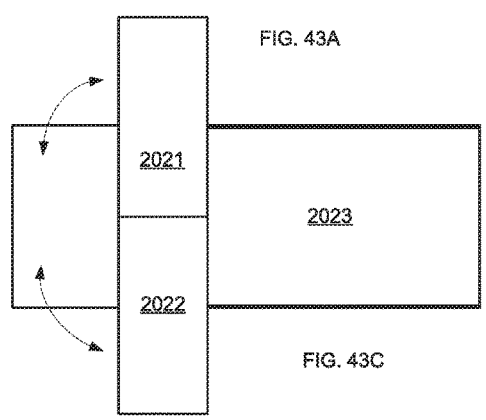
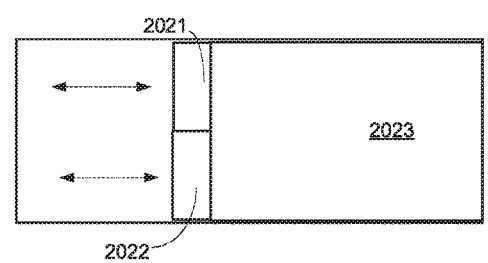
FIG. 43C
FIG. 43D

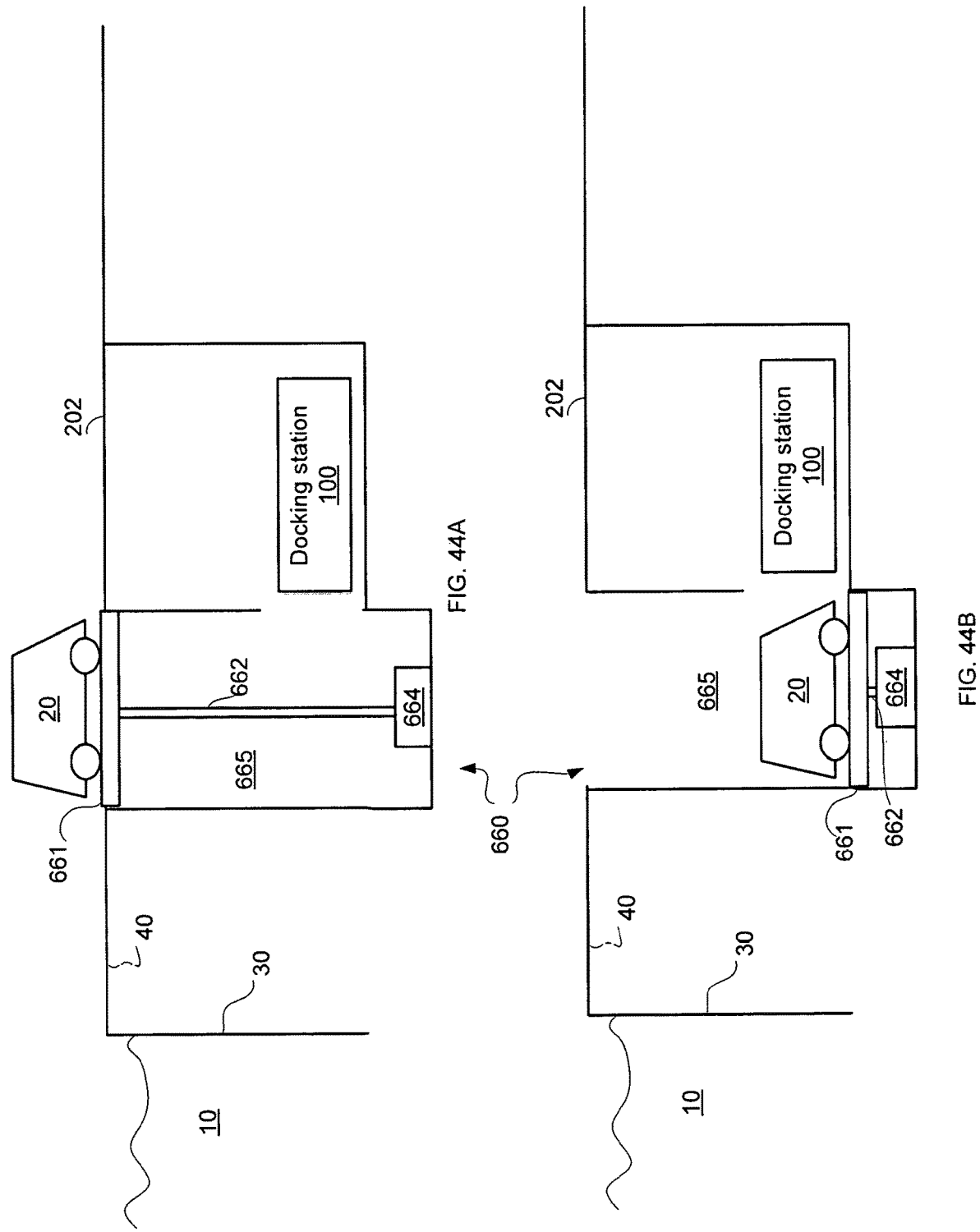

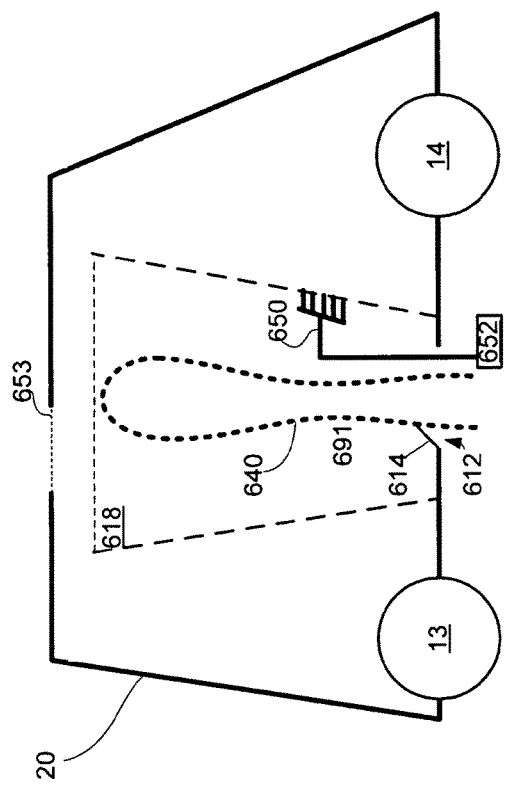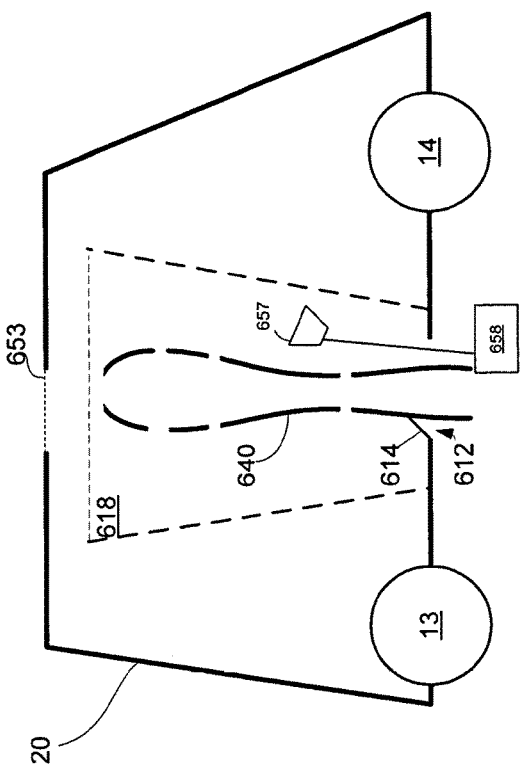

Moving the pool cleaning robot at a path that leads outside the pool. 5010

Forcing, during at least a part of the moving of the pool cleaning robot, water to exit the pool cleaning robot by rotating an impeller of the pool cleaning robot. 5020

5000

FIG. 50

POOL CLEANING ROBOT AND A METHOD FOR SENSING A CLEANLINESS OF A FILTERING UNIT

RELATED APPLICATIONS

This application is a continuation of U.S. patent application Ser. No. 15/231,431 filing date Aug. 8, 2016 which in turn is a continuation in part of U.S. patent application Ser. No. 15/089,606 filing date Apr. 4, 2016 which claims priority from U.S. provisional patent Ser. No. 62/146,335 filing date Apr. 12, 2015 and is a continuation in part of U.S. patent application Ser. No. 14/501,098 filing date Sep. 30, 2014 which claims priority from U.S. provisional patent Ser. No. 61/890,260 filing date Oct. 13, 2013, all being incorporated herein by reference.

BACKGROUND

There is a growing need to reduce the human intervention in cleaning pools. It is well known that pool cleaning robot usually need to be immerged or retrieved manually from or into a swimming pool. Retrieval may be performed by grabbing and pulling the electrical cable followed by grabbing and pulling of a handle or retrieving by means of a special pike with a hook Immersion can be performed by grabbing and lifting the cleaner by its handle and immersing it manually into the water. These are time consuming operations, difficult at times. The intention of this invention is to specifically facilitate the retrieval of the pool cleaning robot making it an automatic function. It may also generally intend to improve on the basic rule which govern the method of pool cleaning robot handling by introducing an almost fully automatic and autonomous pool cleaning robot which seldom needs any manual intervention.

SUMMARY

There may be provided a pool cleaning robot and a method as illustrated in the specification and/or the drawings.

Any combination of any steps of any method mentioned above can be provided.

Any combination of any elements of any pool cleaning robot mentioned above may be provided.

Any combination of any elements of any system mentioned above may be provided.

Any combination of any steps of any method mentioned in the specification can be provided.

Any combination of any elements of any pool cleaning robot mentioned in the specification may be provided.

Any combination of any elements of any system mentioned in the specification may be provided.

Any combination of any steps of any method mentioned in any of the drawings can be provided.

Any combination of any elements of any pool cleaning robot mentioned in any of the drawings may be provided.

Any combination of any elements of any system mentioned in any of the drawings may be provided.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which

FIG. 27 illustrates a method according to at least one embodiment of the invention;

FIGS. 28 and 50 illustrate methods according to at least one embodiment of the invention;

FIGS. 41A and 41B illustrate water of a pool, a sidewall of a pool, an external surface of the pool, space, docking station, pool cleaning robot and cover according to at least one embodiment of the invention;

FIGS. 42A and 42B, illustrate a space and supporting elements according to various embodiment of the invention;

FIGS. 43A, 43B, 43C and 43D illustrate various covers according to various embodiment of the invention;

FIGS. 44A and 44B illustrate water of a pool, a sidewall of a pool, an external surface of the pool, space, docking station, pool cleaning robot and cover according to at least one embodiment of the invention;

FIG. 46A illustrates a pool cleaning robot, a cleaning element and an additional cleaning element according to at least one embodiment of the invention;

FIG. 46B illustrates a pool cleaning robot, a cleaning element and sensor according to at least one embodiment of the invention;

DESCRIPTION OF THE PREFERRED EMBODIMENTS

Figure 1:
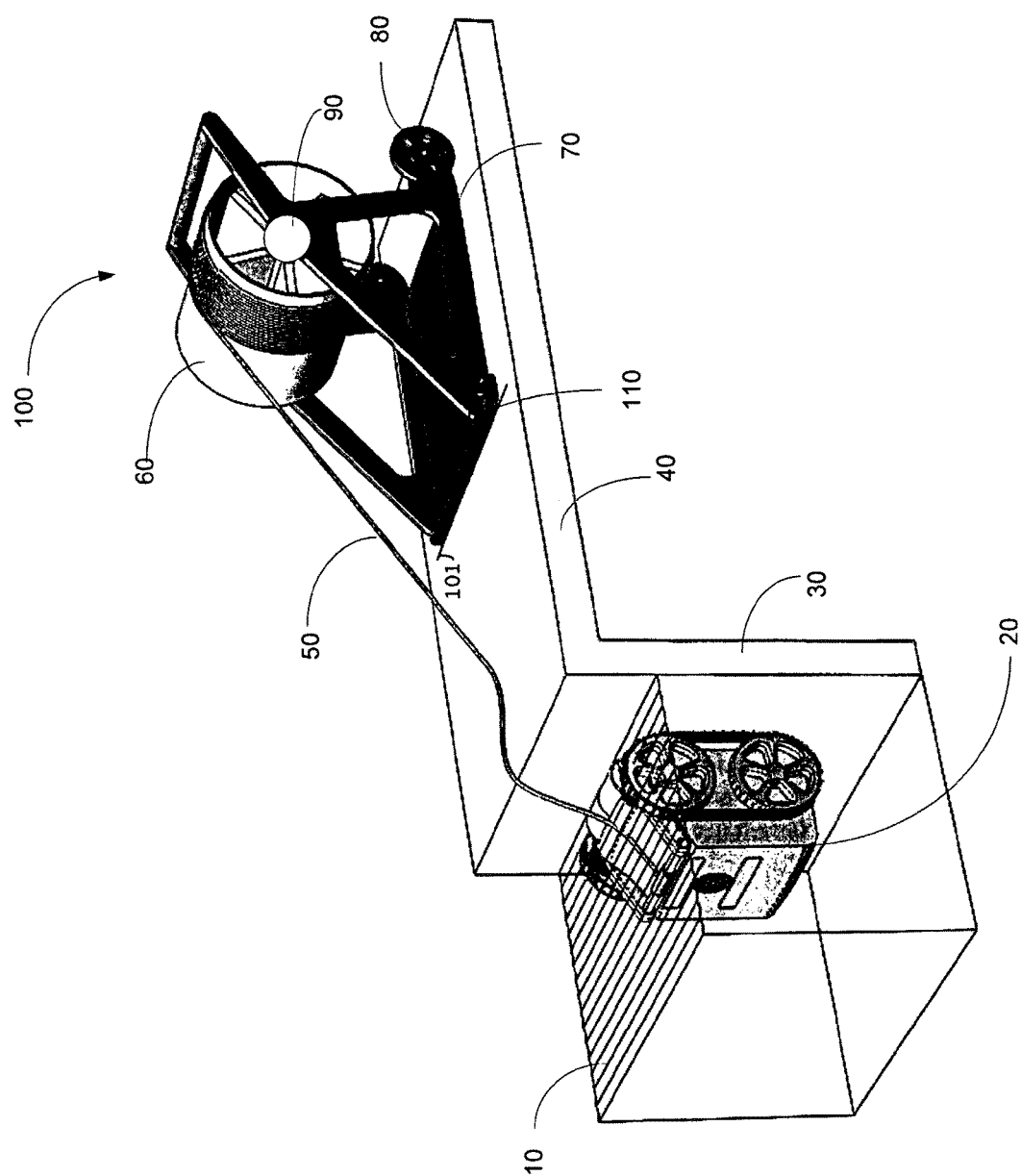
FIG. 1 illustrates a pool cleaning robot that climbs on a sidewall of the pool while propagating towards a docking station and a cable that connects the pool cleaning robot to a docking station is loose according to at least one embodiment of the invention.

In the following description specific details are set forth in order to provide a thorough understanding of the invention.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Any reference in the specification to a system should be applied mutatis mutandis to a method that can be executed by the system.

Because the illustrated at least one embodiment of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method.

According to at least one embodiment of the invention there may be provided a pool cleaning robot for cleaning a pool, the pool cleaning robot may include a housing; a first interfacing element may be configured to interface between the pool cleaning robot and a bottom of a pool while the pool cleaning robot cleans the bottom of the pool; and one or more second interfacing elements that may be configured to reduce a friction between the pool and the pool cleaning robot during at least a portion of an exit process in which the pool cleaning robot exits the pool.

The one or more second interfacing elements may include at least one radially symmetrical rotating element.

A given second interface of the one or more second interfacing elements may be configured not to contact the bottom of the pool when the pool cleaning robot cleans the bottom of the pool.

The one or more second interfacing elements may include at least one radially symmetrical rotating element.

The one or more second interfacing elements may include a radially symmetrical rotating element that may be coupled to an intermediate element, wherein the intermediate element may be configured to move between a first position to a second position thereby changing a spatial relationship between the housing and the radially symmetrical rotating element. The movement of the intermediate element can include a movement to any intermediate position between the first and second positions.

The pool cleaning robot may include an interface manipulator that may be configured to move the intermediate element between the first position to the second position.

The intermediate element may be rotatably coupled to the housing.

The intermediate element may be rotatably coupled to the housing by a handle that has an axis of rotation that virtually intersects with a front upper part of the housing.

The radially symmetrical rotating element may be configured to protrude from the intermediate element during the portion of the exit process.

The pool cleaning robot according to claim wherein the radially symmetrical rotating element may be configured not to protrude from the intermediate element when the pool cleaning robot cleans the pool.

The pool cleaning robot may include a sensor and a controller; wherein the controller may be configured to trigger a movement of the intermediate element between the first position and the second position based on signals sent from the sensor.

The sensor may be a height sensor.

The sensor may be an out of water sensor that may be configured to sense that at least a portion of the pool cleaning robot exits a water of the pool.

The pool cleaning robot may include a controller; wherein the controller may be configured to trigger a movement of the intermediate element between the first position and the second position based on signals sent from an external system that may include an external sensor that may be configured to assist in an extraction of the pool cleaning robot from the pool.

An intermediate element may be mechanically coupled to an external system that may be configured to assist in an extraction of the pool cleaning robot from the pool; wherein the pool cleaning robot may be configured to perform the movement of the intermediate element between the first position and the second position based on a command from the system.

An intermediate element may be mechanically coupled to the external system via a cable; and wherein the movement of the intermediate element between the first position and the second position may be responsive to a tension of the cable.

The pool cleaning robot may include a motor that may be configured to assist in propelling the pool cleaning robot during the exit process.

Figure 49:
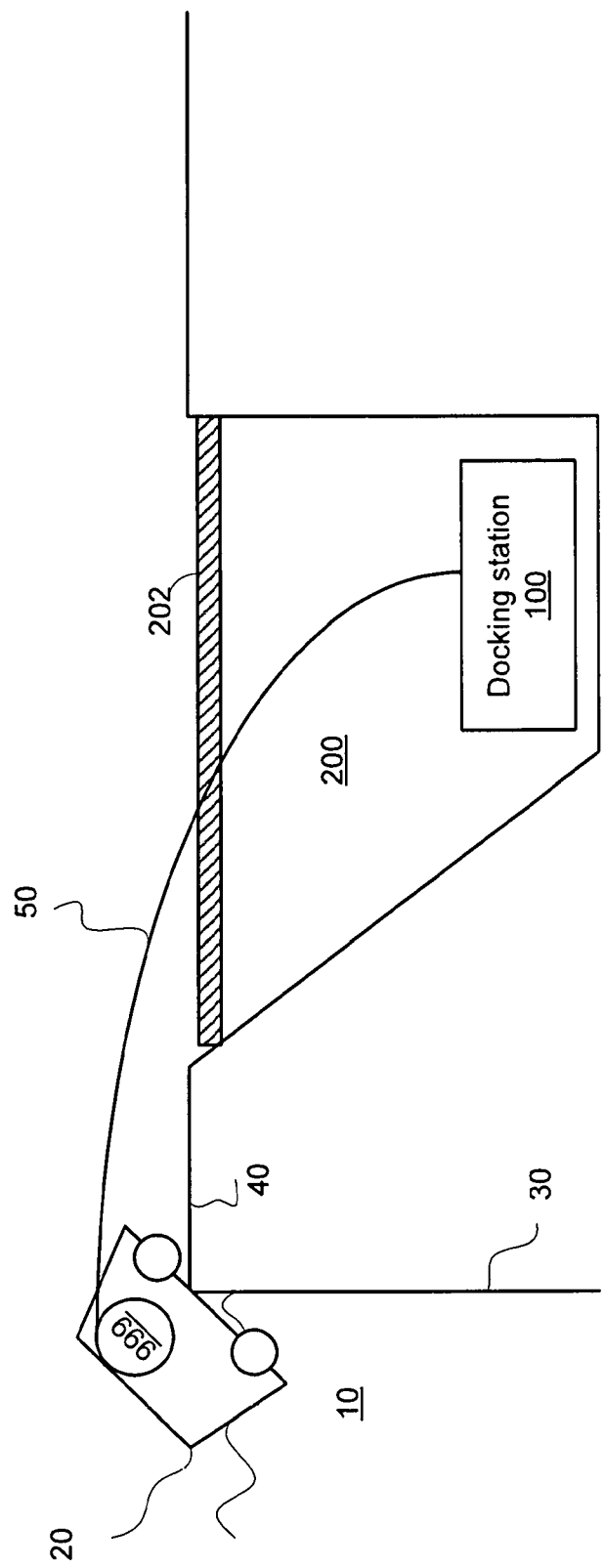
FIG. 49 illustrates water of a pool, a sidewall of a pool, an external surface of the pool, space, docking station, pool cleaning robot and cover according to at least one embodiment of the invention.

The pool cleaning robot may include a winch (see for example winch 999 of FIG. 49) that may be configured to propel the pool cleaning robot during the exit process.

The pool cleaning robot may include at least one aperture for draining fluid from the pool cleaning robot during the exit process; and a controller that may be configured to affect a timing of at least one phase of the exit process based upon an estimated or an actual amount of the fluid within the pool cleaning robot.

The pool cleaning robot may include at least one aperture for draining fluid from the pool cleaning robot during the exit process; and a controller that may be configured to affect a timing of at least one phase of the exit process based upon an aggregate weight of the pool cleaning robot and the fluid within the pool cleaning robot.

The pool cleaning robot may include a controller that may be configured to prevent a center of the pool cleaning robot from passing an edge of the pool before an amount of fluid that resides in the pool cleaning robot may be below a predefined threshold.

The one or more second interfacing elements may be configured to reduce a friction between an edge of the pool and the pool cleaning robot during the portion of the exit process.

At least one of the one or more second interfacing elements may be coupled to a bottom of the housing.

The pool cleaning robot may include a drive system that may include a main portion and an auxiliary portion; wherein the auxiliary portion may be arranged to move the pool cleaning robot during the portion of the exit process; and wherein the main portion may be arranged to move the pool cleaning robot when the robot cleans the pool.

According to at least one embodiment of the invention there may be provided a pool cleaning robot for cleaning a pool, the pool cleaning robot may include a housing; a first interfacing element may be configured to interface between the pool cleaning robot and a bottom of a pool while the pool cleaning robot cleans the bottom of the pool; and an movable handle that may be configured to be coupled, at an anchor area, to an external system interface; wherein the movable handle may be configured to elevate the anchor area during a portion of an exit process in which the pool cleaning robot, with an assistance of the external system, exits the pool; wherein the external system may be positioned outside the pool.

The pool cleaning robot may include one or more second interfacing elements that may be configured to reduce a friction between the pool and the pool cleaning robot during at least a portion of the exit process.

The pool cleaning robot may include an interface manipulator that may be configured to move the intermediate element between a first position to the second position thereby changing the distance between the housing and the external system.

According to at least one embodiment of the invention there may be provided a pool cleaning robot for cleaning a pool, the pool cleaning robot may include a housing; a first interfacing element may be configured to interface between the pool cleaning robot and a bottom of a pool while the pool cleaning robot cleans the bottom of the pool; and a second interfacing element that may be configured to interface between the pool cleaning robot and an exterior surface during a portion of an exit process in which the pool cleaning robot exits the pool; and wherein the second interfacing element may be configured not to contact the bottom of the pool when the pool cleaning robot cleans the bottom of the pool.

According to at least one embodiment of the invention there may be provided a pool cleaning robot for cleaning a pool, the pool cleaning robot may include a housing; a first interfacing element may be configured to interface between the pool cleaning robot and a bottom of a pool while the pool cleaning robot cleans the bottom of the pool; one or more second interfacing elements that may be configured to contact an edge of the pool during an exit process during which the pool cleaning robot exits the pool; and an interface manipulator that may be configured to change a spatial relationship between the housing and the one or more second interfacing elements thereby preventing a given second interfacing element of one or more second interfacing elements to contact the bottom of the pool while the pool cleaning robot cleans the bottom of the pool.

According to at least one embodiment of the invention there may be provided a pool cleaning robot for cleaning a pool, the pool cleaning robot may include a housing; a first interfacing element may be configured to interface between the pool cleaning robot and a bottom of a pool while the pool cleaning robot cleans the bottom of the pool; one or more second interfacing elements that differ from the first interfacing element and may be configured to contact an edge of the pool during an exit process during which the pool cleaning robot exits the pool; at least one aperture for draining fluid from the pool cleaning robot during the exit process; and a controller that may be configured to control a timing of at least one portion of the exit process in response to actual or estimated amount of fluid within the pool cleaning robot.

According to at least one embodiment of the invention there may be provided a system for extraction of a pool cleaning robot from a pool, the system may include a cable that may be arranged to be coupled to a pool cleaning robot during an exit process during which the pool cleaning robot may be extracted from the pool; a cable manipulator for pulling the cable during the exit process; and a controller that may be configured to control the pulling of the cable based on an estimated or an actual amount of the fluid within the pool cleaning robot.

According to at least one embodiment of the invention there may be provided a method for extracting a pool cleaning robot from a pool, the method may include pulling a cable that may be coupled to the pool cleaning robot during an exit process during which the pool cleaning robot exits the pool; and controlling, by a controller of a system, the cable based on an estimated or an actual amount of the fluid within the pool cleaning robot.

The system may be positioned at a predefined distance from an edge of the pool.

The pulling may be executed by a motor and a reel; and wherein a part of the reel may be positioned below the edge of the pool.

Any combination of any elements, components, parts and/or features that appear in any of the figures and/or any paragraph of the specification and/or any claim may be provided.

There may be provided a pool cleaning robot that may be mechanically coupled to an extraction element that is used to extract the pool cleaning robot from the pool. The extraction element may be a cable and the following text refers to a cable. It should be noted that the cable is merely a non-limiting example of an extraction element.

There may be provided a pool cleaning robot for cleaning a pool, the pool cleaning system may include a housing; and a drive system, wheels and/or tracks, cleaning brushes, a pump system, a filtering system, a tethered electrical cable and an electronic control system that may be arranged to move the pool cleaning robot in relation to an environment of the pool cleaning robot.

The electronic control may receive inputs from sensors and/or accelerometer that govern the performance and environment of the pool cleaning robot.

According to at least one embodiment of the invention there may be further provided a pool cleaning system that comprises a pool cleaning robot in conjunction of a separate cable-reel/winch that is external to the pool and that may be able to autonomously exit the pool cleaning robot from the pool.

The pool cleaning robot may be coupled to a docking station (also referred to as system or external system) that is located outside the pool) by a cable such as but not limited to an electrical cable that is tethered to the pool cleaning robot on its first end and to a cable reel/winch on its second end. Alternatively—the electrical cable may be provided in additional to a cable that is mechanically coupled to the system.

The docking station is an example of a maintenance system that may perform any type of maintenance operation. Non-limiting examples of maintenance operations include cleaning the pool cleaning robot, receiving debris from the pool cleaning robot, shredding debris outputted from the pool cleaning robot, replacing a filter of the pool cleaning robot, loading a filter to the pool cleaning robot, electrically charging the pool cleaning robot, repairing and/or replacing any part of the pool cleaning robot. Additionally or alternatively, the docking station is configured to receive and/or provide information and/or commands and/or to and/or from the pool cleaning robot. During one or more the maintenance operation the pool cleaning robot may be docked in the docking station or otherwise may be accessible to the maintenance operation. For example, when washing the pool cleaning robot, the pool cleaning robot should be close enough to the docking station in order to be washed by fluid extracted from the docking station.

The tethered cable or the tethered electrical cable may include reinforcing fiber strands that may comprise aramid strands. The cable may be further reinforced internally with additional aramid strands or other carbon type strands in order to withstand the extended stresses on the cable that may cause tearing.

The pool cleaning system may include the said pool cable-reel/winch that is able to interact both mechanically and electronically with the pool cleaning robot.

The process of exiting from the pool may direct the pool cleaning robot onto a docking station that may comprise the cable-reel/winch and a power supply and a cable reel/winch drive motor and a control box able to govern the cable-reel/winch and communicate with the pool cleaning robot control box by wire or wireless means.

A manual override handle or other man machine interface (not shown) may be used to manually reel-in and pull out the pool cleaning robot from the pool.

In another embodiment, the cable reel/winch is an independent system that is not located on a docking station and may comprise the reel, a drive motor, electrical supply and power supply with said independent system is bolted or attached to the ground or another immovable anchoring element so that, for safety reasons, it may not detach and reach the pool water.

An immovable anchoring element may for example be the wall of a house or a concrete, metal or wooden pole of any solid built construction in the vicinity of the swimming pool.

A number of pool cleaning robot services may be provided whilst the pool cleaning robot is positioned on a docking station. Amongst these services are automatic filter replacement and filter clean up as discussed and in U.S. provisional patent application 61/745,556 filing date 22 Dec. 2012 and PCT patent application PCT/IL2013/051055 filing date 22 Dec. 2013 and U.S. provisional patent 61/992,247 filing date May 13, 2014; Titled: AUTONOMOUS POOL CLEANING ROBOT WITH AN EXTERNAL DOCKING STATION which are incorporated herein by reference in their entirety.

In an alternative option to a docking station/caddy, the said pool cleaning robot will autonomously exit the pool and park in the vicinity of the pool edge and may await end user intervention or another pool cleaning cycle.

In any of above at least one embodiment of exiting the pool, the reverse operation of returning the pool cleaning robot to the pool may be also performed. Namely, the pool cleaning robot will travel from vicinity of pool edge or from the docking station/caddy whilst cable reel/winch releases sufficient slack to tethered cable to reach pool edge. As soon as the cleaner attempts to drop into the pool water the reel/will hold back any further slack to allow the handle to unfold and extend to an upward position thereby allowing smooth and slow descent into the water.

The handle therefore performs a dual purpose by being a carrying handle for the end user but that may also serve as an intermediate element that is used to attach the pool cleaning robot to a docking station by means of the electrical power cord.

The pool cleaning robot depicted in FIGS. 1-18 usually travel on the pool floor or climb the pool walls in order to sweep, brush and suck in dirt and debris that are accumulated on the said surfaces and wall.

In FIGS. 1-4 the pool cleaning robot is denoted 20, the intermediate element is a handle that is denoted 12, an axis of rotation of the handle is denoted 25, a second interfacing element (such as wheel) is denoted 22. The cable that is connected between the pool cleaning robot and the docking station (also referred to system or external system) 100 is denoted 50, the reel of the docking station is denoted 60, a motor/winch of the docking station is denoted 90.

Figure 7:
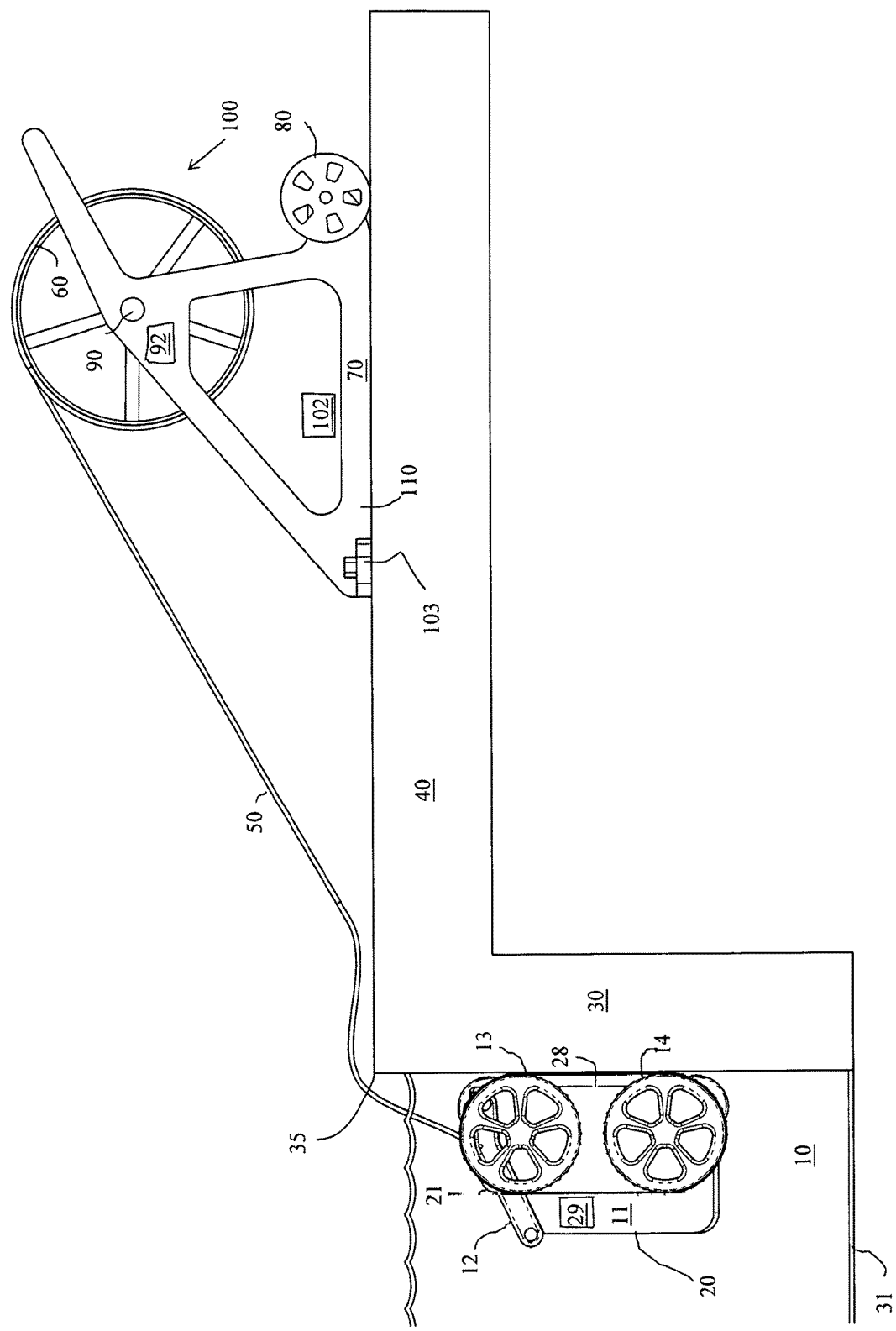
FIG. 7 illustrates a pool cleaning robot that climbs on a sidewall of the pool while propagating towards a docking station and the cable that connects the pool cleaning robot to a docking station is loose according to at least one embodiment of the invention.
Figure 8:
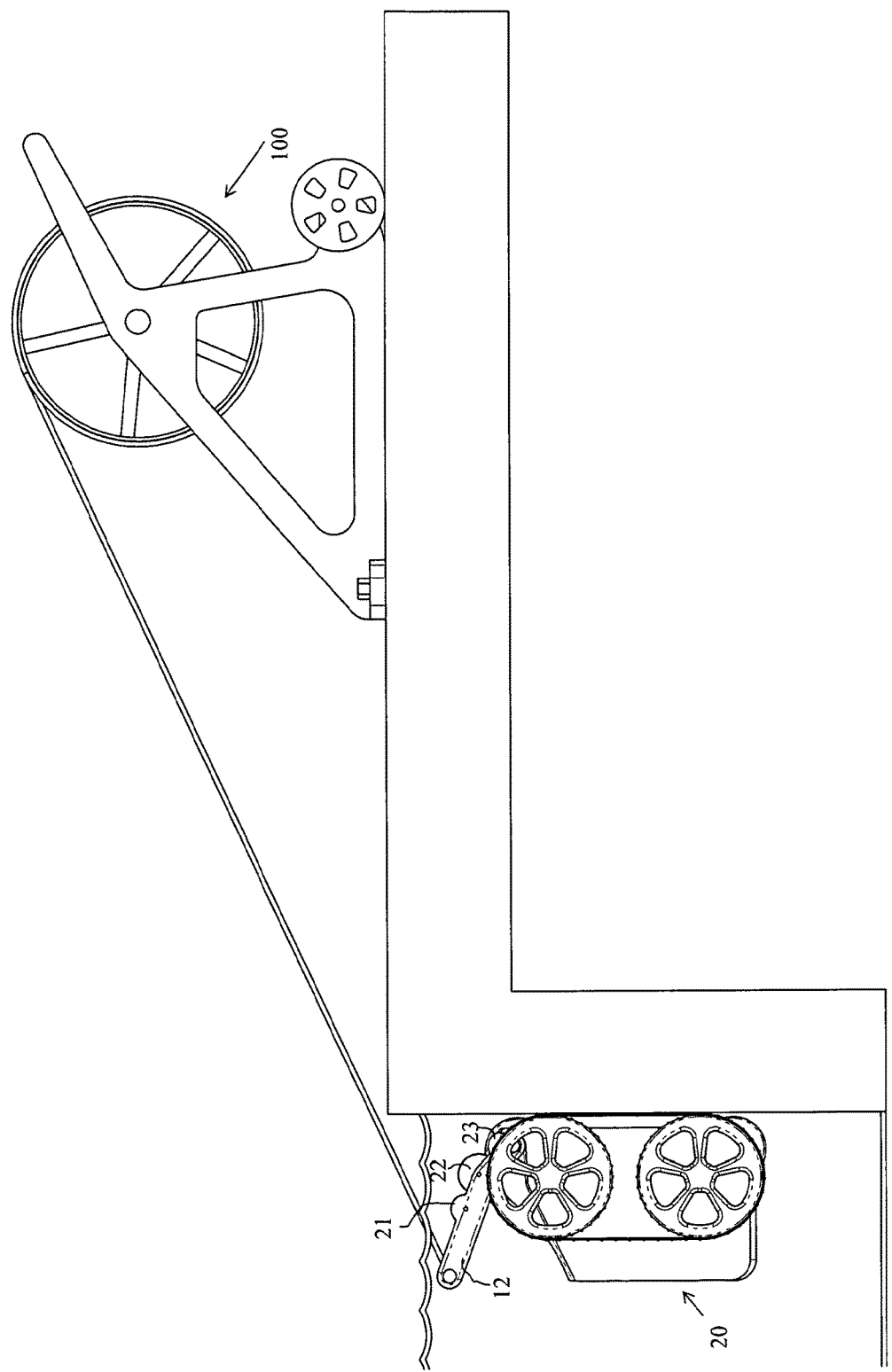
FIG. 8 illustrates a pool cleaning robot that is still underwater but is proximate to an edge of the pool and the cable that connects the handle of the pool cleaning robot to a docking station and the handle is partially opened—in an intermediate position according to at least one embodiment of the invention.
Figure 9:
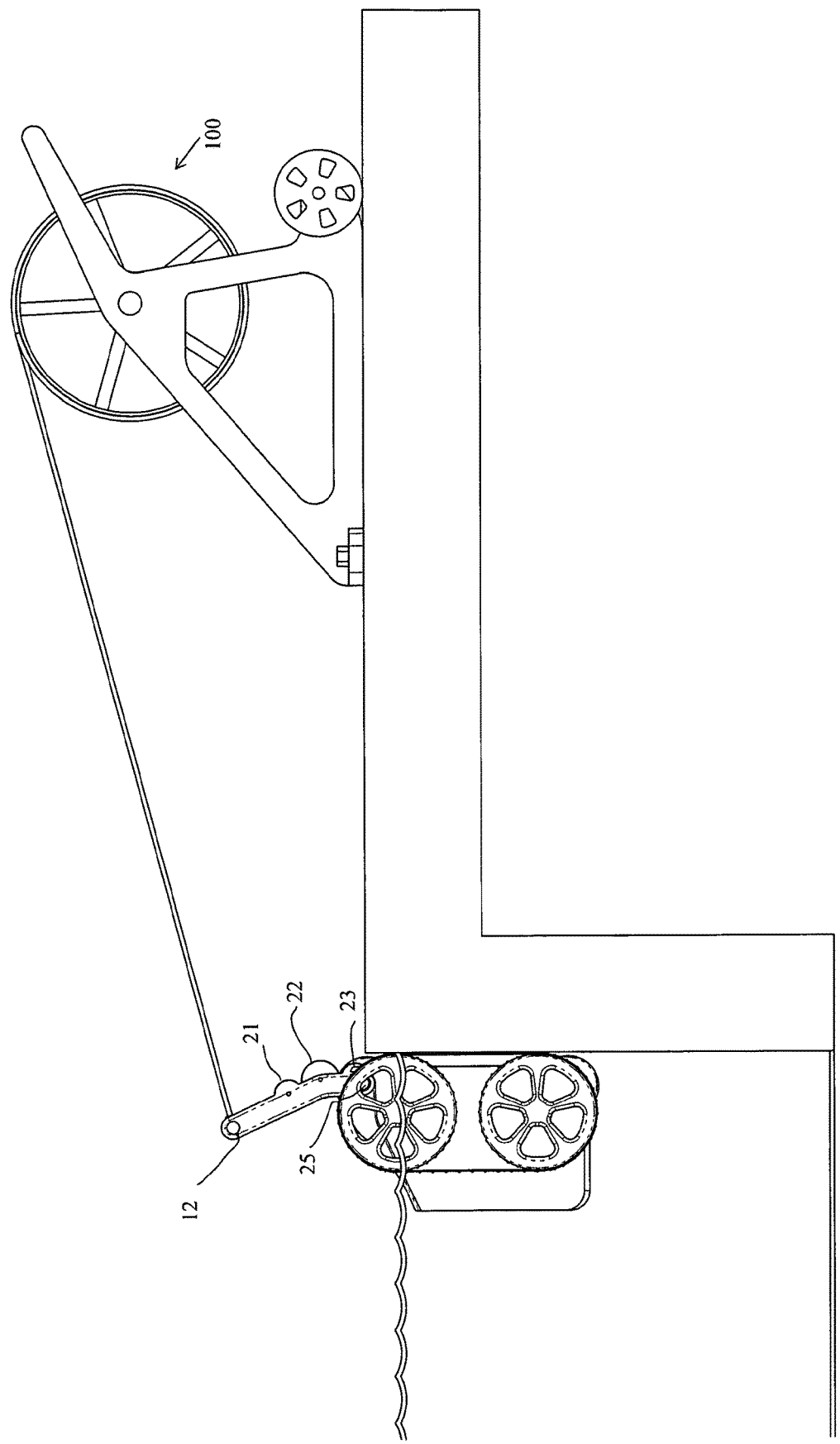
FIG. 9 illustrates a pool cleaning robot that is partially above the water of the pool, still in a vertical position and proximate to an edge of the pool, wherein the cable that connects the handle of the pool cleaning robot to a docking station is tense and the handle is in an open position according to at least one embodiment of the invention.

In FIG. 7 the pool cleaning robot is illustrated as including a controller 29, sensor 11 and an aperture 28 for draining fluid. The pool cleaning robot may have more than a single sensor, more than a single aperture and the positions of the aperture, controller and sensor may differ from those illustrated in FIG. 1. For example, the sensor 11 may be floating in the fluid within the pool cleaning robot and his location is indicative of the amount of fluid in the pool cleaning robot. The sensor 11 may track after a floating element that floats in the fluid within the pool cleaning robot and the location of the floating element is indicative of the amount of fluid in the pool cleaning robot. The sensor may be an optical sensor, a pressure sensor that tracks the fluid within the pool cleaning sensor. There may be provided an orientation sensor and a timer for monitoring the exit process. The duration of the pool cleaning robot at each orientation during the exit process may provide an estimate of the amount of fluid within the pool cleaning robot.

It is noted that the pool cleaning robot may include the controller and not the sensor or the sensor and not the controller.

It should be noted that the depiction of the distances of the docking stations 100 from the pool's edge in FIGS. 1-18 and 24 are purely illustrative. Distances and other relevant parameters may vary according to national electrical regulations prevailing in each country or county where said station may be installed.

In FIGS. 1-12 the docking station is positioned above the external surface 40 and includes a frame 70, wheels 80, lower surface 110 on which the pool cleaning robot 20 can climb and be positioned above. The docking station 10 also includes a controller (denoted 102 in FIG. 7) for controlling the exit process.

In FIGS. 13-18 the docking system 100 is located within a space 200 formed in the external surface 40 that may be a pool deck, the space 200 may include a sealed cover 202 with a hole and be equipped with cable guiding idler rollers (not shown) in which cable can pass through. The bottom of the docking station is located below the edge 35 of the pool and may include a subterranean electrical junction box, a water drain and the like. Docking system 100 may include a controller and/or a sensor—but they are not shown for brevity of explanation.

The pool includes water 10 and a sidewall 30 that interfaces with an external surface 40. The motor 90 may be positioned inside the reel (As shown in FIG. 1), outside the rail and be fed by electricity from a mains power outlet, may belong to the robot, the docking station or belong to a third element. Both pool cleaning robot and the docking station may include motors. The docking station may be static, may move along the external surface and the like.

The pool (or external surface) may include or may be connected to stoppers that may prevent the docking station to enter the pool or move beyond the stoppers. For example, line 101 of FIG. 1 may represent a stopper and element 103 of FIG. 7 may represent a fastening element that fastens the docking station to the external surface in any conceivable method.

It is noted that the exit process of the pool cleaning robot from the pool can be done by using the drive power of the pool cleaning robot and/or the reel of the docking station. For example—any phase of the exit process of FIGS. 2-7 may be executed by using the reel and/or the pool cleaning robot.

Figure 2:
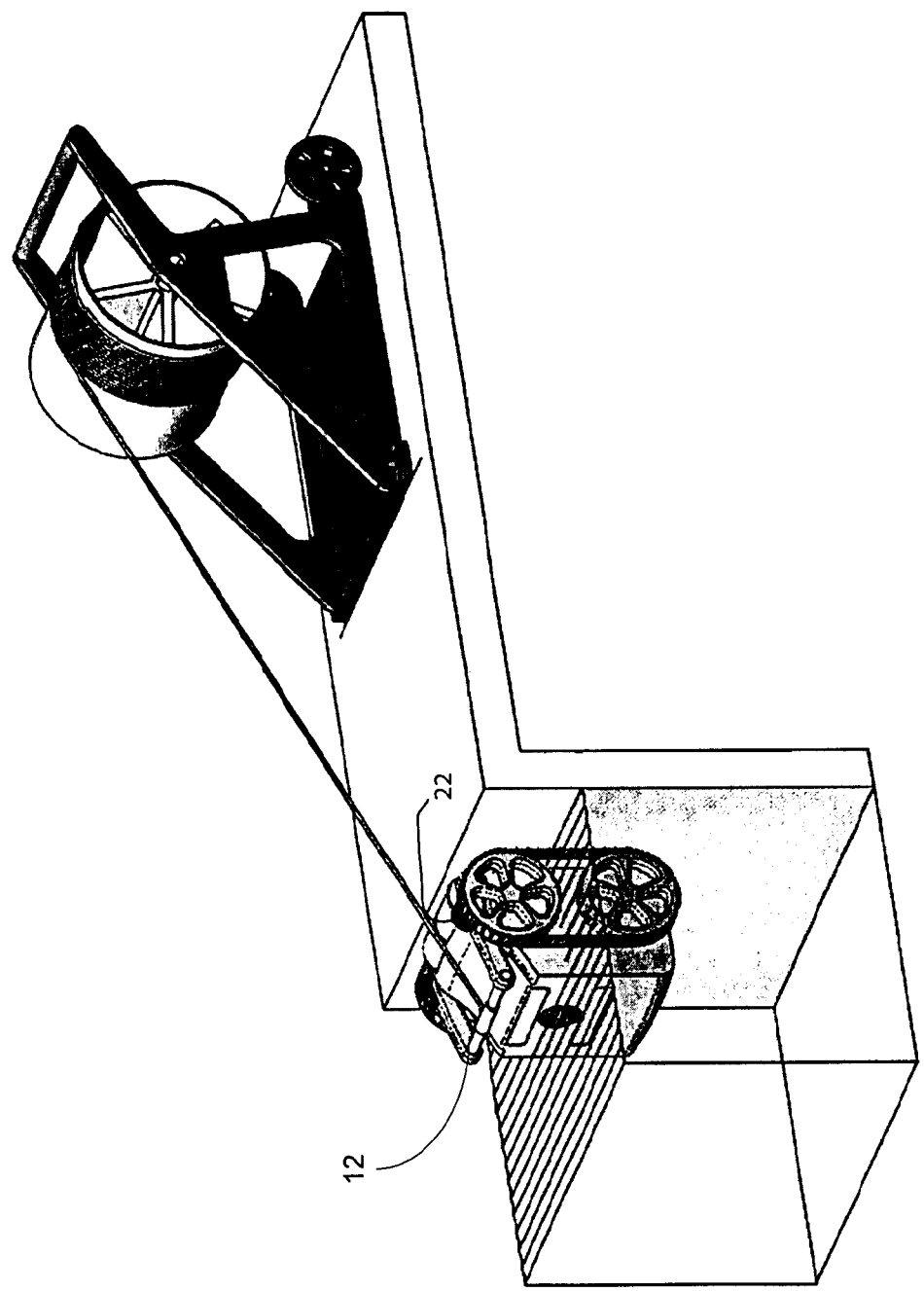
FIG. 2 illustrates a pool cleaning robot that is proximate to an edge of the pool and a cable that connects a handle of the pool cleaning robot to a docking station is tense and the handle is in a closed position according to at least one embodiment of the invention.
Figure 3:
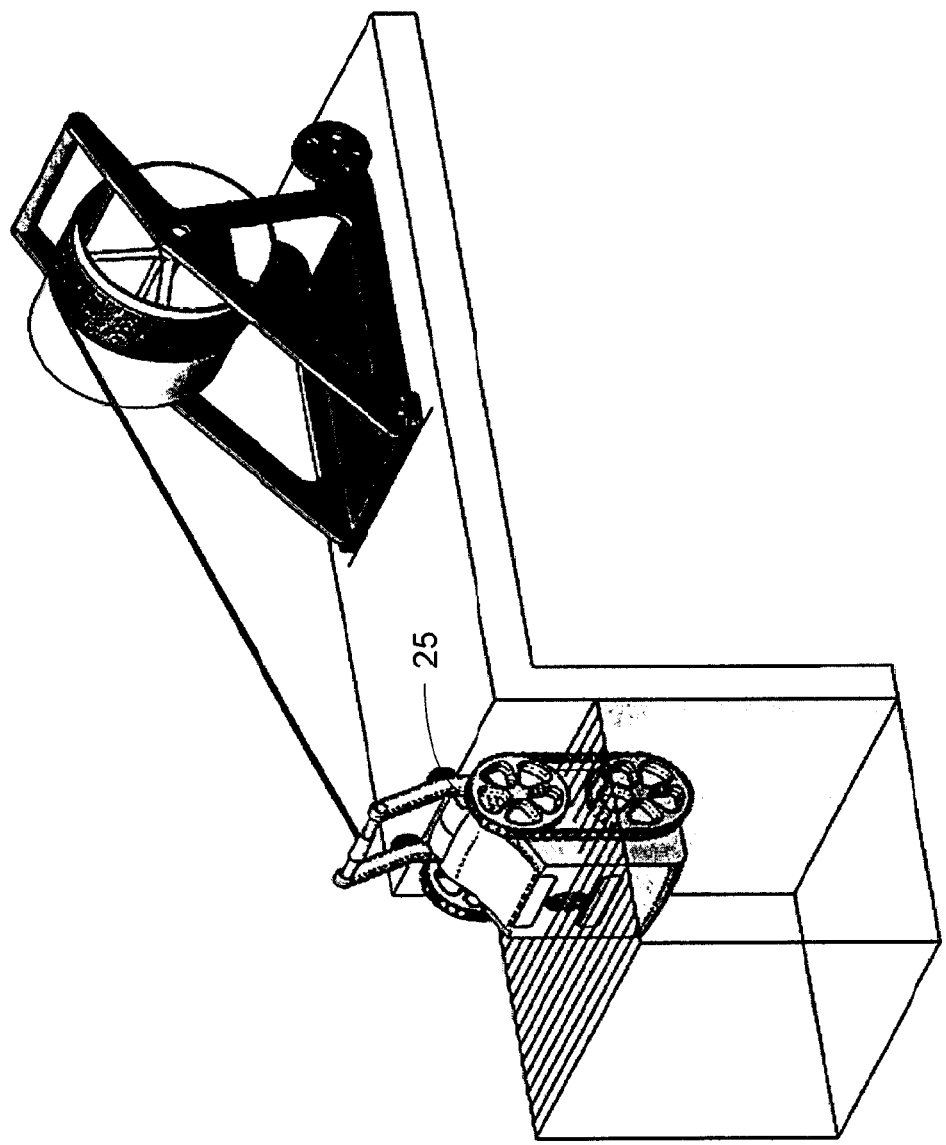
FIG. 3 illustrates a pool cleaning robot that is proximate to an edge of the pool and the cable that connects the handle of the pool cleaning robot to a docking station is tense and the handle is in an open position according to at least one embodiment of the invention.
Figure 4:
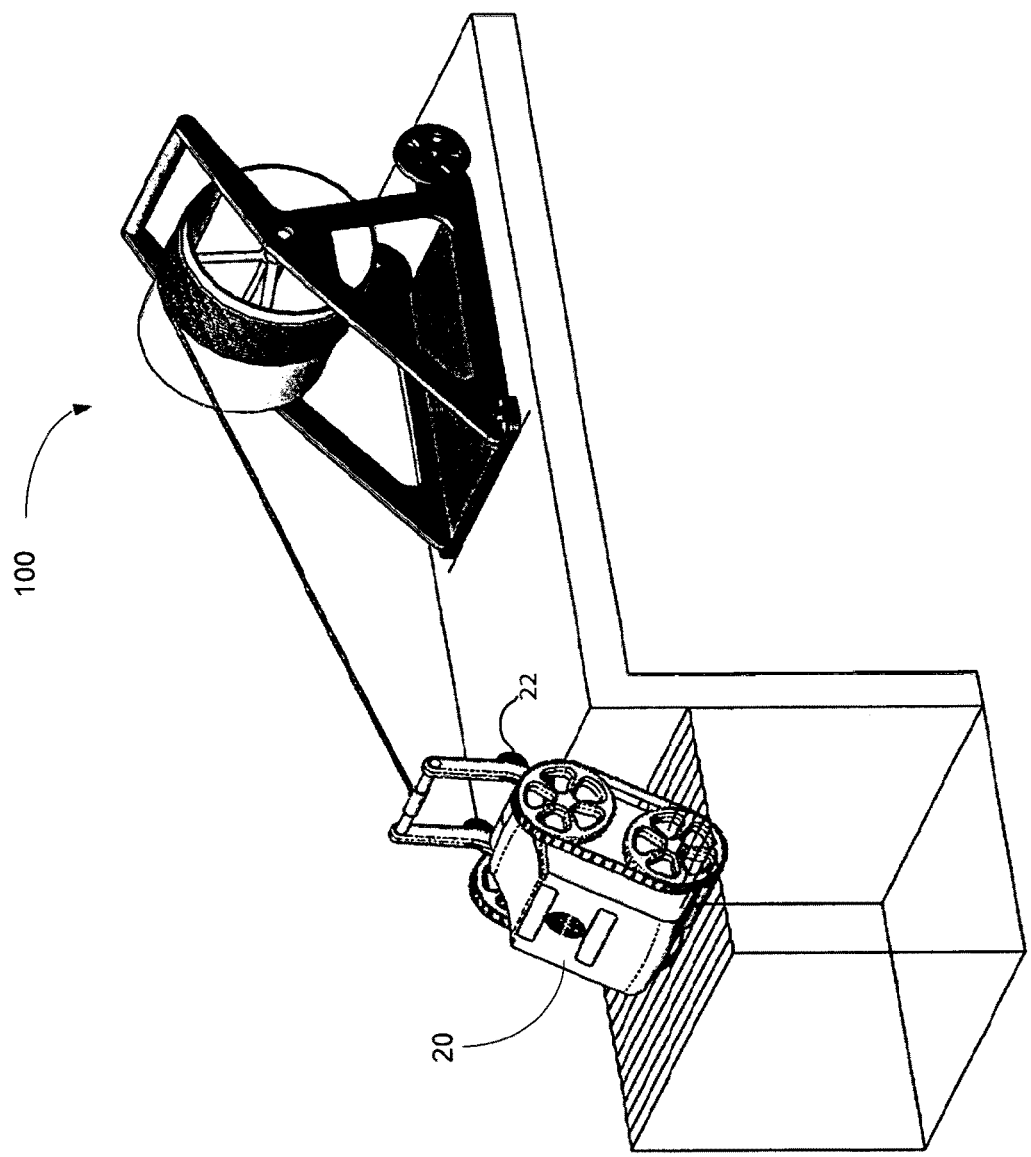
FIG. 4 illustrates a pool cleaning robot is partly outside the water of the pool in an intermediate position in which water can be drained from the pool cleaning robot according to at least one embodiment of the invention.
Figure 5:
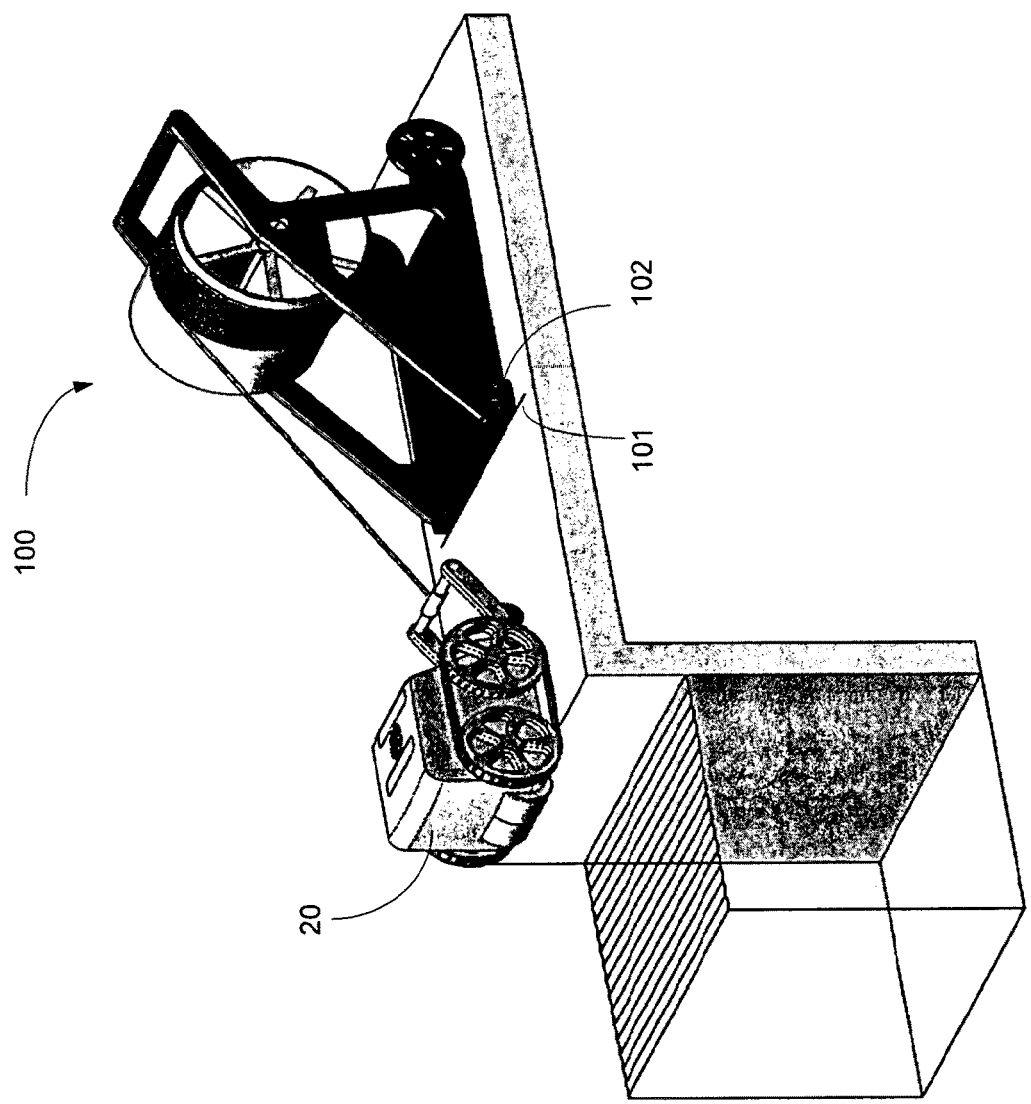
FIG. 5 illustrates a pool cleaning robot is completely outside the water of the pool and propagates towards the docking station according to at least one embodiment of the invention.
Figure 6:
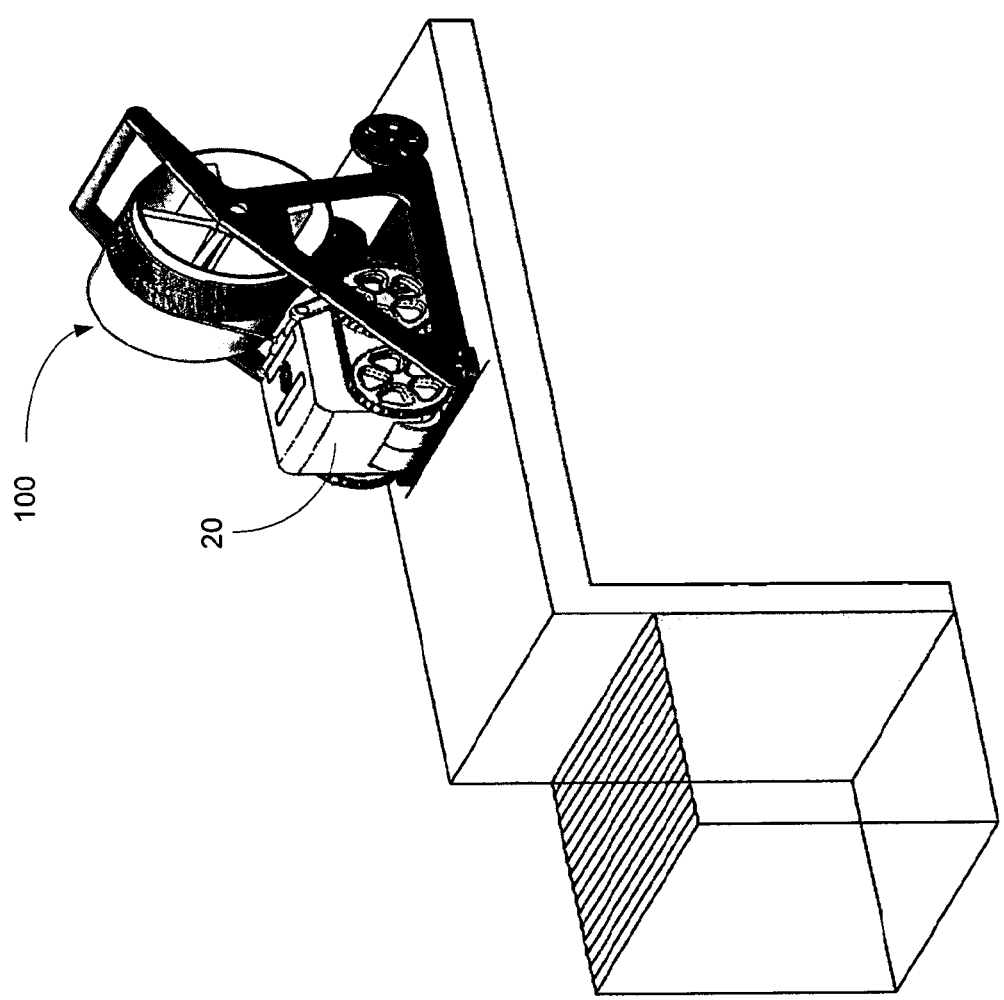
FIG. 6 illustrates a pool cleaning robot is docked at the docking station according to at least one embodiment of the invention.

It is noted, referring to FIGS. 2-3 that the movement of the handle 12 from a closed position to an open position can be triggered by the tension of the cable but may be triggered by sensors such as height sensors, out of water sensor and the like. The sensor may be sensor 11 of the pool cleaning robot and/or sensor 92 of the docking station 100.

Figure 10:
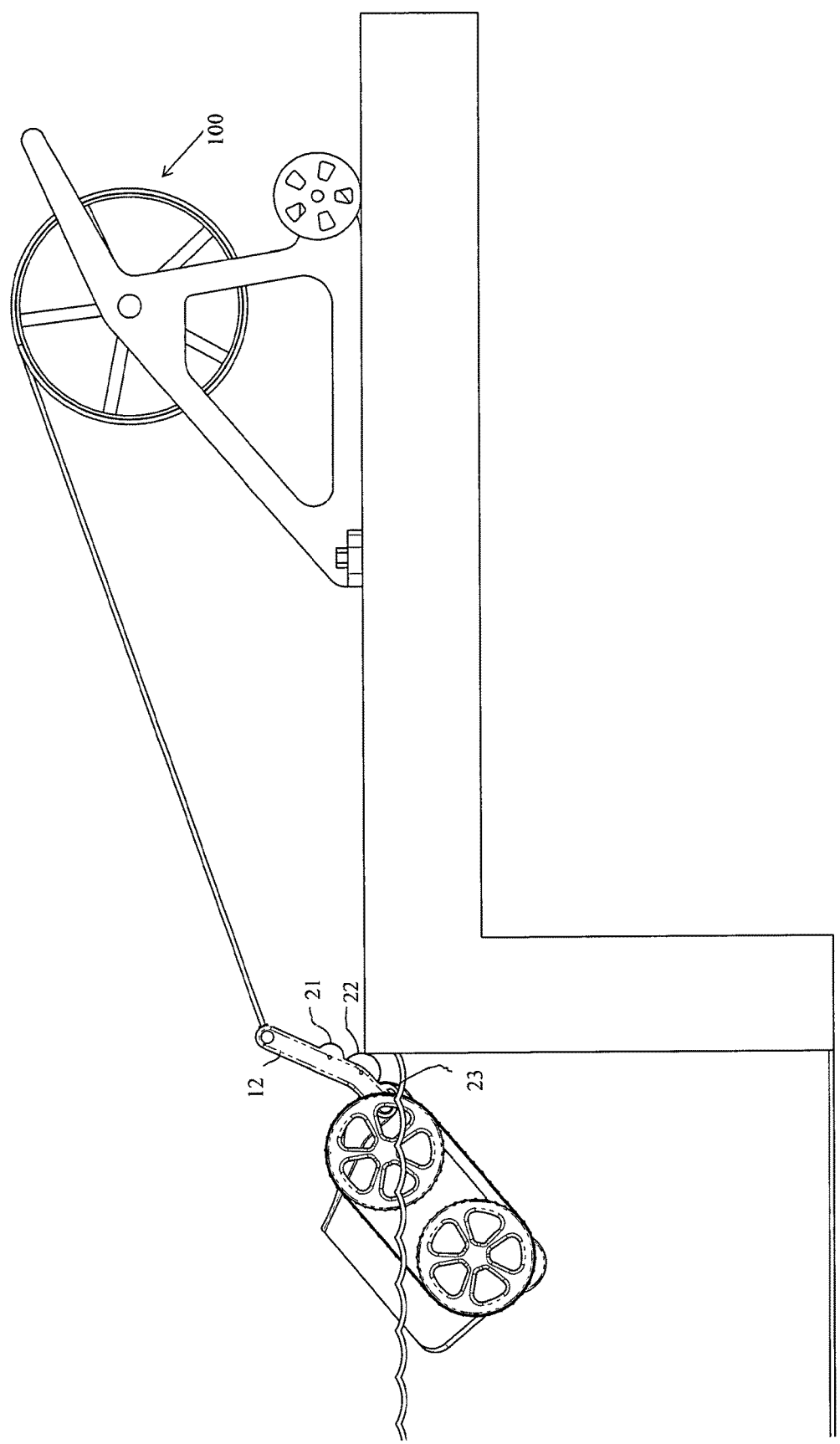
FIG. 10 illustrates a pool cleaning robot is partly outside the water of the pool in an intermediate position in which water can be drained from the pool cleaning robot, wherein a second interfacing element contacts the edge of the pool according to at least one embodiment of the invention.
Figure 11:
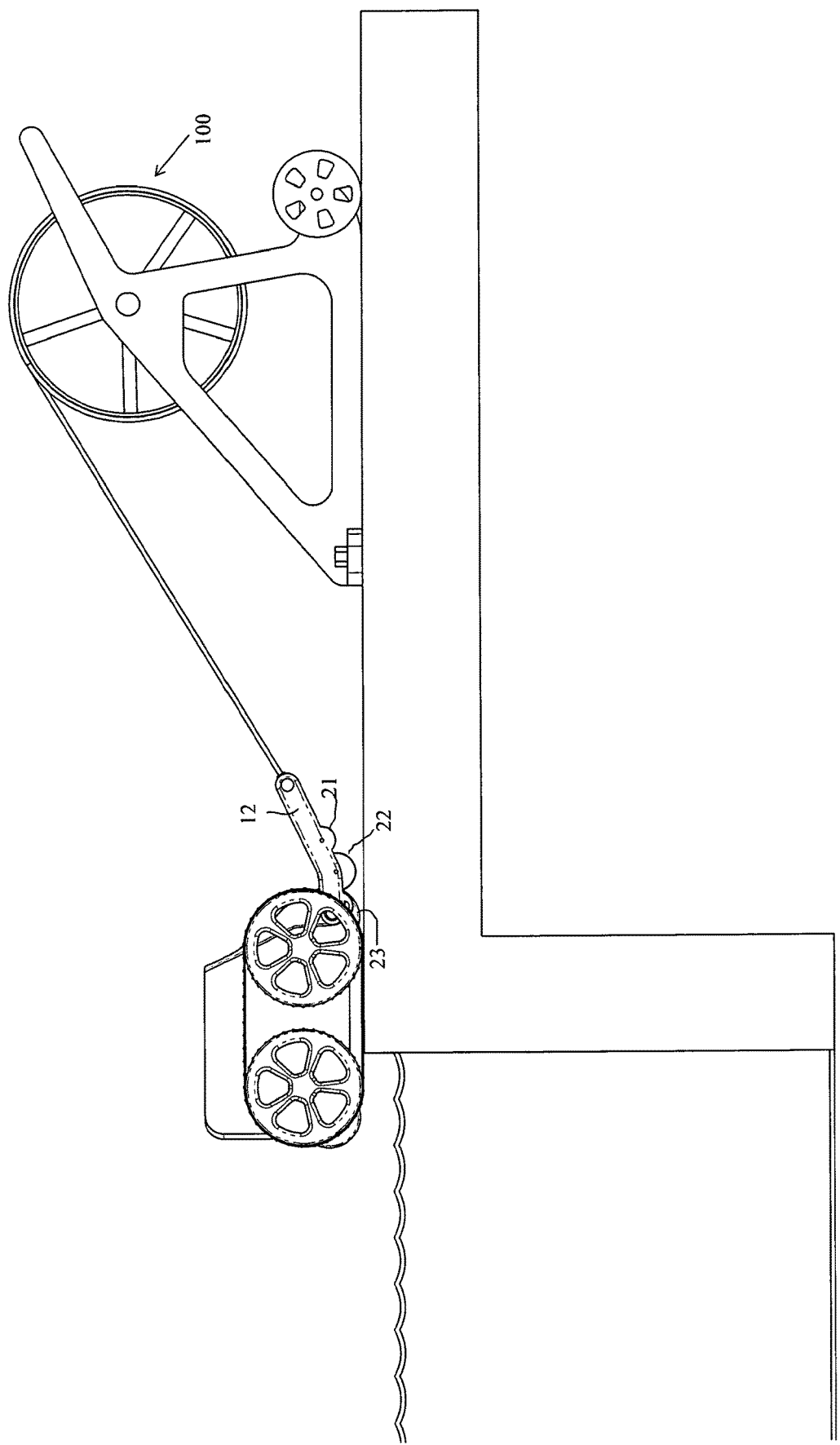
FIG. 11 illustrates a pool cleaning robot is completely outside the water of the pool but is closer to the edge of the pool than to the docking station according to at least one embodiment of the invention.
Figure 12:
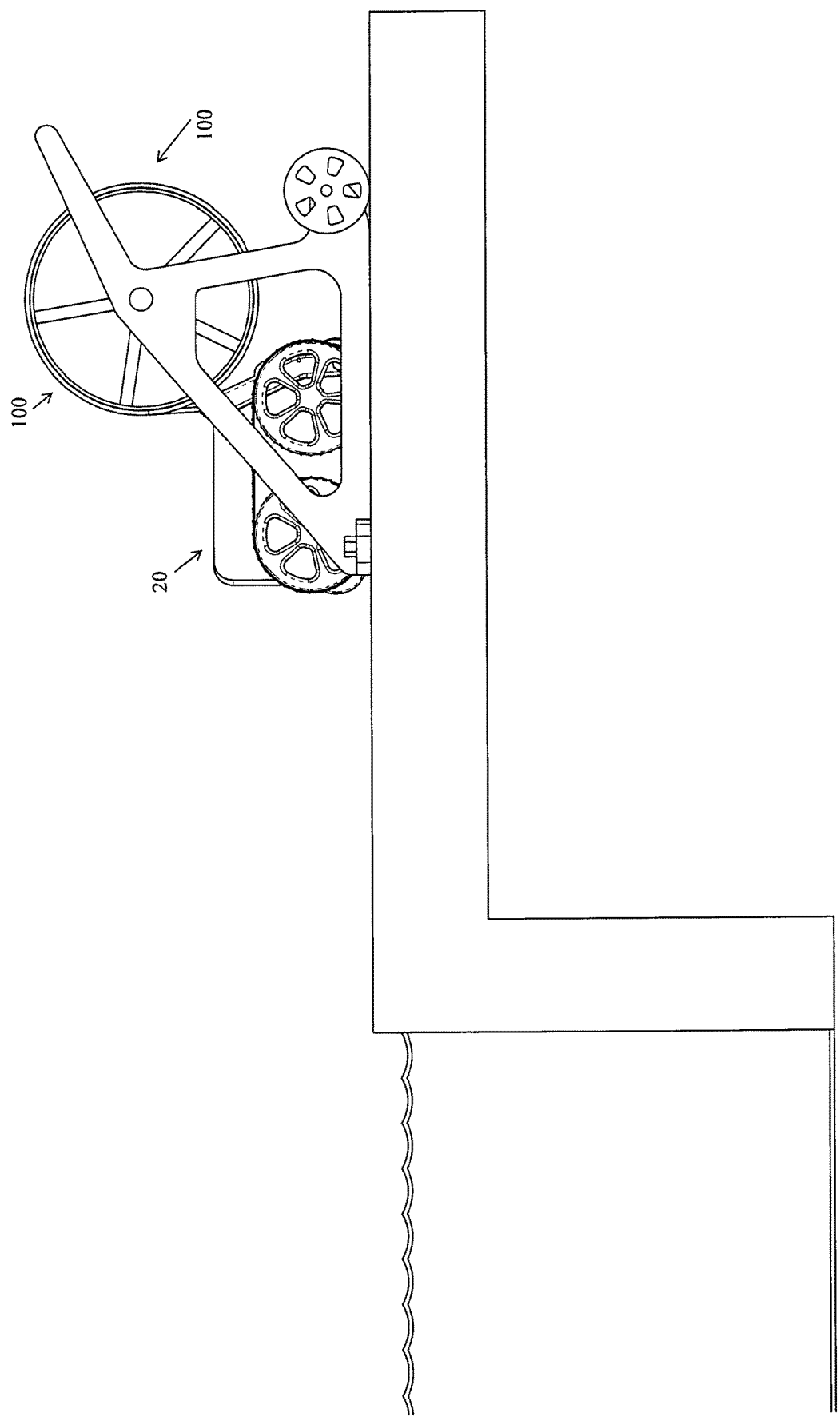
FIG. 12 illustrates a pool cleaning robot is docked at the docking station according to at least one embodiment of the invention.
Figure 13:
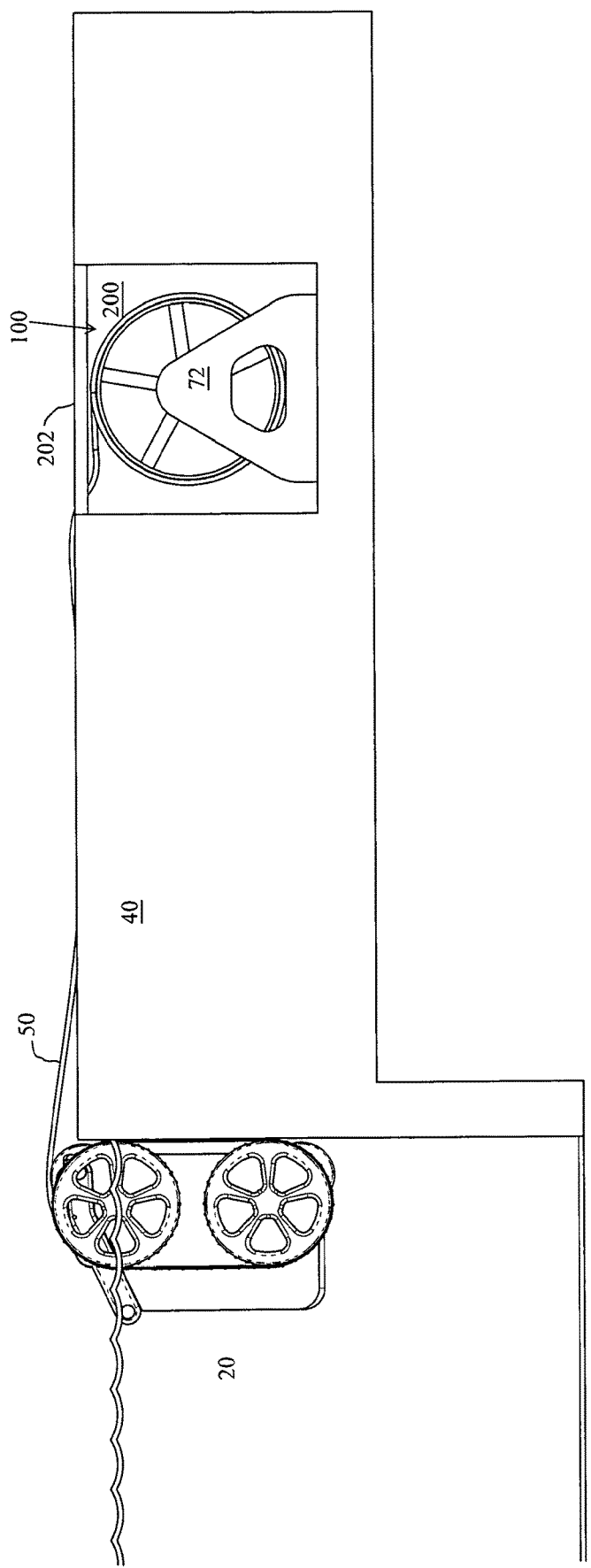
FIG. 13 illustrates a pool cleaning robot that climbs on a sidewall of the pool while propagating towards a docking station and the cable that connects the pool cleaning robot to a docking station is loose according to at least one embodiment of the invention.
Figure 14:
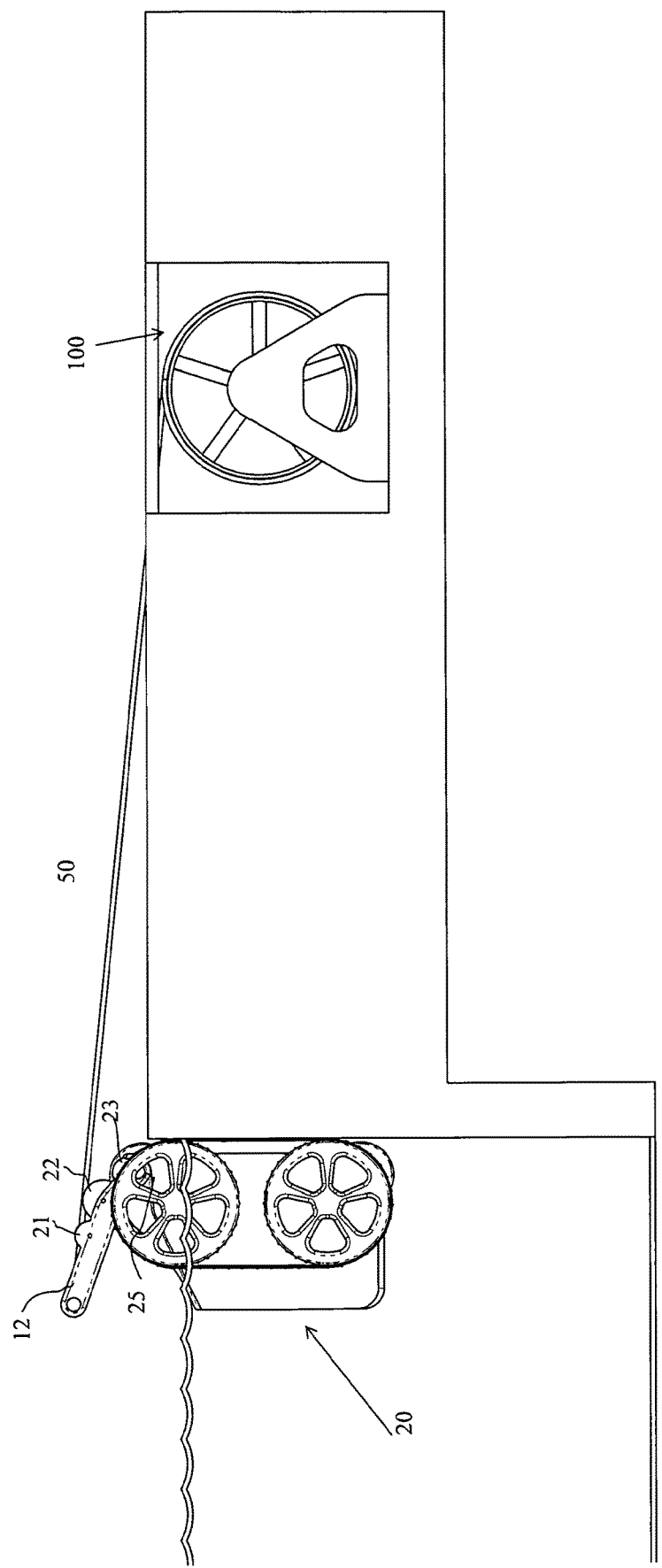
FIG. 14 illustrates a pool cleaning robot that is slightly above the water and is proximate to an edge of the pool and the cable that connects the handle of the pool cleaning robot to a docking station and the handle is partially opened—in an intermediate position according to at least one embodiment of the invention.
Figure 15:
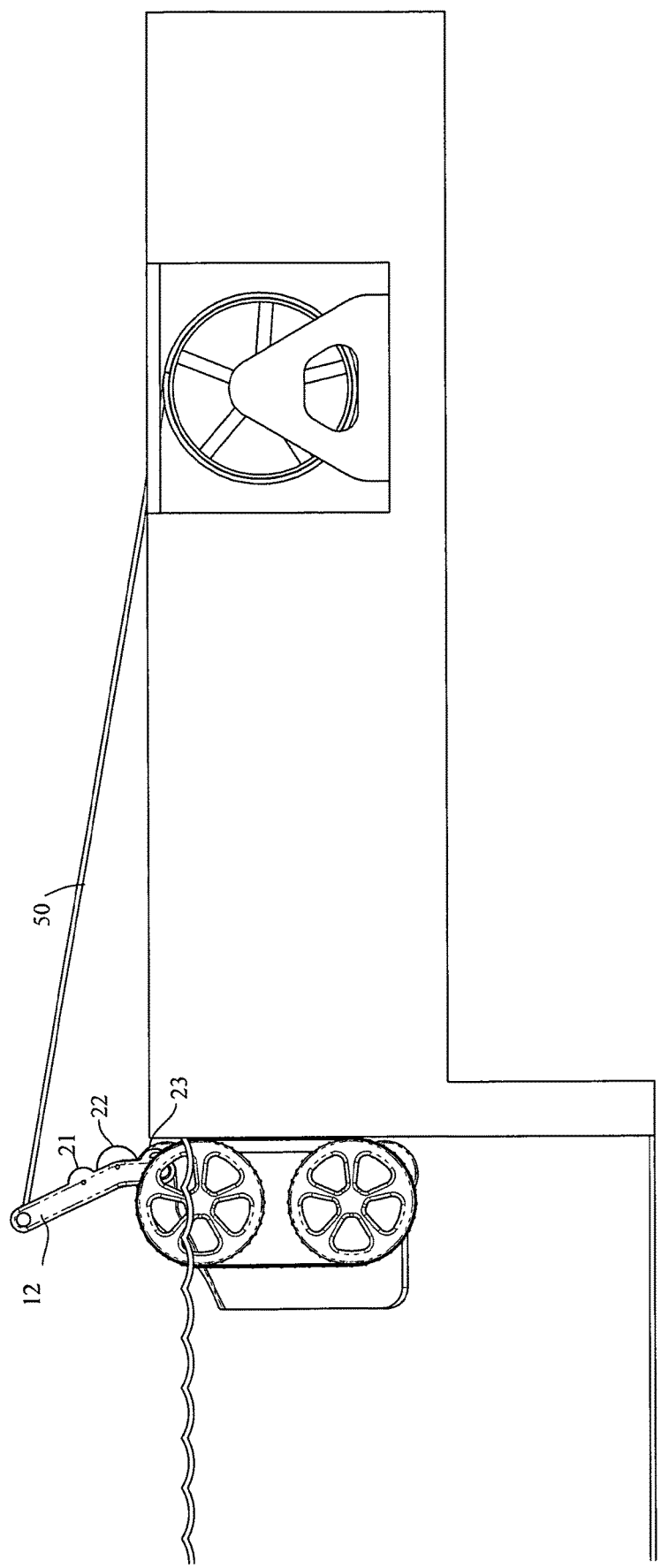
FIG. 15 illustrates a pool cleaning robot that is partially above the water of the pool, still in a vertical position and proximate to an edge of the pool, wherein the cable that connects the handle of the pool cleaning robot to a docking station is tense and the handle is in an open position according to at least one embodiment of the invention.
Figure 16:
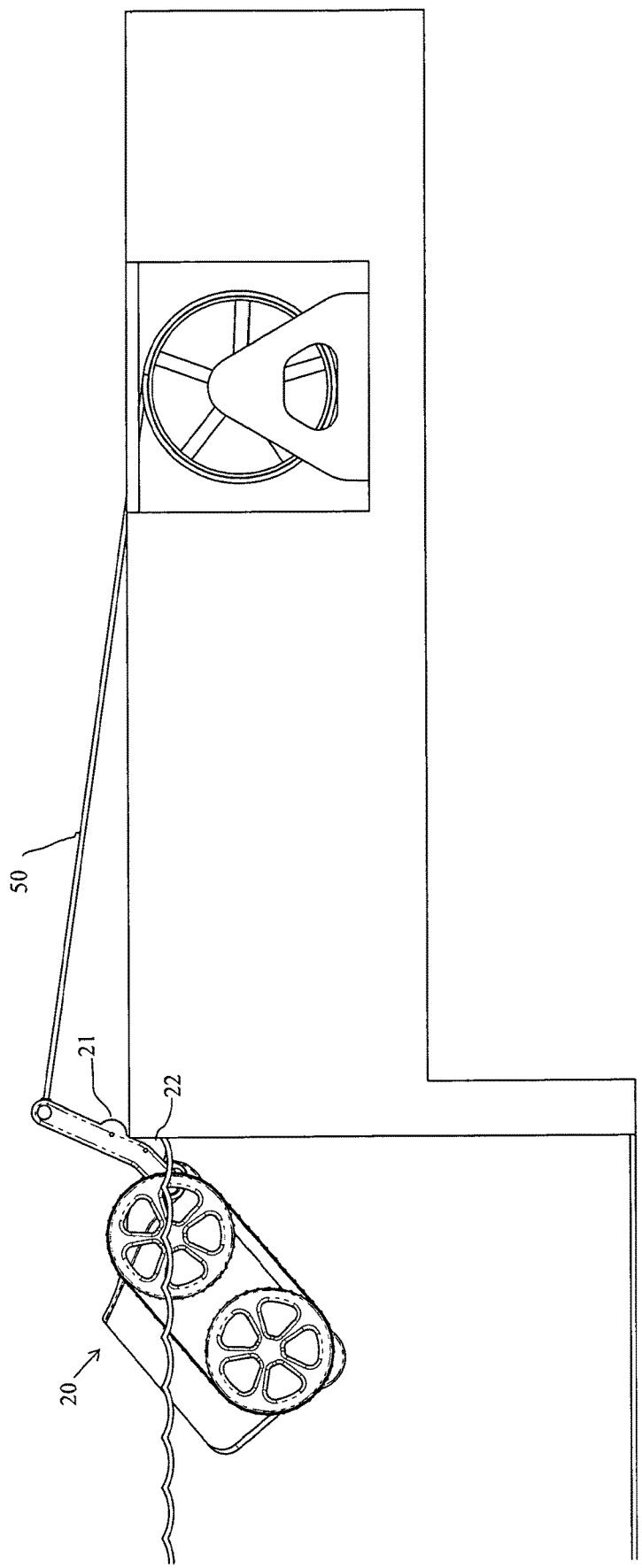
FIG. 16 illustrates a pool cleaning robot is partly outside the water of the pool in an intermediate position in which water can be drained from the pool cleaning robot, wherein a second interfacing element contacts the edge of the pool according to at least one embodiment of the invention.
Figure 17:
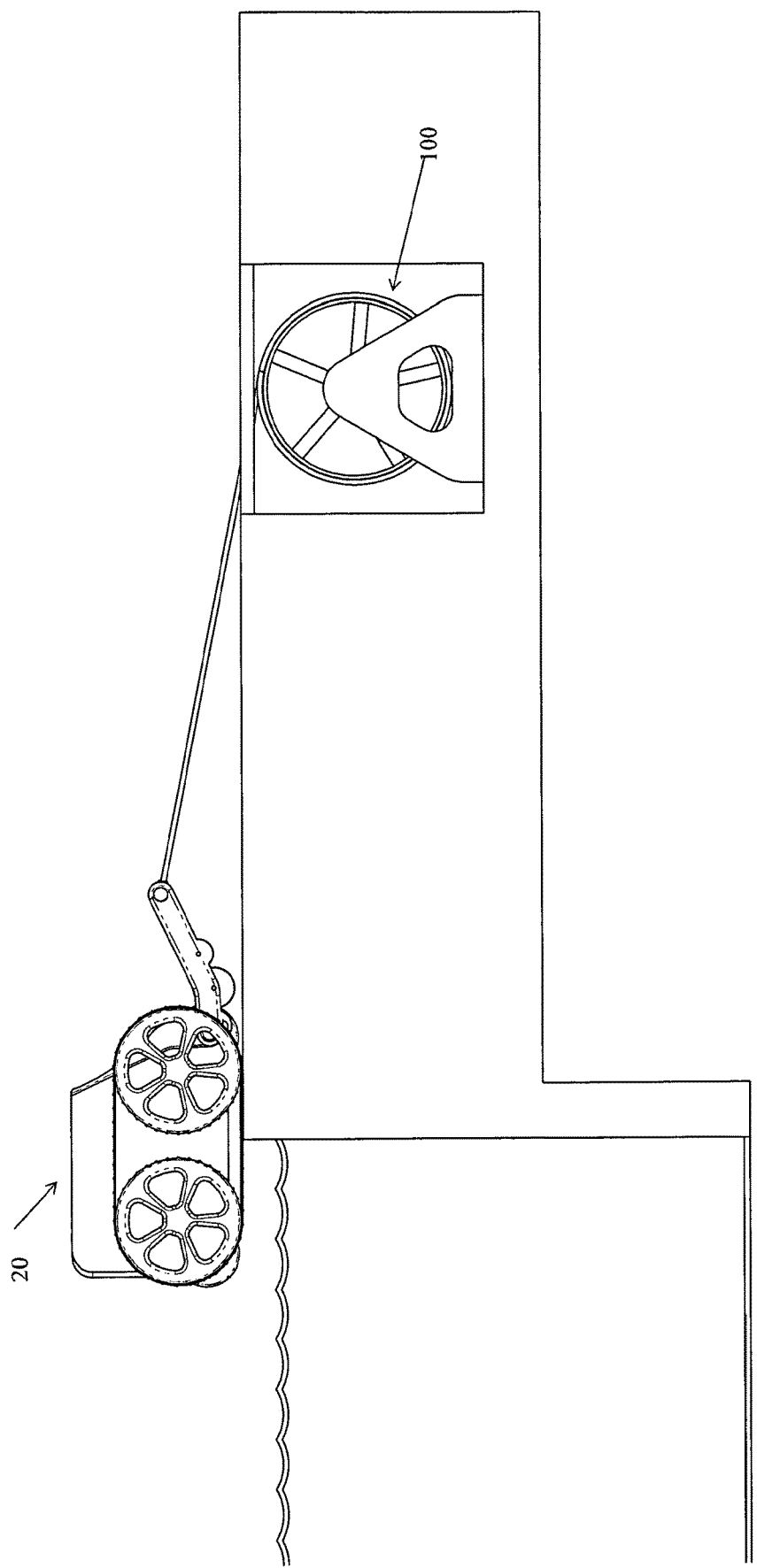
FIG. 17 illustrates a pool cleaning robot is completely outside the water of the pool but is closer to the edge of the pool than to the docking station according to at least one embodiment of the invention.
Figure 18:
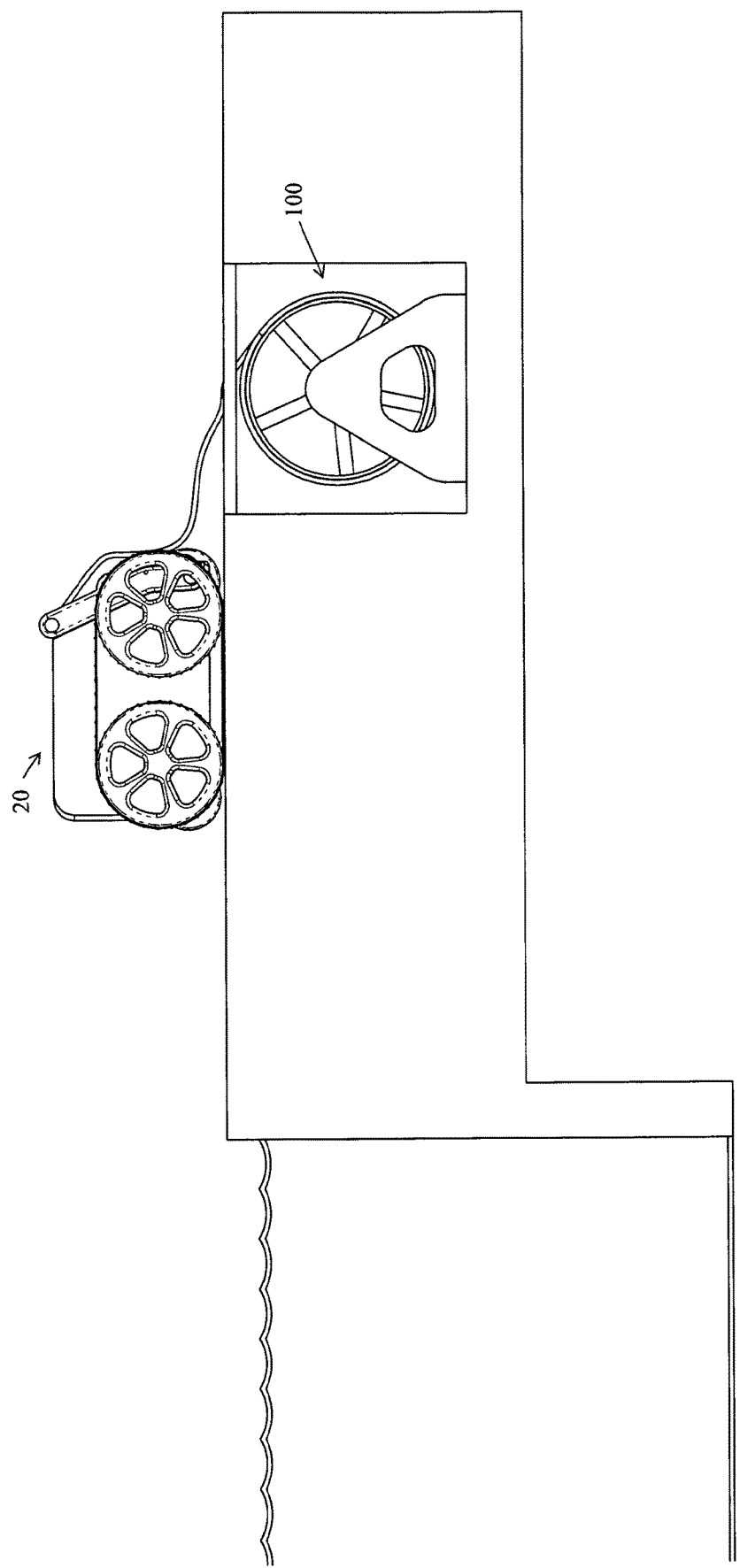
FIG. 18 illustrates a pool cleaning robot is docked at the docking station according to at least one embodiment of the invention.
Figure 19:
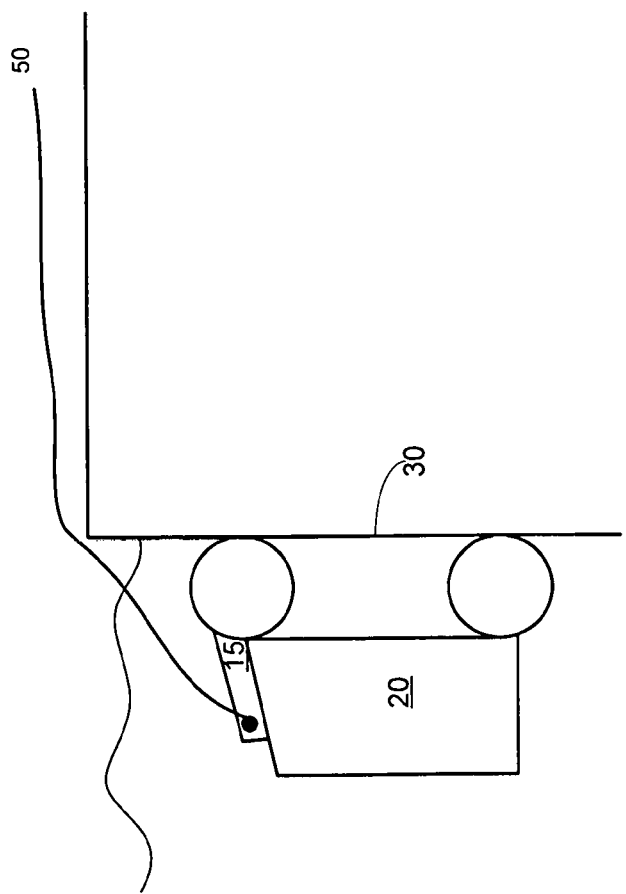
FIG. 19 illustrates a pool cleaning robot according to at least one embodiment of the invention.
Figure 20:
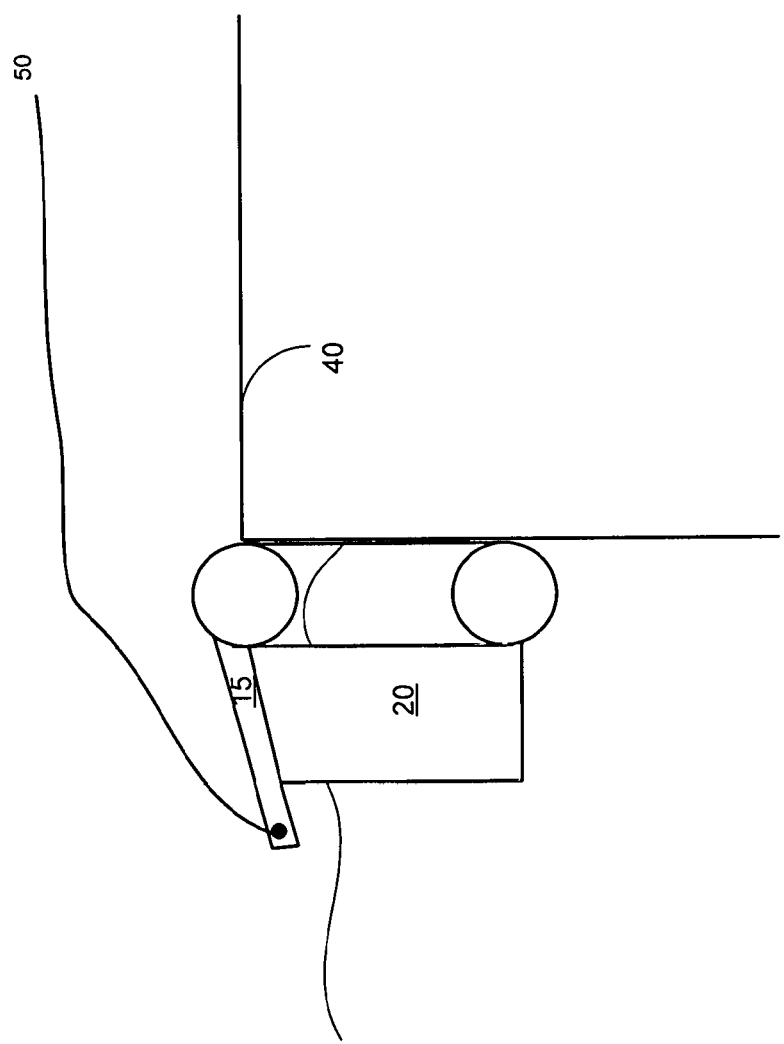
FIG. 20 illustrates a pool cleaning robot according to at least one embodiment of the invention.
Figure 21:
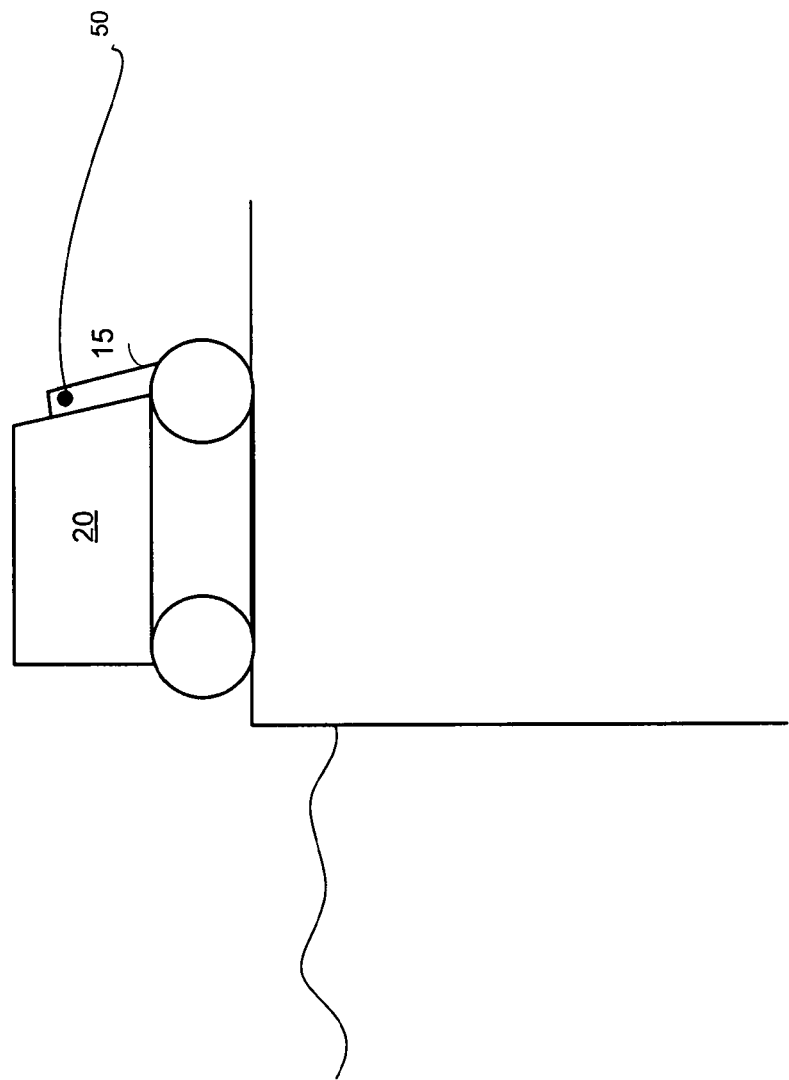
FIG. 21 illustrates a pool cleaning robot according to at least one embodiment of the invention.
Figure 22:
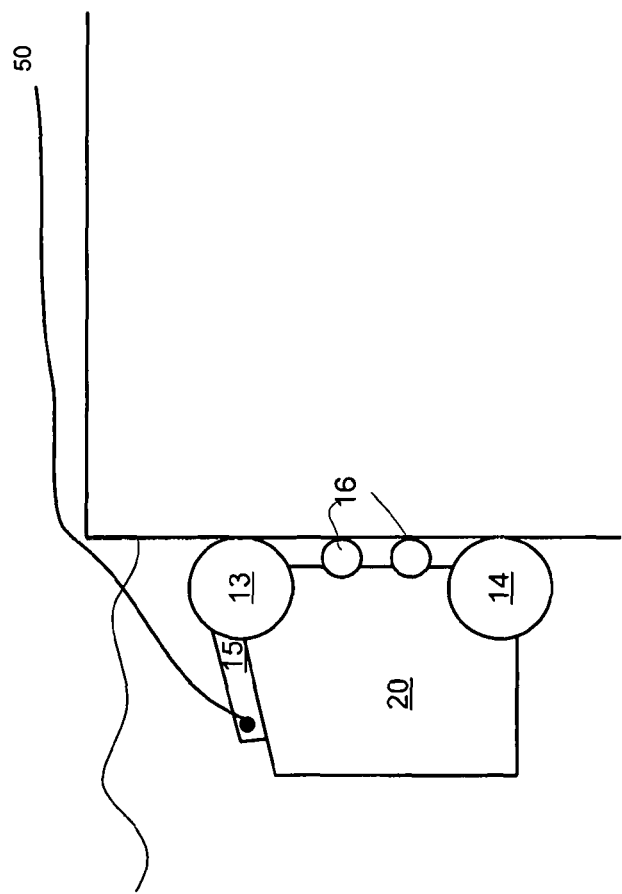
FIG. 22 illustrates a pool cleaning robot according to at least one embodiment of the invention.

During the exit process, and as especially illustrated in FIGS. 3, 10 and 16, the friction between the pool cleaning robot and the edge of the pool is decreased by having second interfacing elements such as wheels or guide wheels or auxiliary wheels 21, 22 and 23 that contact the edge of the pool during parts of the exit process.

The first interfacing elements are wheels (denoted 13 and 14 in FIG. 7) and/or tracks or any other interfacing elements that interface with the pool during the cleaning process.

An automatic, self-propelled pool cleaning robot may be governed by a controller (that may be positioned in a water proof box) in which a pre-set software or a manually overridden software set controls, amongst other, its cycle time. At the end of a cleaning cycle time, the pool cleaning robot stops its operation waiting for the end user to pull it out for service or for storage.

The reeling-in starts at a stage where the pool cleaning robot needs to exit the pool. The need may arise due to end of cycle, end of another pre-set period of time or reason such as a full filter bag that needs to be cleaned up or another service event.

According to at least one embodiment of the invention, as soon as a pre-set time event or any service event may occur, the cleaning program will end and the pool cleaning robot initiates a specific pool exit program protocol, a wired or wireless message is relayed to the cable reel/winch—wherever it may be positioned or located—so that the reeling-out or extraction process may start.

The first stage will be to have the pool cleaning robot positioned near the wall in the vicinity where the cable reel/winch is located.

The pool cleaning robot may actively assist with the floor travelling and extraction process by means of its drive motors.

The pool cleaning robot may actively assist with the wall travelling and extraction process by means of its pump and drive motors.

The pool cleaning robot emits wired or wireless communications to the reel/winch constantly sending data regarding its position, bearing and speed of travel FIGS. 1-18 depict the pool cleaning robot as it is being reeled or pulled out (using a cable) while also assisting with the pool climbing to reach the waterline level.

In a preferred embodiment, the cable is tethered to the pool cleaning robot via its handle. Other at least one embodiment may be possible.

During the pool exit and/or pool reentry phases, the pulling pressure exerted on the cable and handle may unfold and extend or retract the handle to a forward and/or upward or outward position whereby the distance between the cable and the pool cleaning robot housing is extended in order to increase the hoist span angle to be as wide as possible to enable smooth exiting and traversing of the sharp corner between the wall and the external environment of the pool.

The foldable/retractable handle 12 movement around the axis of rotation 25 of the handle, may be governed by a spring mechanism for deploying and folding the said handle that may be automatic (not shown). The handle of the pool cleaning robot will normally be in a folded or a "closed" position whereby the handle arms are fitted and/or locked into dedicated slots on the surface or within the housing of the pool cleaning robot in a way that does not interfere with normal cleaner operation (not shown). During the exiting phases from the pool, the handle will detach or release from the said slots and deploy to a retracted position or an "open" position.

Such a lock and release mechanism may be spring activated. Springs that force a movable element to be in a certain position are known in the art (for example—a spring arrangement of a mouse trap). Thus, when the force and/or torque applied on the handle exceeds a predefined threshold the spring (or any other restraining element) is overcome and the handle moved to an open position.

The handle may be configured to move upwards and downwards—instead of rotatably moving. This is illustrated in FIGS. 19-22. The handle 15 may be extended upwards (in relation to the bottom of the housing). This handle may include telescopic bars and/or telescopic subsections or any other mechanism for elevating or lowering an anchor area— which is the area that is connected to the cable 50. The telescopic handle sections or sub sections may emerge or reenter from or to slots in the housing by means of springs, or other spring like mechanisms, from built-in pipes or tubes located within the housing (not shown).

It should be noted that the telescopic handle may include second interfacing elements such as wheels 21-23 of FIG. 7 and/or may have one, two or more than three interfacing elements located at the lower and front part of the telescopic handle. There may also be provided a combination of handles 12 and 15—a telescopic upper part and a lower part that may be parallel to or oriented to the telescopic upper part—with one or more second interfacing wheels.

It is noted that when the pool cleaning robot has first interfacing elements that are wheels 13 and 14—without a track then the bottom of the pool cleaning robot may include second interfacing elements 16.

The pool cleaning robot electrical power cord connects the docking station to the handle by means a sturdy mechanical attachment, the cable further winds through the internal hollow arms of the handle and eventually exits the handle to connect to the housing and supply electrical power to the pool cleaning robot motors and its control box.

Figure 26:
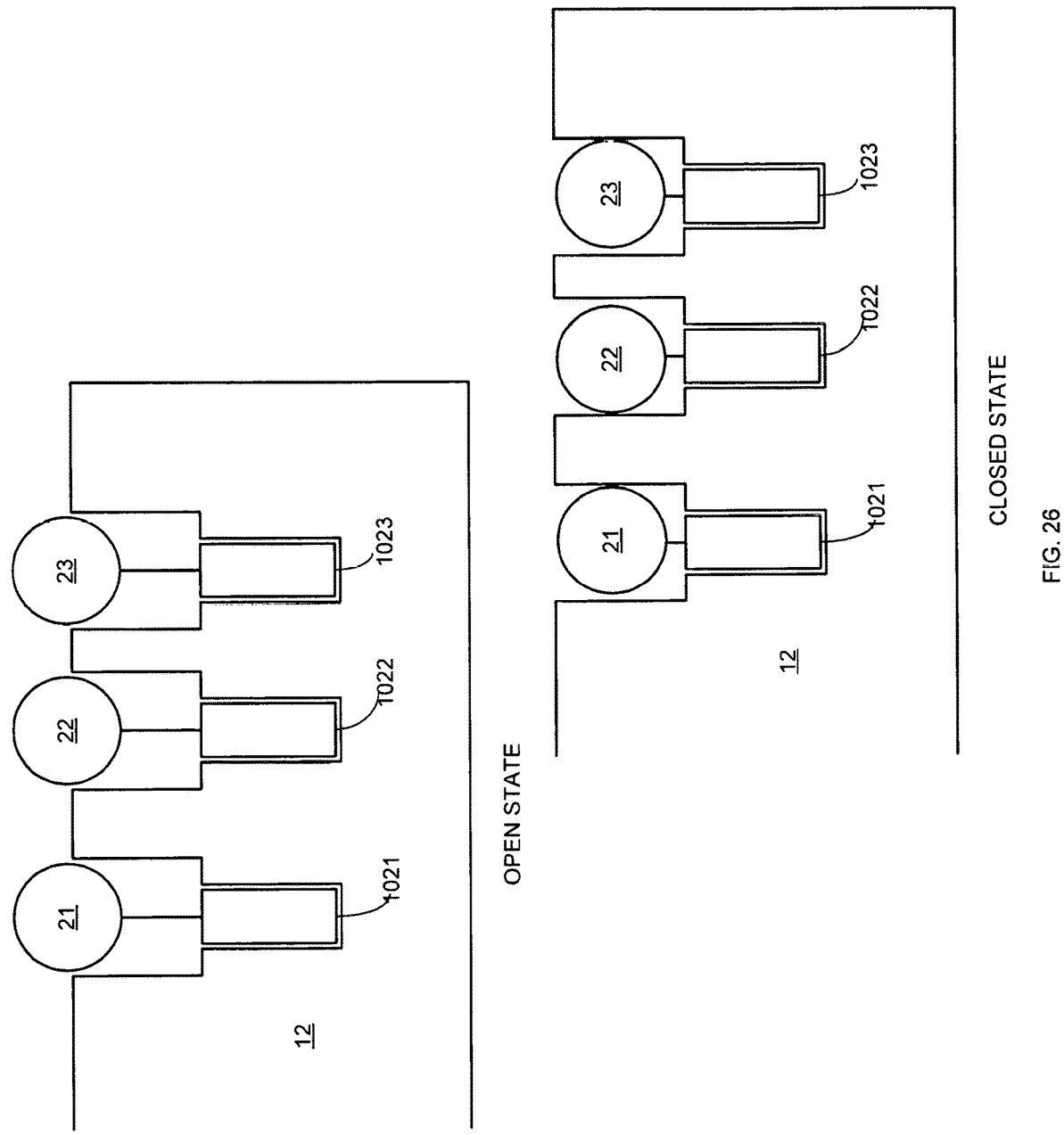
FIG. 26 illustrates a handle of a pool cleaning robot according to at least one embodiment of the invention.

During the exit phases, at least one auxiliary guide wheel, that is integrally attached to the handle and that may be oriented towards the pool floor or wall surfaces or outward from the bottom of the pool cleaning housing, may bump out to protrude and make contact with the said wall surfaces. FIG. 26 illustrates pistons 1021, 1022, 1023 located within handle 15 that may move the guide wheels 21, 22 and 23 between an open position in which the guide wheels extend out of handle and between closed position in which the guide wheels do not extend out of handle.

Said guide wheel may be a set of guide wheels that will form a set of multiple auxiliary foldable and retractable guide wheels to assist with the traversing, exiting and re-entry phases and processes of the pool cleaning robot. During the handle extraction or deployment to its fullest length, the guide wheels may simultaneously and progressively exit out from their slots. And vice versa, when folding the handle back into its folded position the guide wheels may simultaneously and progressively reenter into a folded position in the slots (not shown).

The guide wheels may have varying sizes and may be made of abrasion and chemical resistance natural or synthetic rubber such as polyurethane or silicone. Varying hardness (or softness) may be applied to different guide wheels.

Additional wheels and/or rollers may be located at the bottom of the housing in order to reduce friction and possible damage to either the pool surfaces/covers or the pool cleaning robot itself.

It should be noted that the pool cleaning robot may be filled with water and as soon as it reaches the waterline, water will incrementally evacuate the pool cleaning robot housing and it will become heavier as it moves out of water and gravity takes effect.

At a certain point in the exiting phases, the guide wheel will be forced against the corner meeting of the pool wall and external surface. This is the critical event where the reeling-in will utilize maximum energy to be able to cross the corner obstacle while pulling the entire weight of the pool cleaning robot.

After exiting, the pool cleaning robot may be further pulled to a parking spot on or near the docking station or caddy or be left to park near or by the pool side.

During external navigation to the said parking spot, the pool cleaning robot may assist with its driving system in order to speed up and facilitate the process.

A message may be wirelessly transmitted that the pool cleaning robot has exited the pool and is in parking position.

Due to obstacles that the pool cleaning robot may encounter, for example: pool cleaning robot is overweight whilst speed of reeling-out is too fast. The interactive communication between the pool cleaning robot and the reel/winch may actuate to implement corrective action measures for example by reducing exit speed or improving exit angle etc.

A torque sensor, torque transducer or a strain gage may be incorporated onto the motor/winch 90 on the rotating reel for measuring and recording the torque applied during the pulling of the pool cleaning robot. The controller 102 may receive and compare the data from one or more sensors (of the pool cleaning robot and/or of the docking station) with the preset thresholds for maximum and minimum torques allowed in the controlling of the exit or reentry process.

In other words, if the weight of the pool cleaning robot exceeds (for example 25 kgs) while exiting, then the controller may initiate an ON/OFF reeling mode whereby after each reeling and measuring the torque, the reeling will stop to allow for water evacuation from the vertically inclined pool cleaning robot. The stop may be replaced by slowing the speed of the exit process—slowing the rotation of the reel. The slowing may almost stop the progress of the pool cleaning robot. The control process may change the speed of rotation of the reel between more than two speeds during the exit process.

Any major obstacle encountered (for example a guide wheel stuck) may also signal for a temporary stop with back and forth torque testing or even to a reeling full stop sending the pool cleaning robot back into the pool. A low torque may be interpreted as a pool cleaning robot travelling horizontally so the reeling may set the rotation to a dead slow pre-set speed; and, vice versa when the pool cleaning robot travels on its own wheels/tracks to exit the docking station or the parking back into the pool. The pool cleaning robot travelling may signal the winch to incrementally release cable slack. At the pool edge, the winch will sense the increase weight while descending to the pool and resume an ON/OFF reeling mode until the pool cleaning robot has reentered the pool water and signals minimum torque levels.

The operation of returning or submerging the pool cleaning robot into the pool is performed in the reverse order whereby this will include a governing pool reentry or reintroduction program protocol at the winch/reel control box.

The said additional wheels and/or rollers that may be located at the bottom of the housing become particularly useful in a wheeled (non-tracked) pool cleaning robot embodiment.

The said additional wheels may be further driven by means of the on-board pool cleaning robot drive system.

For swimmers safety around the pool, the docking station/winch and/or pool cleaning robot may be equipped with a buzzer and flashing LED to draw attention that a reeling maneuver is underway.

Figure 23:
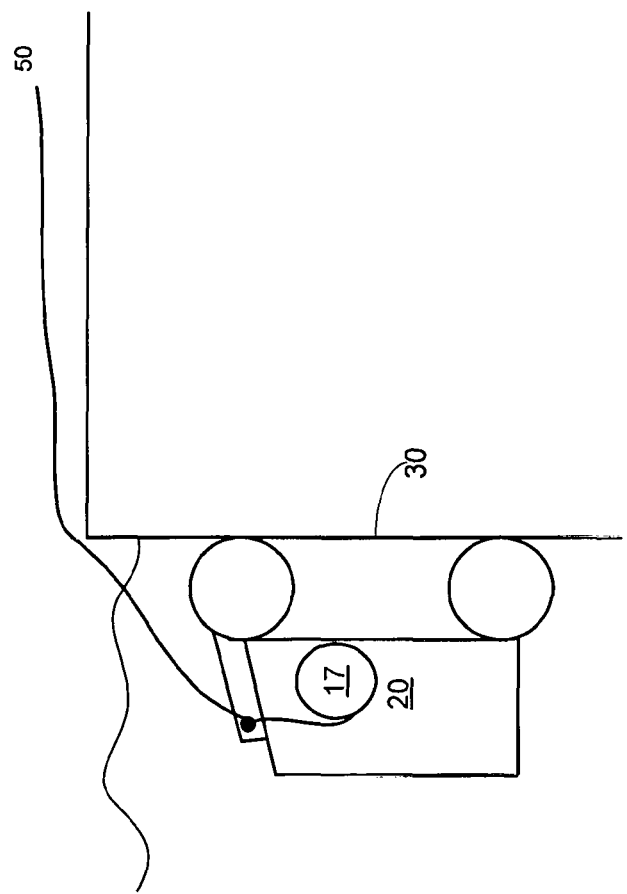
FIG. 23 illustrates a pool cleaning robot according to at least one embodiment of the invention.

FIG. 23 illustrates the winch 17 may be included in the pool cleaning robot. The winch of the pool cleaning robot may replace the winch of the external system. The pool cleaning robot may or may not include the handle. Cable 50 is connected between the pool cleaning robot and the external system—it may be fixed to a frame of the external system that may also include an electrical power supply pack. The winch may be controlled by the controller 102 of the pool cleaning robot or by the controller of the system.

Figure 24:
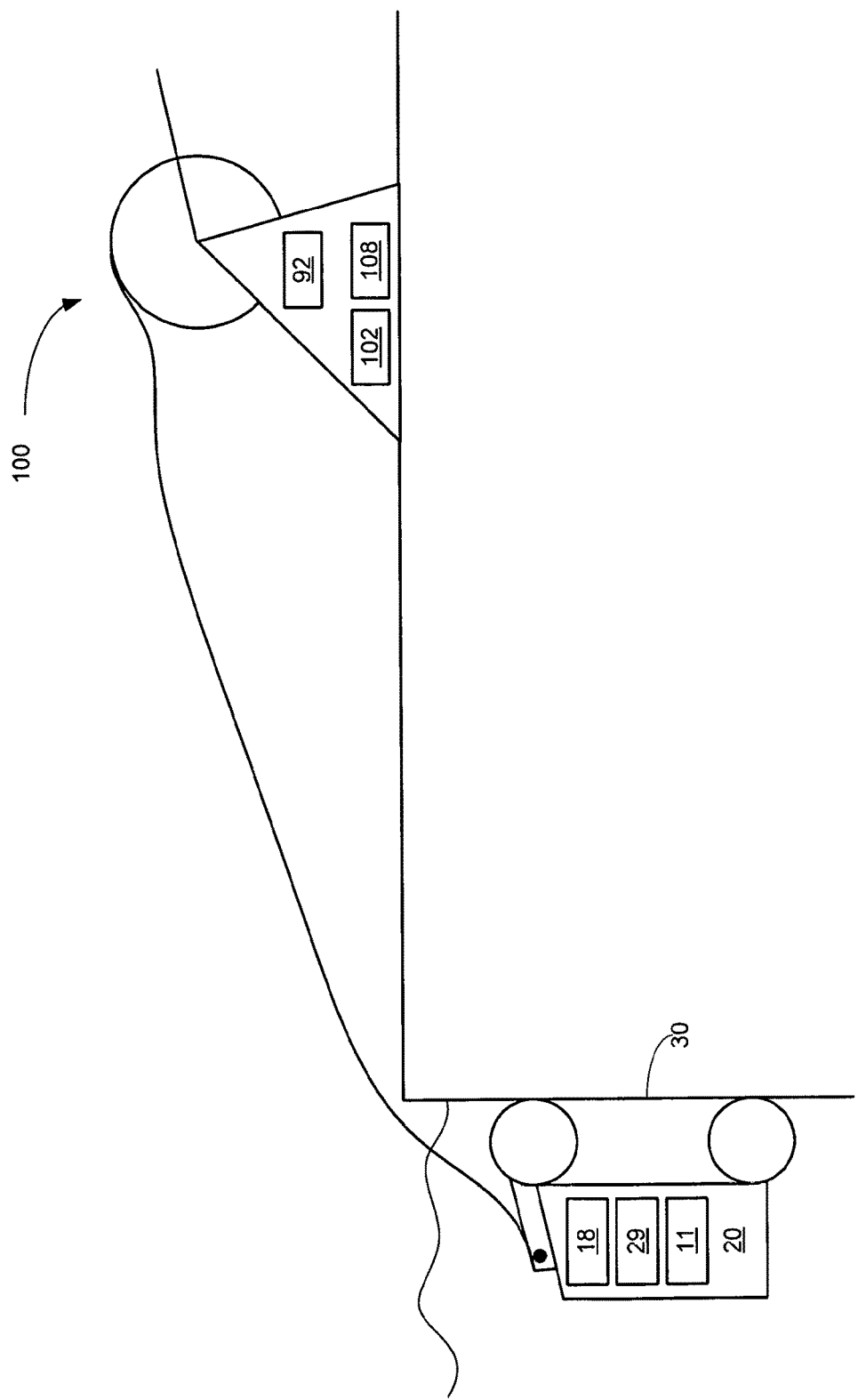
FIG. 24 illustrates a docking station and a pool cleaning robot according to at least one embodiment of the invention.

The pool cleaning robot and the external system may communicate with each other in order to send commands, status indications, sensor readings and the like. FIG. 24 illustrates pool cleaning robot 20 as including a communication unit 18 and the external system 200 as including a communication unit 108. The communication can be wireless and/or wired communication. Pool cleaning robot 20 may include one or more of the elements illustrated in the previous figures—such as controller 29 and/or sensor 11.

External system 100 may include one or more of the elements illustrated in the previous figures—such as controller 102 and/or sensor 92.

Figure 25:
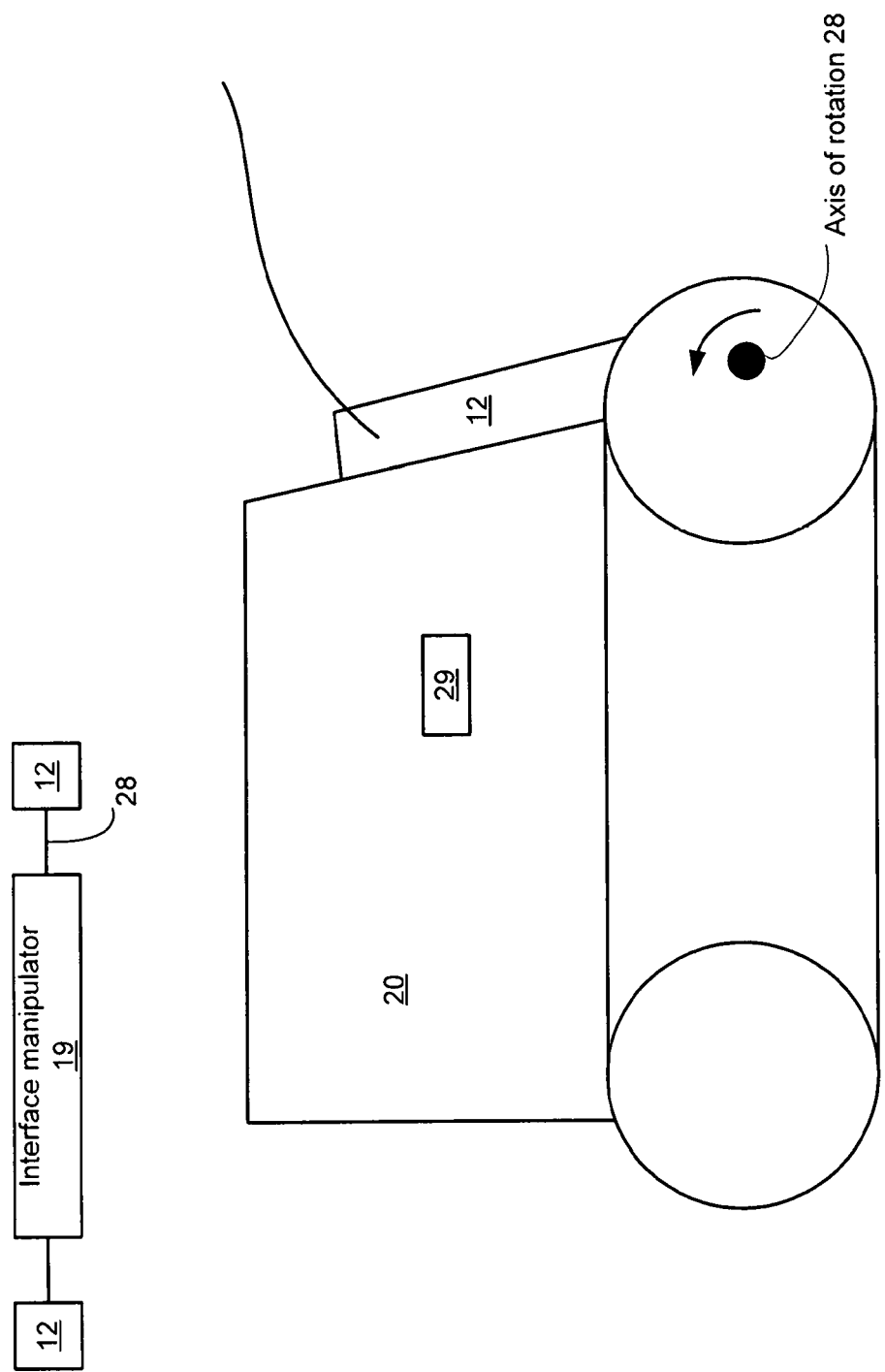
FIG. 25 illustrates a pool cleaning robot according to at least one embodiment of the invention.

FIG. 25 illustrates a pool cleaning robot 20 that includes an interface manipulator 19 for rotating handle 12 about a rotation axis 28. The interface manipulator 19 may be a motor that may be controlled by a controller 29.

FIG. 27 illustrates method 200 according to at least one embodiment of the invention.

Method 200 may include step 210 of pulling a cable that may be coupled to the pool cleaning robot during an exit process during which the pool cleaning robot exits the pool.

Step 210 may be followed by step 220 of controlling, by a controller of a system and/or the pool cleaning robot, the pulling of the cable based on an estimated or an actual amount of the fluid within the pool cleaning robot.

The system may be positioned at a predefined distance (for example between 30 centimeters and 2 meters or more) from an edge of the pool. No part of the system may be directly above the water of the pool.

The pulling may be executed by a motor and a reel; and wherein a part of the reel may be positioned below the edge of the pool. See, for example, system 200 of FIGS. 7-18.

Exiting the Pool while Forcing Water Out of the Pool Cleaning Robot

It has been found that forcing the water to exit the pool cleaning robot during an exit process from the pool may speed up the exit process and may reduce a load imposed, during the exit process, on the pool cleaning robot and/or a docking station that may participate in the exit process.

It should be noted that a third device (such as an additional controller) may participate in the pool exit process.

Additionally or alternatively, the load may be reduced by allowing the pool cleaning robot to depart from the sidewall of the pool. Instead of trying to rotate the pool cleaning robot from a vertical position (when climbing a vertical sidewall of the pool) the pool cleaning robot is allowed to depart from the sidewall of the pool and start the exit process while being non-vertical. This reduces the force that is required to apply when the pool cleaning robot exits the pool.

When the pool cleaning robot cleans the pool an impeller of the pool cleaning robot is rotated at a first direction thereby causing the water to enter through a first opening, (optionally pass through a unidirectional valve), pass through the filtering unit (to be cleaned) and then exit through a second opening.

The pool cleaning robot may force the water (inside the pool cleaning robot) to exit the pool cleaning robot by reversing the direction of rotation of the impeller. Accordingly, the impeller will be rotated at a second direction (opposite or counter to the first direction).

Rotating the impeller at the second direction may cause the water within the pool cleaning robot to exit through the first opening—in case where the water can exit from the first opening. For example—when there is no unidirectional valve that prevents the passage of the water from the filtering unit to the first opening.

Rotating the impeller at the first direction may cause the water to exit through one or more other openings.

The water may exit the pool cleaning robot as a water jet or in any other manner.

Figure 29:
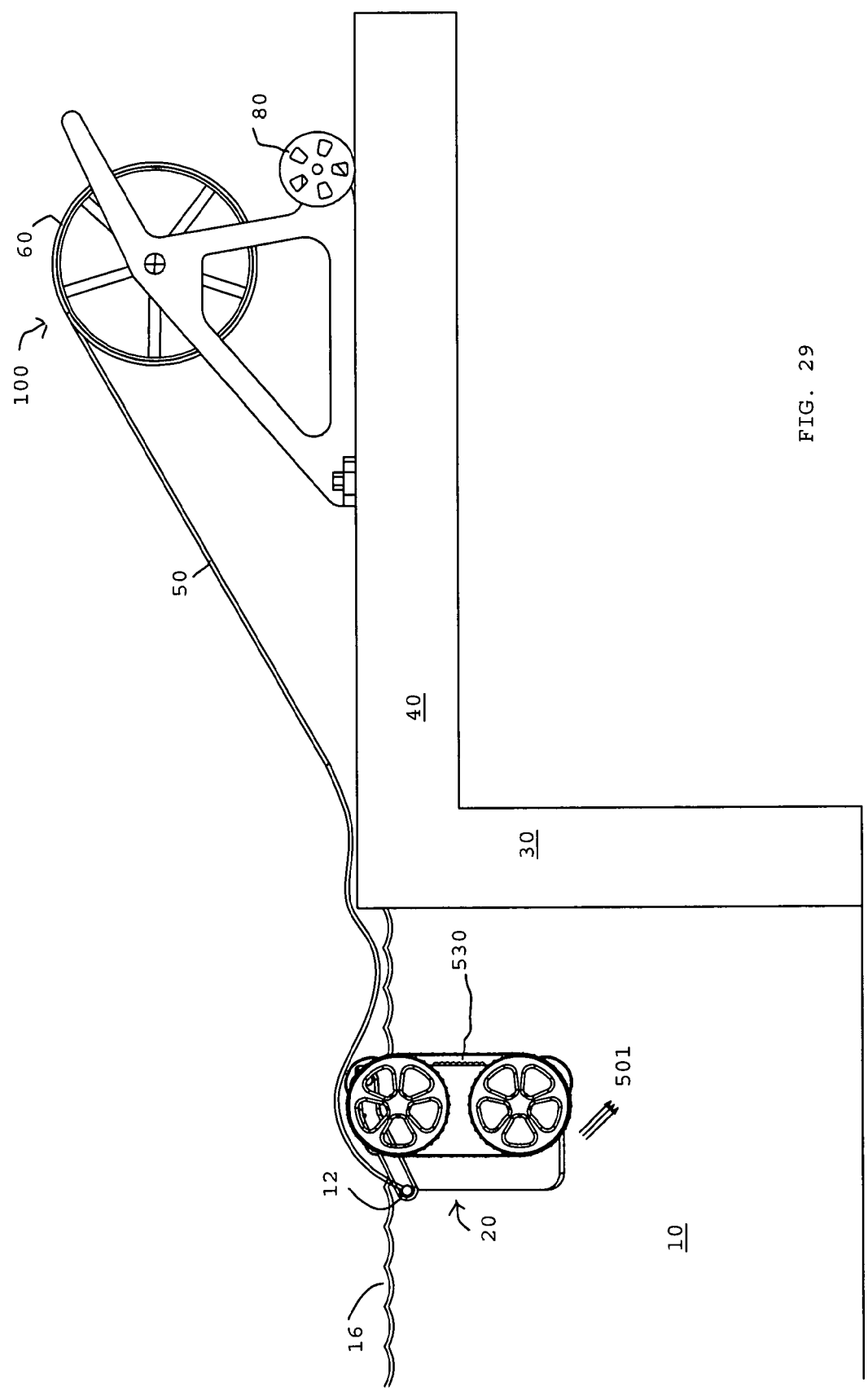
FIG. 29 illustrates a pool cleaning robot that is floating and is spaced apart from the sidewall of the pool, wherein the cable that connects the handle of the pool cleaning robot to a docking station is not tense and the handle is in a closed position according to at least one embodiment of the invention.
Figure 30:
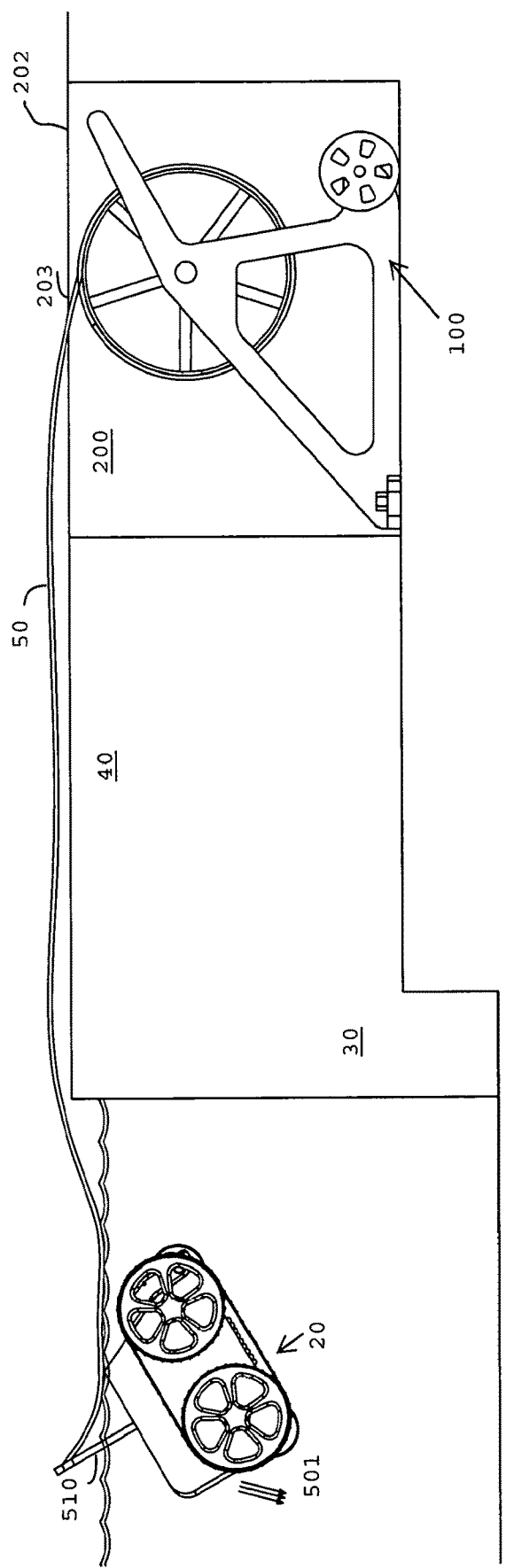
FIG. 30 illustrates a pool cleaning robot that is floating and is spaced apart from the sidewall of the pool, wherein the cable that connects an anchor to a docking station is not tense according to at least one embodiment of the invention.

FIGS. 29 and 30 illustrate jets of water 501 that exit from the pool cleaning robot from one or more openings (not shown). A non-limiting example of openings through which jets of water may exit are illustrated in US patent application serial number 2014/0230168 which is incorporated herein by reference in its entirety.

Figure 32:
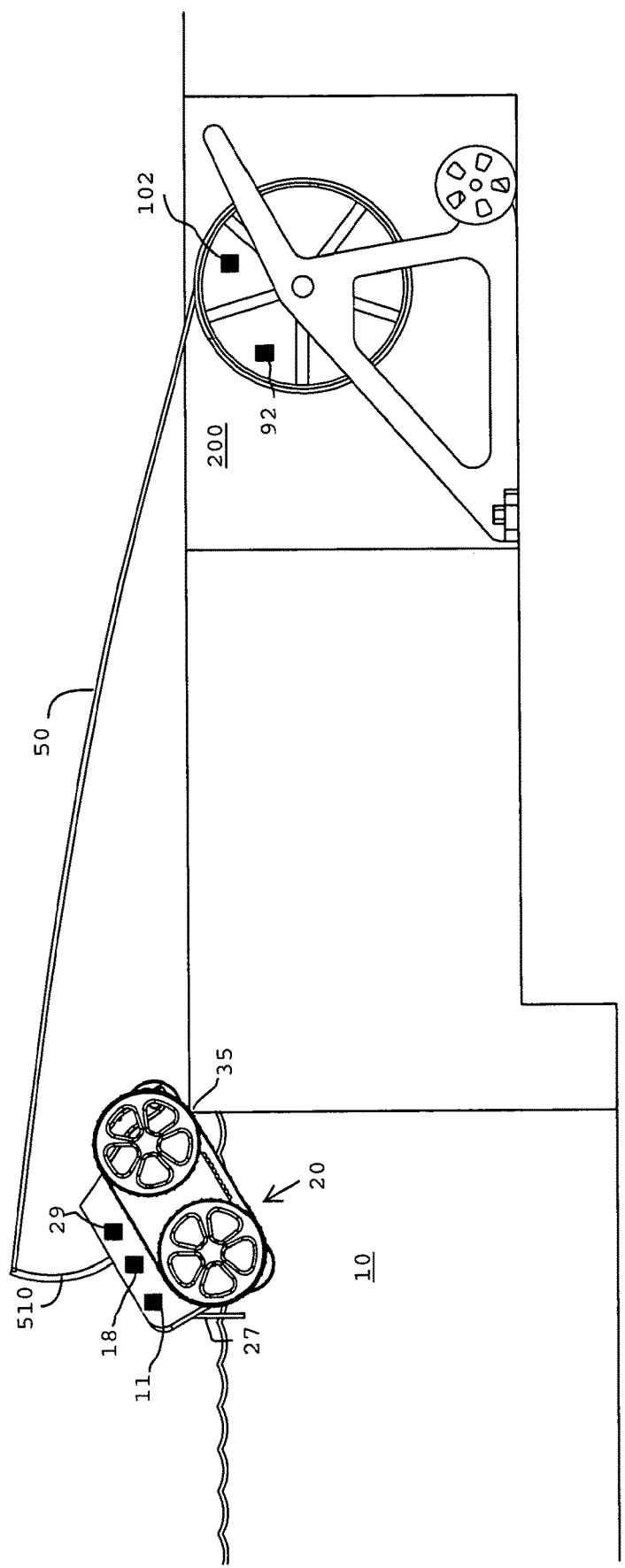
FIG. 32 illustrates a pool cleaning robot that is partly outside the water of the pool and is positioned in a first intermediate position in which water can be drained from the pool cleaning robot, wherein a front area of the bottom of the pool cleaning robot contacts the edge of the pool according to at least one embodiment of the invention.
Figure 33:
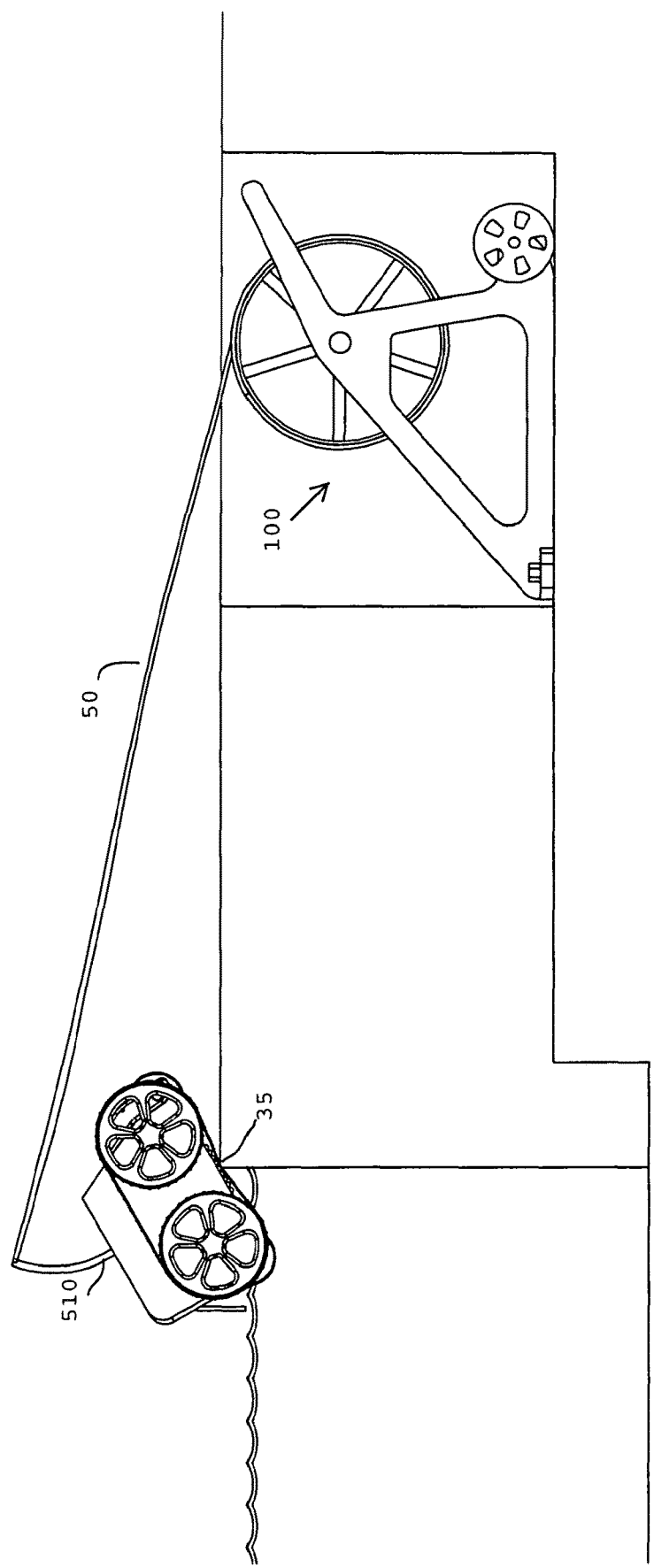
FIG. 33 illustrates a pool cleaning robot that is partly outside the water of the pool and is positioned in a second intermediate position in which water can be drained from the pool cleaning robot, wherein a second interfacing element of the pool cleaning robot contacts the edge of the pool according to at least one embodiment of the invention.

FIGS. 32 and 33 illustrate a rear door 27 that once opened allows the water to exit the pool cleaning robot through the rear door.

The openings may be formed in any part of the pool cleaning robot, may be of any shape and/or size. Especially, an opening through which water may exit may be positioned at the bottom of the housing, at the top of the housing and/or at any sidewall of the housing.

Any opening through which the water may exit may be continuously opened, may be opened only under certain circumstances (for example opened when the pool cleaning robot is at least partially outside the water, when the pool cleaning robot is at certain angle in relation to the horizon, and the like), may be closed while the pool cleaning robot is submerged and cleans the pool, and the like.

Each opening may be covered by a cover and/or seal and/or a door for closing the opening.

Pool Exit Process

Figure 28:
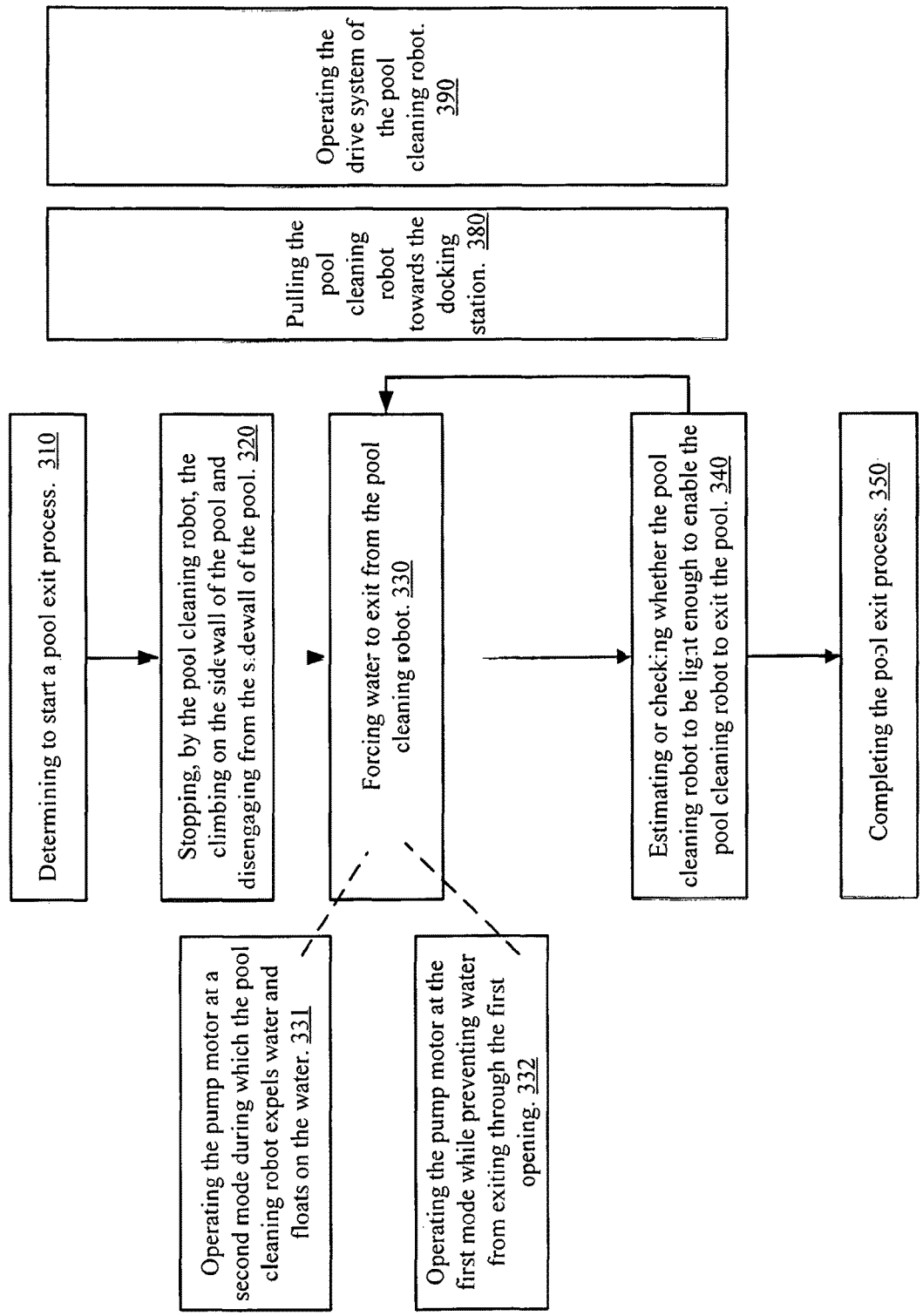

FIG. 28 illustrates method 300 according to at least one embodiment of the invention.

Method 300 starts by step 310 of determining to start a pool exit process. The pool exit process may start when the pool cleaning robot already climbed at least some of the sidewall of the pool. The pool cleaning robot may have reached the waterline, may be positioned at a predefined distance below the waterline (for example 5, 10, 15, 20, 25, 30, 35, 40 centimeters below the waterline), may be partially above the waterline (a part of the robot may be above of the waterline), may be positioned at a certain position in relation to the edge of the pool, in relation to the bottom of the pool, at the bottom of the pool and the like.

Step 310 may include determining to start the pool exit process at a predefined period (for example one or few minutes) before an end of a cleaning cycle. Alternatively—step 310 may be responsive to the state of the pool cleaning robot (end of cycle time, cleanliness of the filtering unit, an occurrence of a malfunction, sensing a certain high or low pressure/load of any other condition, such as the entering of a person to swim in the pool, that may require the pool cleaning robot to exit the pool.) For example—step 310 may include determining to exit the pool when a filter bag is sensed to be unclean, partially clogged or clogged and/or wherein the pool cleaning robot senses that there is a mechanical difficulty. The filtering unit may include one or more filters and the cleanliness of the filtering unit may include the cleanliness of the one or more filters.

Step 310 may also include determining to start the pool exit process when people enter the pool (their presence may be sensed by a sensor such as a pool sensor), when a person requests (for example by remote control) that the pool cleaning robot exits the pool and the like.

The position of the pool cleaning robot may be sensed by a height sensor, by a water pressure sensor, or by any one or more other sensors. For example, the location of the pool cleaning robot in relation to the bottom of the pool may be determined by sensing that the robot started to climb a sidewall (for example by an accelerometer, by sensing the load imposed on the motor by or any other angle sensor) and measuring the distance that pool cleaning robot passes from the beginning of the climbing. The distance may be measured by sensing time and/or velocity of the pool cleaning robot, by counting the rotations of the motor engine or wheel or any driving element of the pool cleaning robot).

Additionally or alternatively, the position of the pool cleaning robot may be sensed by a sensor that differs from the pool cleaning robot.

The sensor may be located within the pool, connected to the pool and/or positioned in proximity to the pool and/or positioned in any location that may cover the pool or at least an area of the pool from which the pool cleaning robot may exit the pool. For example—the sensor may be positioned at an area that is close to an external docking station at a certain distance (for example 5, 10, 15, 20, 25, 30, 35, 40 centimeters below the waterline) below the edge of the pool.

The sensor may belong to the docking station.

The sensor may sense the location of the pool cleaner using image processing, magnetic or other proximity sensing, acoustic processing and the like. Once sensing that the pool cleaning robot reached a location that should trigger the pool exit process the unit may inform the pool cleaning robot to start the pool exit process.

The preliminary pool exiting procedure may start with the electrical cord starting to pull the pool cleaner (cord becomes tense) while it is still somewhere at the bottom of the pool busy with its cleaning cycle time. The endeavor is to bring the cleaner near the meeting point between floor and wall, in the area and, importantly, in the vicinity of the docking station that serves as the optimal exit point en route to the docking station. The cord may then loosen up to allow the pool cleaner to start climbing the wall.

Step 310 may be followed by step 320 of stopping, by the pool cleaning robot, the climbing on the sidewall of the pool and disengaging from the sidewall of the pool.

Step 320 may include stopping the pump motor from operating in a first mode during which the pool cleaning robot climbs on the sidewall of the pool. In this mode the pump motor rotates an impeller at a first direction thereby causing water to be sucked to the pool cleaning robot through a first opening and assisting in maintaining the pool cleaning robot in contact with the sidewall of the pool.

Stopping the pump motor from operating in the first mode causes the pool cleaning robot to disengage from the sidewall of the pool. (See FIG. 29).

Step 320 may be followed by step 330 of forcing water to exit from the pool cleaning robot.

Step 320 may be followed by step 330 after a predefined period lapsed from the beginning of step 320. The predefined period may have any value, it may range between 0.1 and 30 seconds but may be more than 30 seconds.

During the predefined period the pool cleaning robot may be detached from the sidewall of the pool.

Step 330 may include operating the pump motor at a second mode during which the pool cleaning robot expels water and floats on the water (at the waterline).

In the second mode the pump motor rotates the impeller at a second direction that is opposite to the first direction. This causes water to exit through one or more openings of the pool cleaning robot.

Step 330 may also include allowing air to enter the pool cleaning robot. The air may be sucked by the impeller.

Step 330 may be followed by step 340 of estimating or checking whether the pool cleaning robot to be light enough to enable the pool cleaning robot to exit the pool. The pool cleaning robot may be light enough when it expelled all or a substantial quantity of the water in the pool cleaning robot and/or when the weight of the water within the pool cleaning robot is below a water weight threshold and/or when the overall weight of the pool cleaning robot and the water within the pool cleaning robot is below an overall pool cleaning robot weight.

The water weight threshold and/or the overall pool cleaning robot weight or any other criterion related to the exit of the pool cleaning robot from the pool may be set by an operator of the pool cleaning robot, by a manufacturer of the pool cleaning robot, and the like.

The checking may include using a group of one or more sensors. At least one sensor of the group may be included within the pool cleaning robot (see for example sensor 11 of FIGS. 7 and 32).

Additionally or alternatively, at least one sensor of the group may be located elsewhere (see for example sensor 92 of FIGS. 2-3 and 32).

The estimating may include estimating that the pool cleaning robot is light enough by tracking the progress of the exit process and estimating the amount of water that was drained from the pool cleaning robot. For example—measuring how long the pool cleaning robot was floating, how long the pool cleaning robot was at different positions (for example—the positioned illustrated in FIGS. 29, 30, 31, 32 and 33) may indicate the amount of water that was expelled—and thus the amount of water that still exists in the pool cleaning robot.

The estimation may be based on the time lapsed from the beginning of the pool exit process (of time lapsed from any point of the pool exit process). This time may be compared to a predefined period of time that were found to provide adequate water expelling.

If it is determined that the pool cleaning robot is not light enough, then step 340 is followed by step 330.

Step 330 and/or step 340 may be executed by the pool cleaning robot (for example by controller 29 of FIG. 32), by the docking station (for example by controller 102 of FIG. 32), by both the pool cleaning robot and the docking station and the like.

For example, the weight of the pool cleaning robot may be sensed (directly or indirectly) by sensor 92 of the docking station. Indirectly sensing may involve sensing the torque and/or strain of cable 50. The detection signals of sensor 92 may be sent to the pool cleaning robot that may determine whether the pool cleaning robot is light enough. Alternatively, controller 102 may determine whether the pool cleaning robot is light enough and send the determination to whether the pool cleaning robot is light enough. Alternatively, sensor 11 may sense (directly or indirectly) the weight of the pool cleaning robot. Indirectly may mean that sensor 11 senses the amount of fluid within whether the pool cleaning robot is light enough (for example, by means of two water sensing electrodes). The detection signals of sensor 92 may be processed by controller 29 and/or may be sent to the docking station that will determine whether the pool cleaning robot is light enough.

It is noted that the docking station may weigh the pool cleaning robot when the pool cleaning robot is located in the docking station. This weight measurement may be used to evaluate whether the pool cleaning robot was really light enough—and may be used for adjusting step 340. For example—the duration of step 330 may be shortened if the weight of the pool cleaning robot is below the overall weight threshold. Yet for another example—the duration of step 330 may be increased if the weight of the pool cleaning robot is above the overall weight threshold.

If it is determined that the pool cleaning robot is light enough, then step 340 is followed by step 350 of completing the pool exit process.

Method 300 may include step 380 of pulling the pool cleaning robot towards the docking station. Step 380 may be executed by the docking station and/or by the pool cleaning robot.

Step 380 may be executed during at least one or more parts of steps 340, 340 and 350.

Step 380 may include assisting, by the docking station, the pool cleaning robot to pass the edge of the pool and move towards the docking station. See, for example, FIGS. 33 and 34.

Method 300 may also include step 390 of operating the drive system of the pool cleaning robot.

Step 390 may be executed in parallel to at least one or more parts of steps 330, 340 and 350.

Step 390 may include changing a speed of propagation of the pool cleaning robot during the pool exit process.

For example, the velocity of propagation of the pool cleaning robot may be increased during step 350 (in comparison to the velocity of propagation during steps 330 and 340).

Yet for another example, when the pool cleaning robot and/or the docking station senses that the pool cleaning robot encounters an obstacle (for example—see FIGS. 32 and 33—when the pool cleaning robot contacts the edge of the pool) the drive system of the pool cleaning robot may perform multiple corrective changes of direction (back and forth).

Yet for a further example—when an area of the pool cleaning robot that is not the front edge of the pool cleaning robot (for example see FIGS. 32 and 33) contacts the edge of the pool—the pool cleaning robot may be maintained at the same position—and the driving system of the pool cleaning robot may provide enough drive to maintain the pool cleaning robot at that position—without slipping into the pool.

The pool exit process, a pool re-entry process and/or the progress of one or more steps of method 300 may be assisted by reading information received from one or more sensor. For example—step 310 may start when the pool cleaning robot is at a certain position, the pool cleaning robot may enter or exit space 200 and/or enter or exit the docking station 200, the cover 202 may be positioned in one or more positions based on sensor readings.

Figure 39:
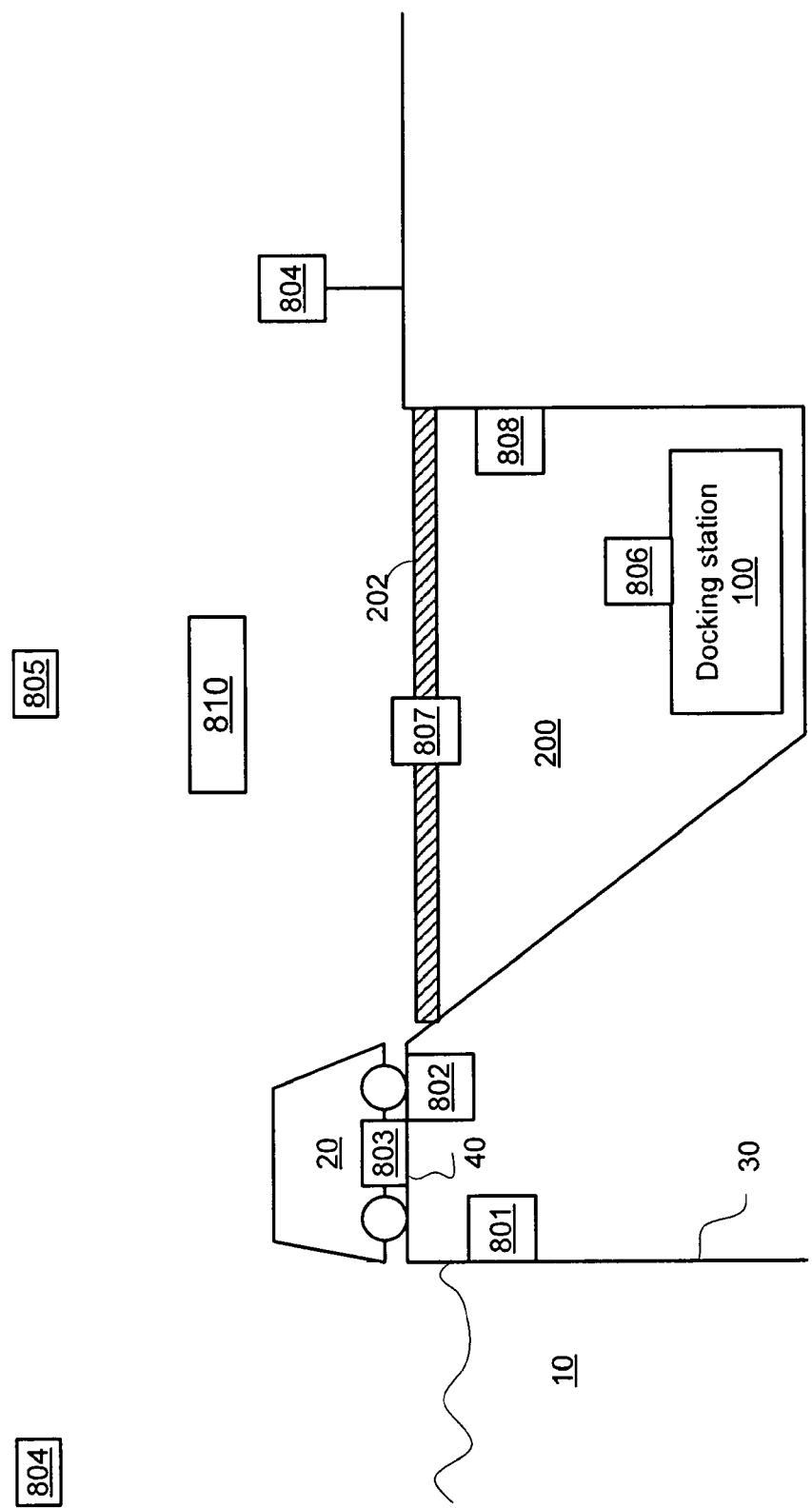
FIG. 39 illustrates water of a pool, a sidewall of a pool, an external surface of the pool, space, docking station, pool cleaning robot and cover according to at least one embodiment of the invention.

FIG. 39 illustrates water 10 of a pool, a sidewall 30 of a pool, an external surface 40 of the pool, space 200, docking station 100 included in space 200, pool cleaning robot 20, cover 202 and multiple sensors 801, 802, 803, 804, 805, 806, 807 and 808 according to various embodiments of the invention.

Sensors 801-808 illustrates various examples of locations of sensors—sensor 801 is located within sidewall 30 and/or connected to sidewall 30 and may sense the location of the pool cleaning robot 20 within the water of the pool.

Sensor 802 is located within external surface 40 and/or attached to the external surface 40. Sensor 803 is located above the external surface 40. Sensor 804 is positioned after space 200. Sensor 807 is attached to cover 202 and/or embedded to the cover 202. Sensor 804 is positioned above cover 202. Sensor 804 is located above the pool. Each one of sensors 802, 803, 804, 805 and 807 may sense the movement of the pool cleaning robot 20 on the external surface 40 and/or the climbing of the pool cleaning robot 20 on the edge of the pool. Sensors 804 and 805 may also sense the movement of the pool cleaning robot 20 within the pool.

Sensors 808 is located within space 200 and sensor 806 is part of the docking station 200 (or attached to the docking station) and may sense the movements of the pool cleaning robot 20 within space 200.

Sensors 801-808 may be image sensor, visual sensor, acoustic sensors, radiation based sensors, radio frequency sensors, acoustic sensor, magnetic sensors and the like.

FIG. 39 also illustrates an external controller 810 (external in the sense that the external controller does not belong to the pool cleaning robot 20 and does not belong to the docking station 100)—that may participate in controlling the exit of the pool cleaning robot 20 from the pool, the entering of the pool cleaning robot 20 to space 200, the movements of cover 202, the operation of the docking station, and the like.

For safety purposes, cover 202 may include a buzzer and/or a flashing LED to draw swimmers attention to when a cover opening or closing manoeuvre is underway.

External controller 810 may receive information from either one of sensors 801-808 and/or from the pool cleaning robot 20 and/or from the pool cleaning robot 20 and control the pool exit process, a pool re-entry process, the cleaning of pool cleaning robot 20 or any maintenance operation performed by the docking station 100. For example, the external controller 810 may receive weight and/or stress reading and determine whether the pool cleaning robot 20 may exit the pool.

Figure 47A:
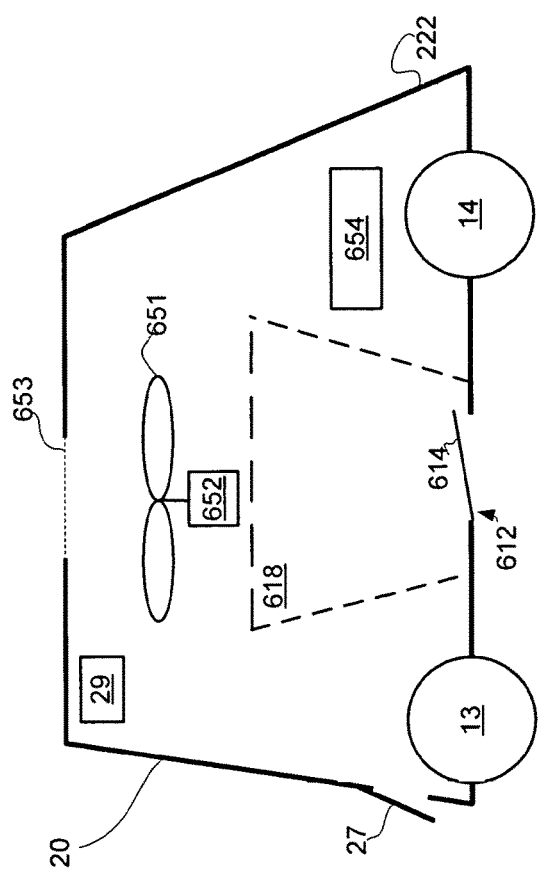
FIGS. 47A-47B illustrate a pool cleaning robot according to various embodiment of the invention.
Figure 47B:
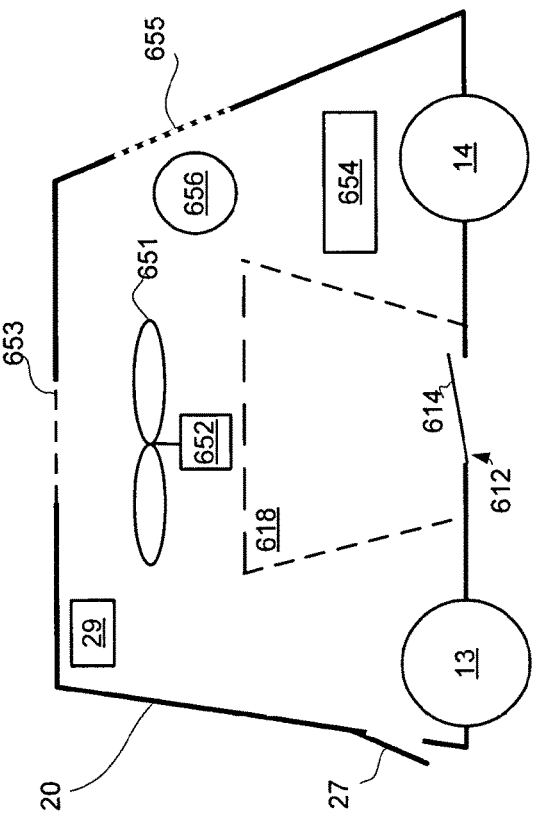

FIGS. 47A and 47B illustrate pool cleaning robot 20 according to at least one embodiment of the invention.

FIG. 47A shows a pool cleaning robot 20 that includes controller 29, housing 222, an impeller 651, a pump motor 652, filtering unit 618, rear door 27, drive motor 654, valve 614, wheels 13 and 14 and openings such as first opening 612 and second opening 653.

Pool cleaning robot 20 may or may not include any component illustrated in any of the figures as belonging to the pool cleaning robot.

When operating in a first mode the pump motor 652 may rotate the impeller 651 at a first direction thereby forcing fluid to enter the pool cleaning robot from first opening 612, pass through valve 614 be filtered by filtering unit 618 (includes one or more filters) and exit the pool cleaning robot via second opening 653.

When operating in a second mode the pump motor 652 may rotate the impeller 651 at a second direction (opposite to the first direction) thereby forcing fluid to enter the pool cleaning robot 20 from second opening 653, and exit through the third opening 27' that is selectively covered by rear door 27.

In a pool cleaning robot 200 that does not include valve 614 (or otherwise allows fluid to exit the pool cleaning robot via the first opening 612, and when operating at the second mode the impeller 651 may force fluid to enter the pool cleaning robot 20 through the second opening 653 and exit through the first opening 612.

FIG. 47B illustrates a pool cleaning robot 20 that includes additional openings such as fourth opening 656 and a fifth opening 655. Fourth opening 655 may be formed at one side of the pool cleaning robot 20 while another opening (not shown) may be formed at an opposite side of The pool cleaning robot 20.

The pool cleaning robot 20 may have multiple openings that may be located at any location of the housing 222 and may have any shape and size. These openings may be used for jetting fluid (see jets 501 of FIG. 10) that may also assist in driving and/or maneuvering the pool cleaning robot 20.

Each opening may be preceded by a fluid conduit and/or a fluid manipulator for selectively driving fluid through the opening. See, for example, the different openings for jetting water and the fluid manipulation components of US patent application serial number 2014/0230168 which is incorporated herein by reference in its entirety.

Figure 48C:
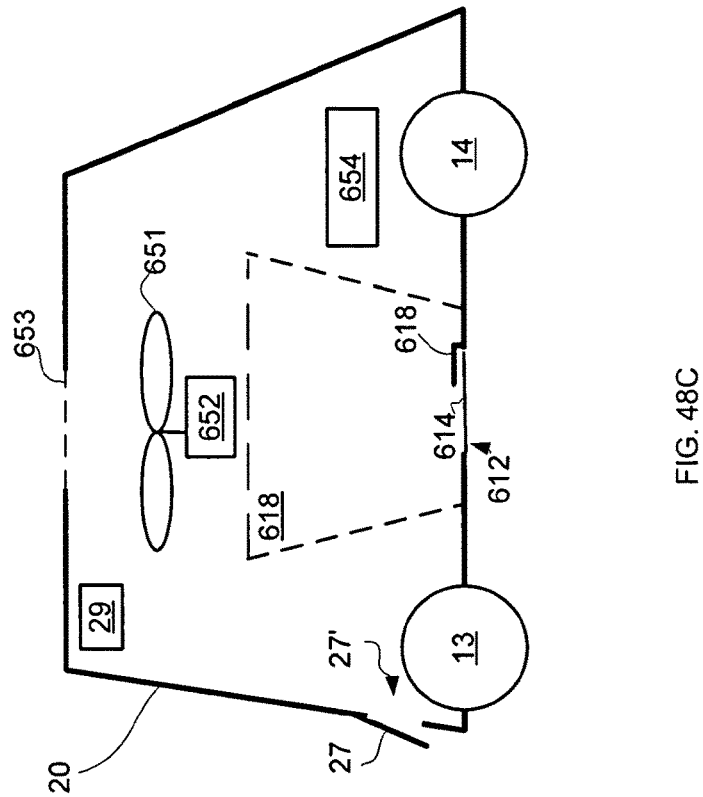
FIGS. 48A-48C illustrate a pool cleaning robot according to various embodiment of the invention.
Figure 48A:
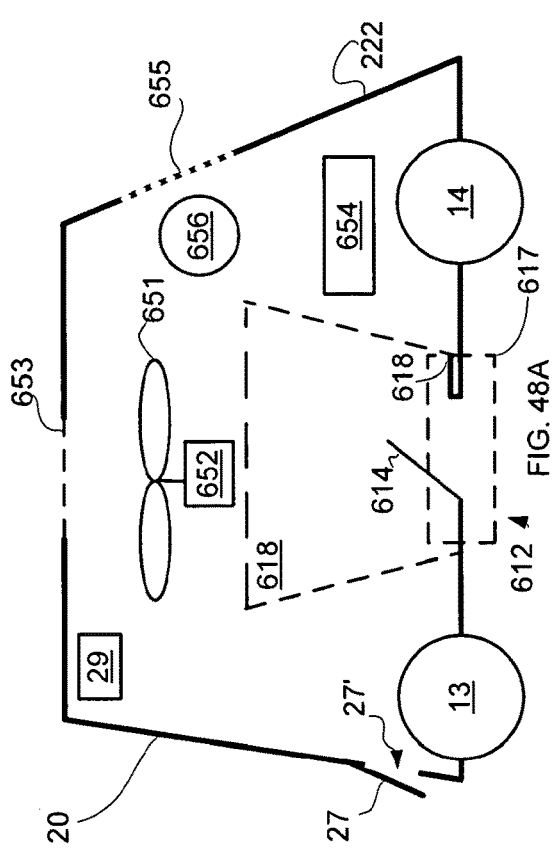
Figure 48B:
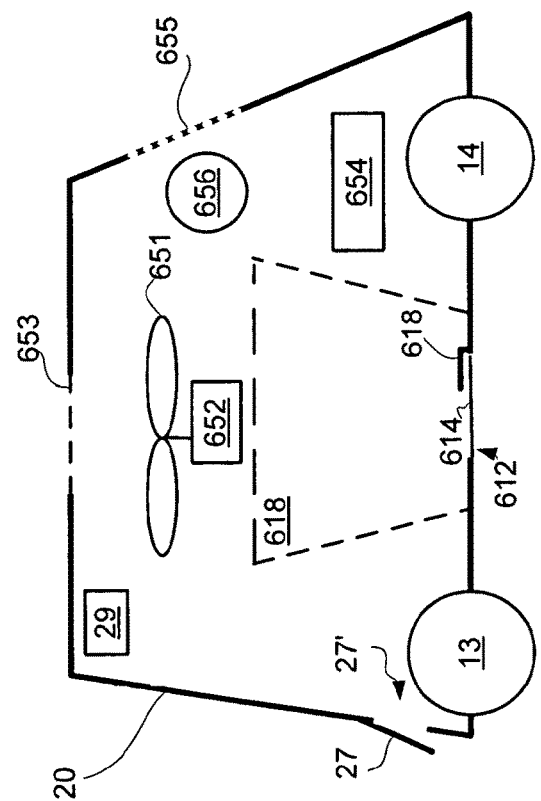

FIGS. 48A, 48B and 48C illustrate pool cleaning robot 20 according to at least one embodiment of the invention.

FIG. 48A illustrates a pool cleaning robot 20 that includes controller 29, housing 222, an impeller 651, a pump motor 652, filtering unit 618, rear door 27, third opening 27', drive motor 654, wheels 13 and 14 second opening 653 and fluid control unit 617.

Fluid control unit 617 control the passage of fluid through the first opening 617.

When the pool cleaning robot 20 cleans the pool (for example when it is in a first mode) the fluid control unit 617 allows the passage of water into the pool cleaning robot 20 (through first opening 612) and prevents the passage of fluid from the pool cleaning robot 20 to the pool (through first opening 612).

When the pool cleaning robot 20 wishes to extract fluid from the pool cleaning robot 20 (during a third mode) while preventing fluid to enter the pool cleaning robot through first opening 612 the fluid control unit 617 may prevent the passage of fluid into the pool cleaning robot 20 through first opening 612.

This may allow the pool cleaning robot 20 to extract or empty water during a pool exit process (or at any other time) without changing the direction of rotation of the impeller.

The fluid control unit 617 may include valve that may be operate as a uni-directional valve such as a flexible rubber or as a seal.

The fluid control unit 617 may include a stopper or limiter 618 for preventing the valve 614 from opening when the pool cleaning robot 20 is operated at the third mode.

FIGS. 48A-48C illustrate a limiter 618 that may rotate about an axis and selectively prevent valve 614 from opening or not prevent valve 614 from opening.

FIG. 48A illustrates the pool cleaning robot 20 when operating at the first mode while FIGS. 48B and 48C illustrate the pool cleaning robot 20 when operating at the second or third mode.

Pool cleaning robot 20 may or may not include any component illustrated in any of the figures as belonging to the pool cleaning robot.

When operating in a first mode the pump motor 652 may rotate the impeller 651 at a first direction thereby forcing fluid to enter the pool cleaning robot from first opening 612, pass through valve 614 be filtered by filtering unit 618 (includes one or more filters) and exit the pool cleaning robot via second opening 653.

When operating in a second mode the pump motor 652 may rotate the impeller 651 at a second direction (opposite to the first direction) thereby forcing fluid to enter the pool cleaning robot 20 from second opening 653, and exit through the third opening 27' that is selectively covered by rear door 27 or through any uni-directional valve such as a flexible rubber or a seal mentioned above.

U.S. patent application Ser. No. 14/023,557 filing date Sep. 11, 2013 illustrates uni-directional valve formed at the bottom of the external space and is arranged to facilitate draining of fluid at the withdrawal of a pool cleaning apparatus from the water.

When executing method 300 the pool cleaning robot, instead of operating in the first mode, the pool cleaning robot may operate at a third mode and continue to rotate at the first direction (as of the first mode) while preventing water from exiting through the first opening.

This is reflected in step 332 of FIG. 39.

FIGS. 29-34 illustrates various phases in the execution of method 300.

FIG. 29 illustrates pool cleaning robot 20 that is floating (the rear end of pool cleaning robot 20 is above the waterline 16) and is spaced apart from the sidewall 30 of the pool.

Cable 50 (that connects the handle 12 of the pool cleaning robot 20 to docking station 100) is not tense and the handle 12 is in a closed position.

FIG. 29 also illustrates jets of water 501 that are expelled from pool cleaning robot 20, water 10 in which most of pool cleaning robot 20 is immersed), external surface 40 and pool edge interfacing elements 530 (such as wheels or tubes located at a central area of the bottom of pool cleaning robot 20). The docking station is illustrated as including reel 60 and wheel 80.

FIG. 30 illustrates pool cleaning robot 20 that is floating (rear top edge is above waterline 16) and is spaced apart from the sidewall 30 of the pool. Cable 30 connects a third interfacing element (such as anchor 510) to a docking station 100 is not tense.

Anchor 510 interfaces between cable 50 and pool cleaning robot 20. The top edge of anchor 510 may or may not be positioned above the housing of pool cleaning robot 20. Anchor 510 may or may not be connected to the top of the housing of pool cleaning robot 20. The cable may be threaded through the interface.

FIG. 30 also illustrates jets of water 501 that are expelled from pool cleaning robot 20, water 10 in which most of pool cleaning robot 20 is immersed). In FIG. 30 the docking station 100 is positioned within space 200 that may be covered by cover 202. An aperture 203 may be formed within the cover 202 and cable 50 may pass through aperture 203.

Cover 202 may be located at the same height as external surfaced 40 or may be located at a different height. Cover 202 can be a continuous cover or may include multiple apertures. Cover 202 may be a mesh or may have any shape and size.

Cover 202 may open in various manners. For example, one edge of the cover may be elevated while another edge of cover 202 may maintain at the same height. Both edges of the cover may be elevated, the cover may be coupled (in a detachable or non-detachable manner) to the external surface 40 (or any other element). The cover 202 may slide along substantially horizontal tracks, may be rolled on a reel, and the like. The cover surface may be flush with 40.

The configuration illustrated in FIG. 30 is beneficial in the sense that when the cover 202 is closed the cover 202 does not form an obstacle and does not disturb people from walking near the edge of the pool.

The cover 202 may include one or more solar panels.

Figure 31:
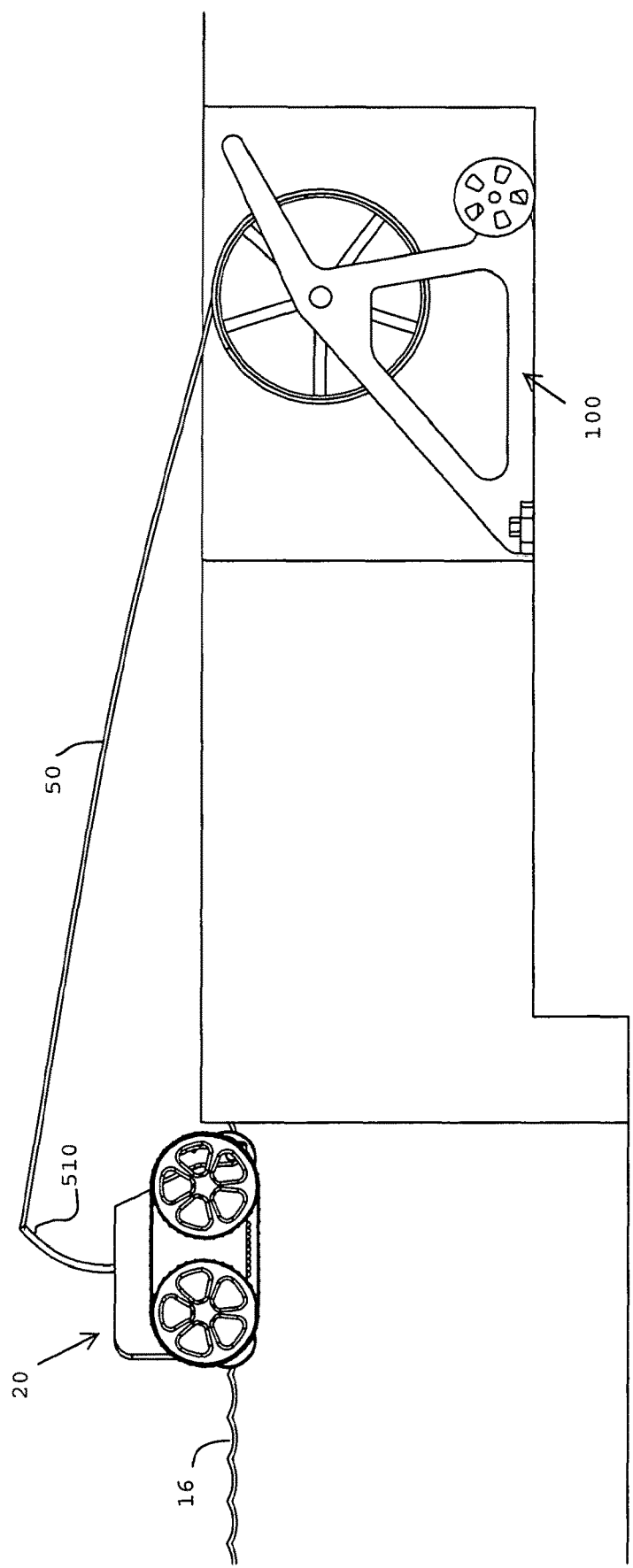
FIG. 31 illustrates a pool cleaning robot that is floating and is proximate to the sidewall of the pool, wherein the cable that connects an anchor to a docking station is tense according to at least one embodiment of the invention.

FIG. 31 illustrates pool cleaning robot 20 that is floating (most of pool cleaning robot 20 is above waterline 16) and is proximate (for example—between 1-15 centimeters) to the sidewall 30 of the pool. Cable 50 is tense. Anchor 510 is bent towards docking station 100. Pool cleaning robot 20 is in a horizontal position.

FIG. 32 illustrates pool cleaning robot 20 that is partly outside the water 10 of the pool and is positioned in a first intermediate position in which water can be drained from the pool cleaning robot 20. A front area of the bottom of the pool cleaning robot contacts the edge 35 of the pool. The front area precedes second interfacing elements 530.

The pool cleaning robot 20 is tilted—the front edge of pool cleaning robot 20 is higher than edge 35 of the pool while the rear edge of the pool cleaning robot 20 is submerged and is lower than the edge 35 of the pool.

In FIG. 32 a rear door 27 is partially submerged and is open—is detaches from the housing (for example by gravity) and the water may be drained through rear door 27.

The door 27 may be pivotally coupled to the housing. See, for example door 908 of US patent application serial number 2014/0230168 which is incorporated herein by reference in its entirety.

FIG. 32 illustrates pool cleaning robot 20 as further including (a) controller 29 for controlling the operation of pool cleaning robot 20, (b) sensor 11, and (c) communication module 18.

FIG. 32 illustrates docking station 100 as further including controller 102 and sensor 92.

Docking station 100 is located within space 200.

FIG. 33 illustrates pool cleaning robot 20 that is partly outside the water of the pool (most of the pool cleaning robot 20 is outside the water—the rear bottom part of pool cleaning robot 20 is submerged).

Pool cleaning robot 20 is positioned in a second intermediate position in which water can be drained from the pool cleaning robot.

Second interfacing element 530 of the pool cleaning robot contacts the edge 35 of the pool.

Docking station 100 is located within space 200.

Figure 34:
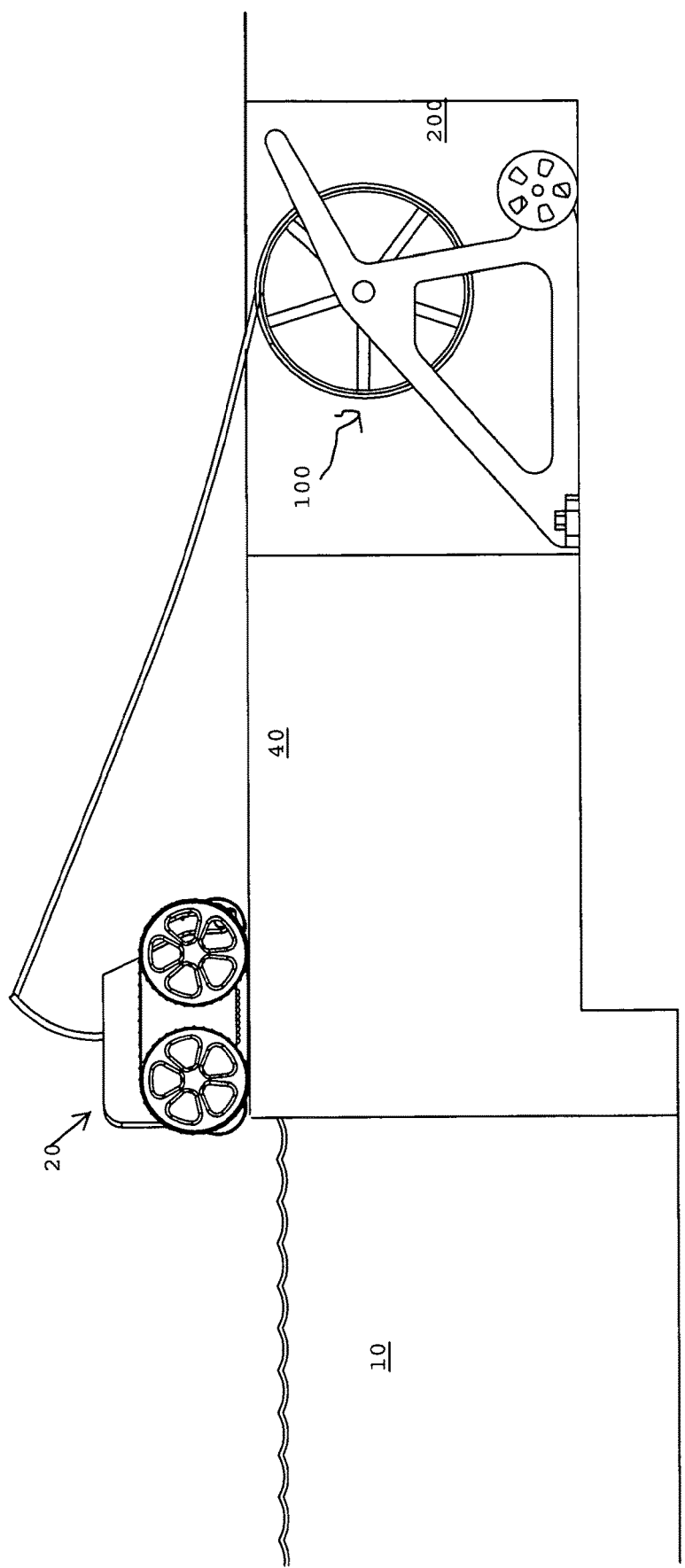
FIG. 34 illustrates a pool cleaning robot that is completely outside the water of the pool but is closer to the edge of the pool than to the docking station according to at least one embodiment of the invention.

FIG. 34 illustrates pool cleaning robot 20 that is completely outside the water 10 of the pool but is closer to the edge 35 of the pool than to the docking station 100 according to at least one embodiment of the invention. Pool cleaning robot 20 propagates by means of its own drive system on external surface 40 and cable 50 may not be fully tensed but may be partially or fully tensed. Docking station 100 is located within space 200.

It should be noted that although FIGS. 30-34 illustrated a docking station 100 that was positioned below the edge of the pool and FIG. 29 illustrated a docking station that was positioned above the edge of the pool—these are merely non-limiting examples of the position of the docking station. The pool exit process may be executed with any docking stations that are positioned at any location or distance from the pool edge.

Covered Docking Station

Figure 35:
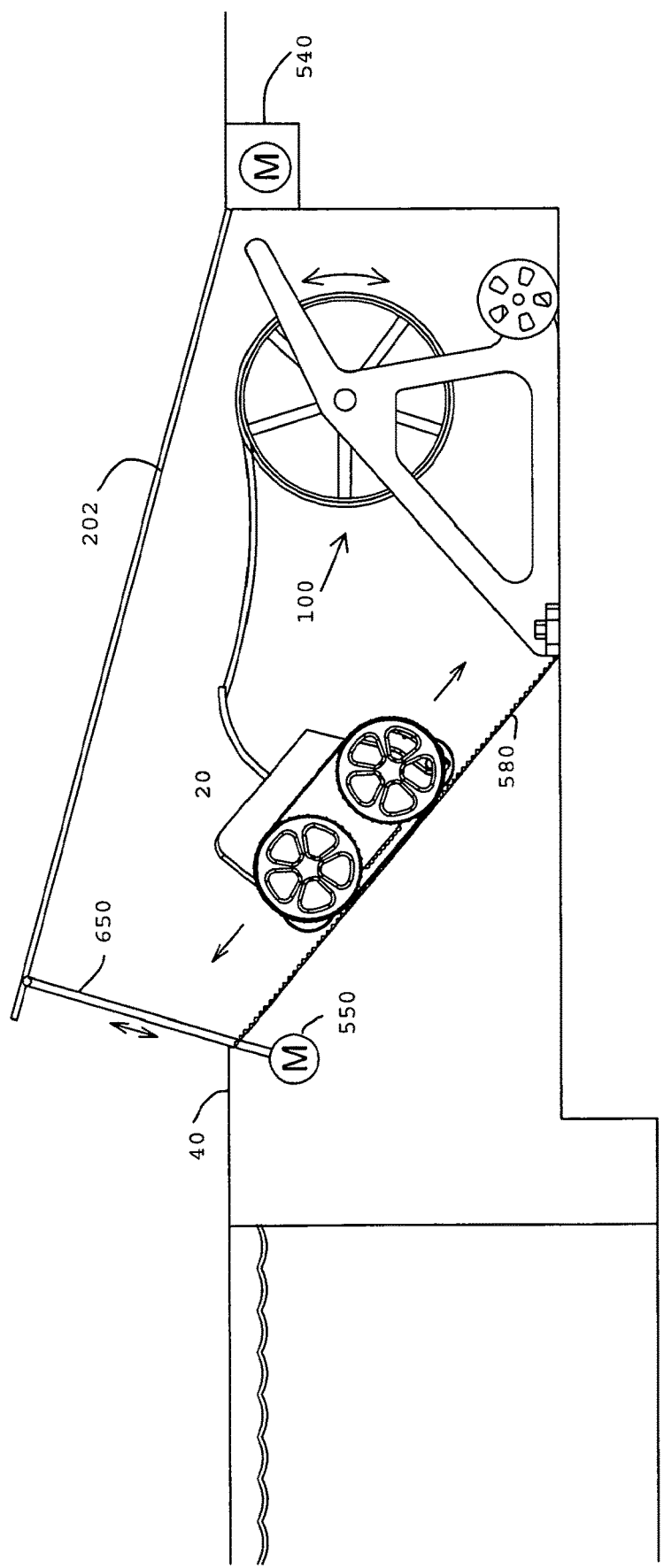
FIG. 35 illustrates a pool cleaning robot and a docking station according to at least one embodiment of the invention.
Figure 36:
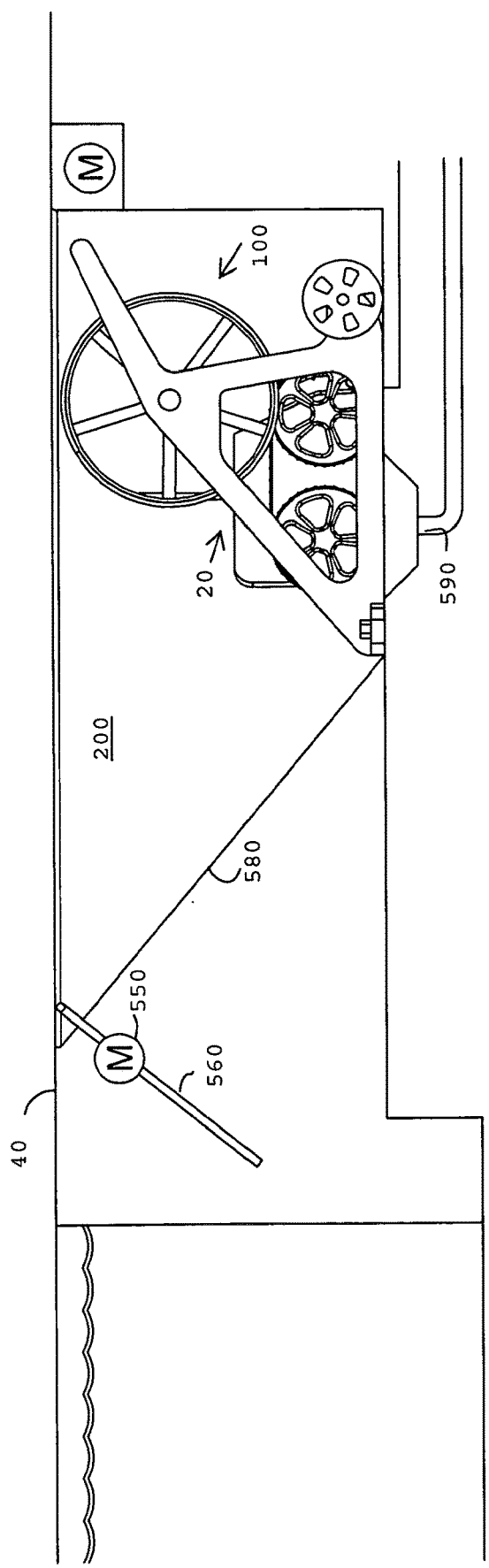
FIG. 36 illustrates a pool cleaning robot and a docking station according to at least one embodiment of the invention.

FIGS. 35 and 36 illustrate pool cleaning robot 20 and docking station 100 according to at least one embodiment of the invention.

In both figures the docking station is a "underground" or "concealed" docking station that is positioned within a space 200 that is covered by cover 202.

In FIG. 35 the cover 202 is in an OPEN position and in FIG. 36 the cover 202 is in a CLOSED position.

The cover 202 may be rotated at one end by first motor 540 and may be elevated at another end by rod 560 that is moved by a second motor 550. In FIG. 35 the first motor 540 performs a rotational movement while second motor 550 performs a linear movement.

The cover 202 is positioned at the OPEN position by a coordinated movements induced by first and/or second motors 540 and 550. It is noted that the cover 202 may be positioned in the OPEN position by a movement of only one of the motors.

The cover 202 may be hinged and moved to the OPEN position by elevating one side (as shown in FIG. 35) or more sides of the cover 202. For example—first motor 540 may be replaced by rod 560 and second motor 550 thereby elevating the entire cover 202.

Any combination of motors and interfacing elements may be used for moving the cover 202 between an OPEN and CLOSED positions.

The cover 202 may be moved between multiple positions as long as one or more positions will allow pool cleaning robot to enter space 200 and one or more other positions will allow cover 202 to at least a partially close space 200. See, for example, FIGS. 40, 41, 42, 43 and 44.

For example—instead of an elevation and a lowering of cover 202—cover 202 may move between the OPEN and CLOSED positions by rotation, by a horizontal movement, by rolling cover onto a reel, and the like.

Cover 202 may be rigid or flexible. When flexible, cover 202 may be supported by structural elements (such as rods or bars). The structural elements may be static or may move from an OPEN position to a CLOSED position. The structural elements may slide in or outside of the sidewalls of space 200.

The cover 202 and/or the combination of cover 202 and the structural elements may withstand a person that steps on cover 202 and/or may run or jump on cover 202.

First and second motors 540 and 550 may be controlled by pool cleaning robot 20 (controller 29 may send control signals), may be controlled by docking station 100 or may be controlled by any other controller (not shown).

The first and second motors 540 and 550 may be controlled based on one or more sensors. These one or more sensors may sense the movement induced by the first and/or second motors.

Additionally or alternatively, the one or more sensors may sense that pool cleaning robot 20 is approaching the cover 202, that the pool cleaning robot 20 entered space 200, that the pool cleaning robot 20 is moving towards an exit of space 200, and the like.

These one or more sensor may be embedded in the external surface 40, in the sidewalls of space 200, in the docking station and the like. These one or more sensors may be image sensor, visual sensors, magnetic sensors, weight sensors, accelerometers, proximity sensor and the like.

FIG. 35 illustrates an inclined interface 580 that has a top edge that interfaces with the top of external surface and a bottom edge that is located at the level of the bottom of the docking station 100. It is noted that the top and bottom edges may be positioned at heights that differ from those illustrated in FIG. 35.

Inclined interface 580 may or may not include a linear or non-linear surface, may or may not be curved, may be smooth (see FIG. 36) or may be non-smooth (see FIG. 35) and/or may or may not include (or be connected to) steps, grooves, protuberances, and the like.

A non-smooth inclined interface may reduce the chance that pool cleaning robot 20 will slip downwards and/or may ease the climbing of pool cleaning robot 20 on the inclined interface 580.

The inclined surface may contact the docking station 100 and/or may be spaced apart from the docking station.

FIG. 29 also illustrates a fluid system 590 that is positioned below the docking station 100. Fluid system 590 may be a drainage system that may drain water that is still in the pool cleaning robot 20 and/or drain water or other fluid after the water or other fluid cleans the pool cleaning robot.

Fluid system 590 (especially when operating as a drainage system) may be preceded by a shredding system (not shown) for shredding debris extracted from pool cleaning robot 20 or from a used filter extracted from pool cleaning robot 20.

It should be noted that fluid system 590 may be used for providing fluid or water to the docking station 100 and/or may be used for cleaning pool cleaning robot 20.

Figure 40A:
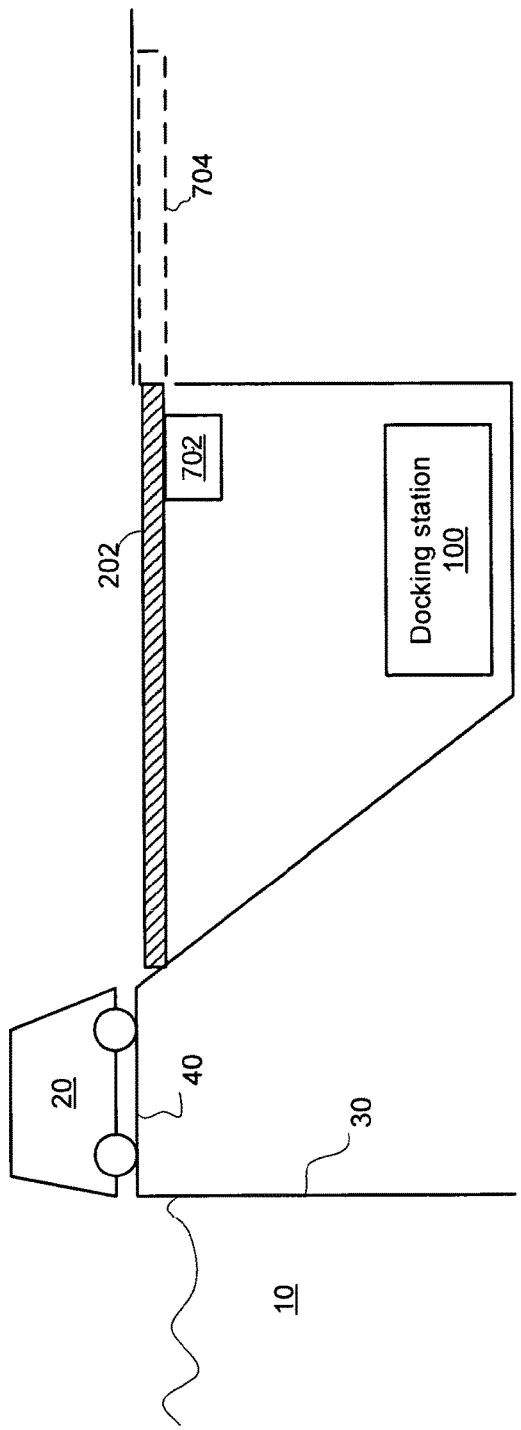
FIGS. 40A and 40B illustrate water of a pool, a sidewall of a pool, an external surface of the pool, space, docking station, pool cleaning robot and cover according to at least one embodiment of the invention.
Figure 40B:
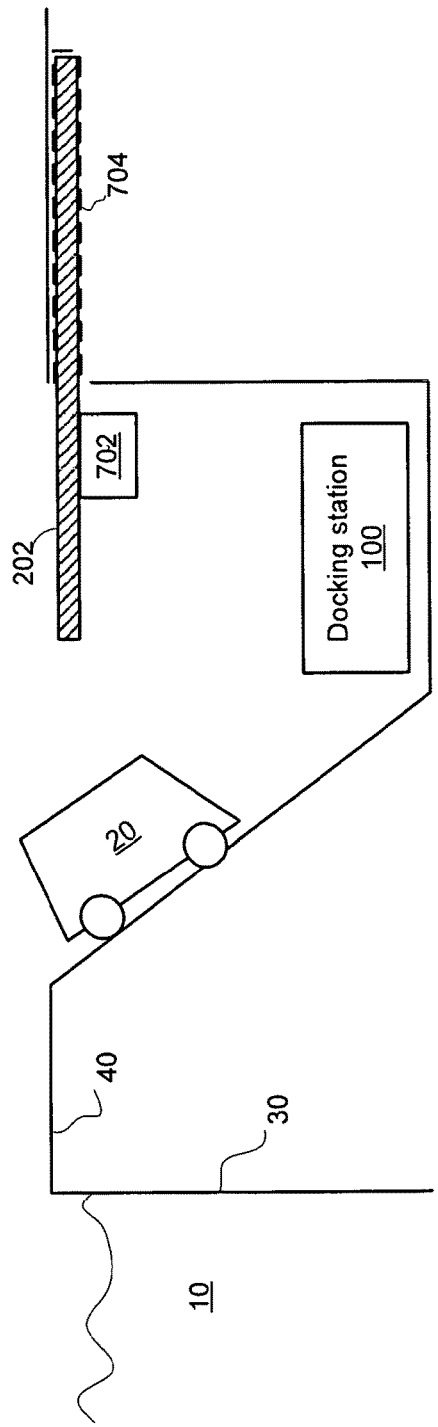

FIGS. 40A and 40B illustrate water 10 of a pool, sidewall 30 of a pool, external surface 400 of the pool, space 200, docking station 100, pool cleaning robot 20 and cover 202 according to at least one embodiment of the invention. Cover 202 is moved by cover motor 702 within and out of opening 704 between an OPEN position (40B) and a CLOSED position (40A). Cover 202 performs a linear movement but any other movement may be provided.

When in OPEN position the pool cleaning robot 20 may enter space 200 and reach docking station 100.

Cover 202 may be moved by more than a single engine.

Rails and/or other support elements may be positioned within space 200 and may support cover 202.

Motor 702 may be located within opening 704. Opening 704 may include rails, and the like.

FIGS. 41A and 41B illustrate water 10 of a pool, sidewall 30 of a pool, external surface 400 of the pool, space 200, docking station 100, pool cleaning robot 20 and cover 202 according to at least one embodiment of the invention. Cover 202 is flexible and can be rolled by rolling unit 710 between an OPEN position (41B) and a CLOSED position (41A). The rolling unit may have a rolling drum.

Rolling unit 710 may include a motor and a rolling mechanism.

The cover 202 may or may not be supported by supporting elements such as rods 714. Rods may be constant or may move within or outside space 200. There may be a single supporting element and/or more than two supporting elements. The supporting elements may be of any shape and/or size.

FIGS. 42A and 42B are top views of space 200 according to various embodiment of the invention.

FIG. 42A shows either fixed rods 714 or rods at their supporting position. FIG. 42B illustrates three rods 714 that are at their supporting position but may be moved to a concealed (or non-supporting) position by motors 716. The motors may move rods 714 within or outside openings 718 formed in the exterior of the pool.

The rods 714 are shown as being normal to the longitudinal axis of space 200—but there may be any spatial relationship between the rods and space.

For example—rods 714 may be vertical and connected to the bottom of space 200.

FIGS. 43A, 43B, 43B and 43D illustrate various covers 202 according to various embodiment of the invention.

Cover 202 may be a mesh or an aperture net (43A).

Cover 202 may include a fixed part 2023 and two movable parts 2021 and 2022 (closed position—FIG. 43B) that may be moved (linear movements—43D, rotational movement—43C or any other combination of movements) that may be moved between different positions thereby closing space 200 or only partially closing space 200.

The cover 202 may include any combination of parts that may be able to move in order to selectively open and close space 200.

FIGS. 44A and 44B illustrate water 10 of a pool, sidewall 30 of a pool, external surface 400 of the pool, space 200, docking station 100, pool cleaning robot 20, cover 202 and an elevator 660 according to various embodiment of the invention.

The elevator 600 includes an elevator shaft 665, an elevator interface 661 for supporting the pool cleaning robot and a movement mechanism (illustrated as including motor 664 and ropes or stick 662) for moving the elevator interface 661 within the elevator shaft 665 between an upper position for receiving the pool cleaning robot 20 from external surface 40 (44A) and a lower position for providing the pool cleaning robot to the docking station 100 (44B)—and vice versa.

Interfacing Element

Figure 37:
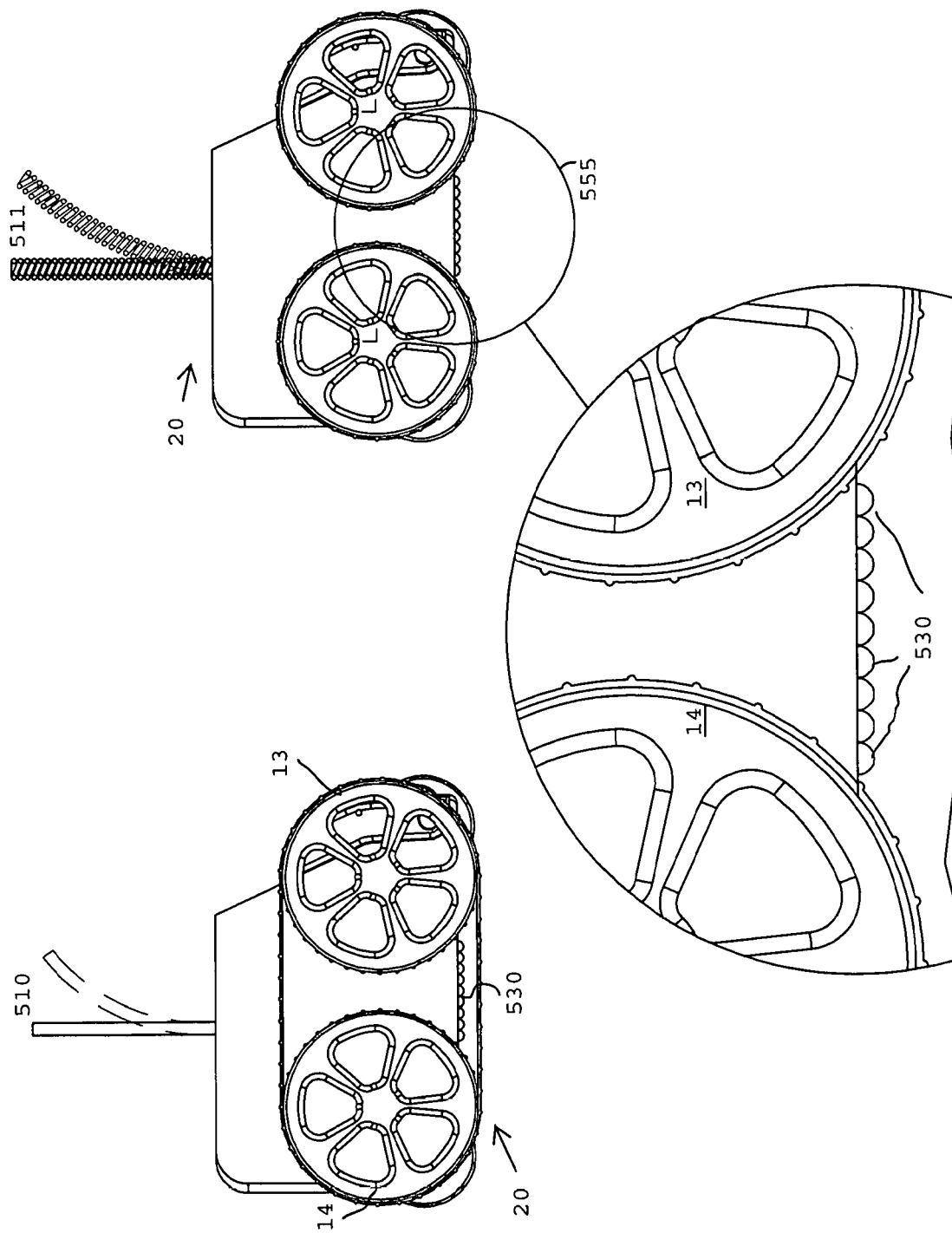
FIG. 37 illustrates a pool cleaning robot according to at least one embodiment of the invention.

FIG. 37 illustrates a pool cleaning robot 20 according to at least one embodiment of the invention.

FIG. 37 illustrates a pool cleaning robot 20 that include a third interfacing element such as anchors 510 and 511. Anchor 511 is a spring or may include a spring that can be attached to the pool cleaning robot 20 and to cable 50. Anchor 510 may be elastic or plastic and FIG. 37 illustrates an elastic anchor. FIG. 37 illustrates rod-shaped anchors but anchors 510 and 511 may have any shape including that of a partly-round or square handle (not shown) that may be constructed of elastic or plastic stiff/semi-rigid material or of a spring mechanism or a combination of both an elastic and a spring that are bendable whereby all anchor embodiments are constructed using shape-memory material technologies.

Anchors 510 and 511 may be moved between different positions and their top end may move within any angular range in relation to the bottom end of the anchor. FIG. 37 illustrates an angular range of about 30 degrees (between vertical position to 60 degrees)—but any angular edge may be provided.

Anchors 510 may include a single joint or part or may include multiple parts. For example—anchor 510 may include multiple joints that may be move in relation to each other. The anchor may be a telescopic rod.

The cable 50 may be attached to or may be threaded through anchor 510 by any mean—by a ring, by a fastening element, the cable may pass through one or more apertures of anchor, and the like.

FIG. 37 also illustrates pool cleaning robot 20 as including wheels 13 and 14—although any interfacing element may be used with or without tracks that can be observed in FIG. 37.

FIG. 37 further shows third interfacing elements such as set of rolling rods 530 that cover a central area of the bottom of the pool cleaning robot 20. The rods may be static or may rotate about their axis. FIG. 37 illustrates nine rods although any number of rods may be provided. The rods may differ from each other or may be equal to each other. The rods may be small enough such as not to contact external surface 40 when pool cleaning robot 20 moves along the external surface 40.

Cleaning the Pool Cleaning Robot Filter

Figure 38:
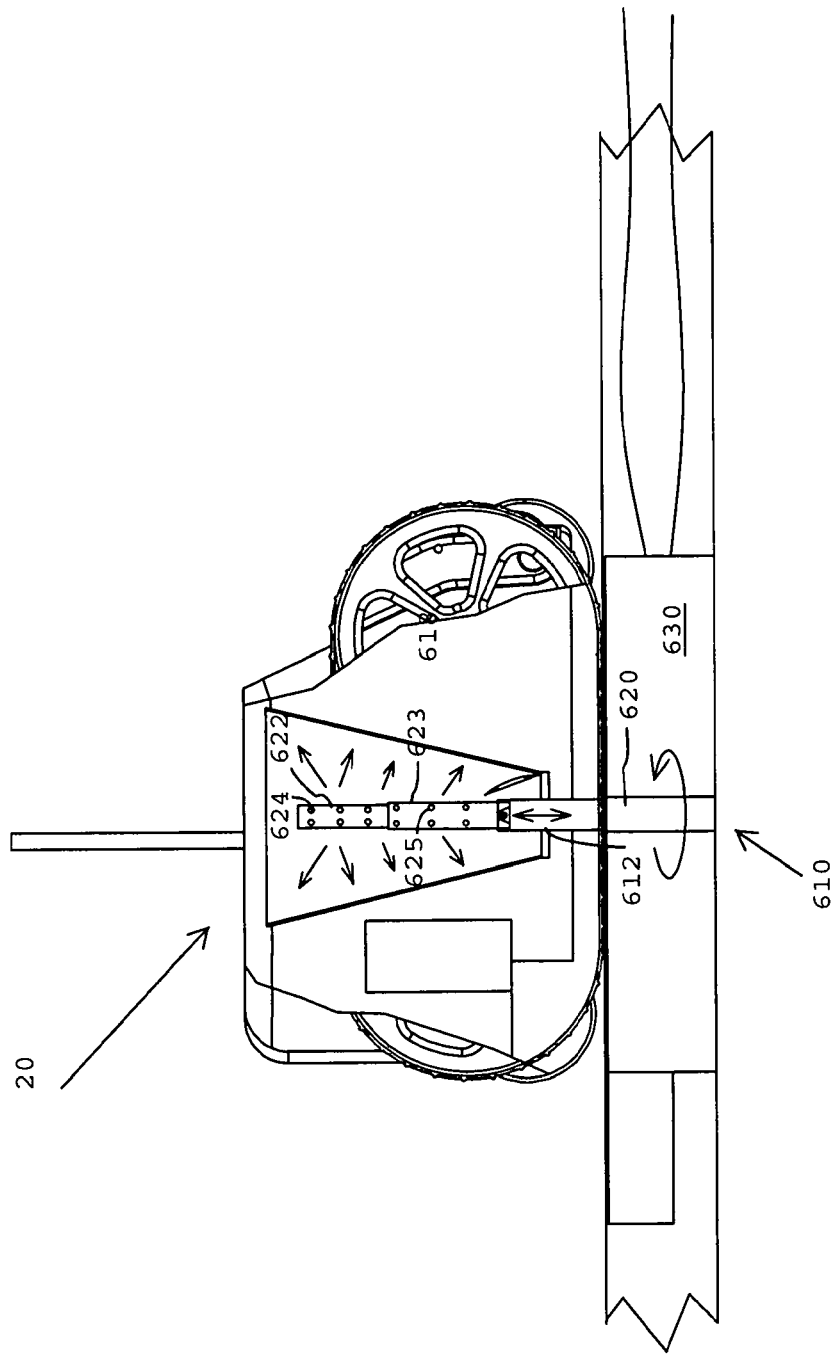
FIG. 38 illustrates a pool cleaning robot and a cleaning unit of the docking station according to at least one embodiment of the invention.

FIG. 38 illustrates a pool cleaning robot 20 and a filter cleaning unit 610 of the docking station according to at least one embodiment of the invention.

Pool cleaning robot 20 is illustrated as including filtering unit 618 and opening 612. During a filter cleaning process, a part of a cleaning unit 610 (such as a pop-up sprinkler 620) may enter through the opening 612 into the filtering unit 618.

The pop-up sprinkler 620 may have a cross section that is smaller than the opening 612 thereby the pop-up sprinkler may, even when passing through the opening 612, may not seal the opening 612 and may leave a space for fluid and/or debris to exit the pool cleaning robot through the opening 612 during the cleaning process. The cross section of the pop-up sprinkler and/or the opening may have any shape and/or size. The cross section of the pop-up sprinkler may have the same shape or may differ from each other by shape.

The pop-up sprinkler 620 may include a valve 613. The valve 613 may be a ball valve that creates intermittent water jet spray thrusts to improve and create powerful streams of internal nozzle spraying to remove stubborn dirt or debris attached. Multiple nozzles or openings may be employed with varying nozzle diameter apertures along the pop up sprinkler rod. This is especially important in initial cleaning cycles when season starts and the dirt from the previous bathing season clings hard onto the filter surfaces.

The additional liquid container containing cleaning fluid such as, for example an anti-calc substance may be used to mix this said liquid with the spraying water (see rectangular box on the left of "612")

Electrical and water inlets see on the right "630".

The pop-up sprinkler 620 may be rotated about an axis or not.

The pop-up sprinkler 620 may be made of a rigid material or of a softer material such as soft rubber that will inflate into the interior space of the filter or as stated above, expand/contract telescopically. The process will be preferably mechanical but may be subject to an electrical/electronic control.

It is noted that the pop-up sprinkler 620 is merely a non-limiting example of a cleaning element. Other cleaning elements may include, for example, elastic and/or non-elastic cleaning elements, cleaning elements that include a hollow tube or a hollow bag with a fluid inlet and a fluid outlet, pop-up cleaning elements that are not rods, telescopic cleaning elements, cleaning elements that do not pop-up, and the like.

The operation of the pop-up sprinkler is as follows: as the filter becomes clogged during normal cycle time in-pool operation while the pool cleaning robot is submerged, the pool cleaner records the level of clogging and will classify it to anything between severely clogged to containing some minor dirt. This will be communicated to the controller of the docking station to determine a cleaning process that may fit the state of the filtering unit. The sensing of the state of the filtering unit may be sensed by monitoring the power consumed by the pump motor (cleaner filtering unit results in lower power consumption), the rotational speed of the impeller (a cleaner filtering unit results in faster revolutions of the impeller), by a pressure sensor (a cleaner filtering unit results in lower pressure levels within the pool cleaning robot), inspecting the filtering unit with a sensor, and the like. The said sensing may be performed externally to the pool while, for example, in the docking station by means of an image sensor for imaging the filtering unit.

It should be noted the pool cleaning robot 20 may communicate (directly or indirectly) with any one of the docking stations 100 that have any cleaning element (even those that do not includes pop-up sprinkler 620) so that the docking station 100 will determine (select and/or calculate) a cleaning process and then apply a cleaning process that is fitted to state of the pool cleaning robot 20—especially to the cleanliness of the filtering unit.

The determining of the cleaning process may be performed by another device (such as external controller or any computerized system) and/or by the pool cleaning robot 20 itself.

The determining of the cleaning process may include determining one or more cleaning parameters such as a duration of the cleaning process, durations of different phases in the cleaning process (for example duration of fluid pulses), the composition of a cleaning fluid (more or less anti-calc materials, more or less PH, and the like), which cleaning elements to use (for example using a brush or not, the number of cleaning elements to be used, and the like.

Figure 45:
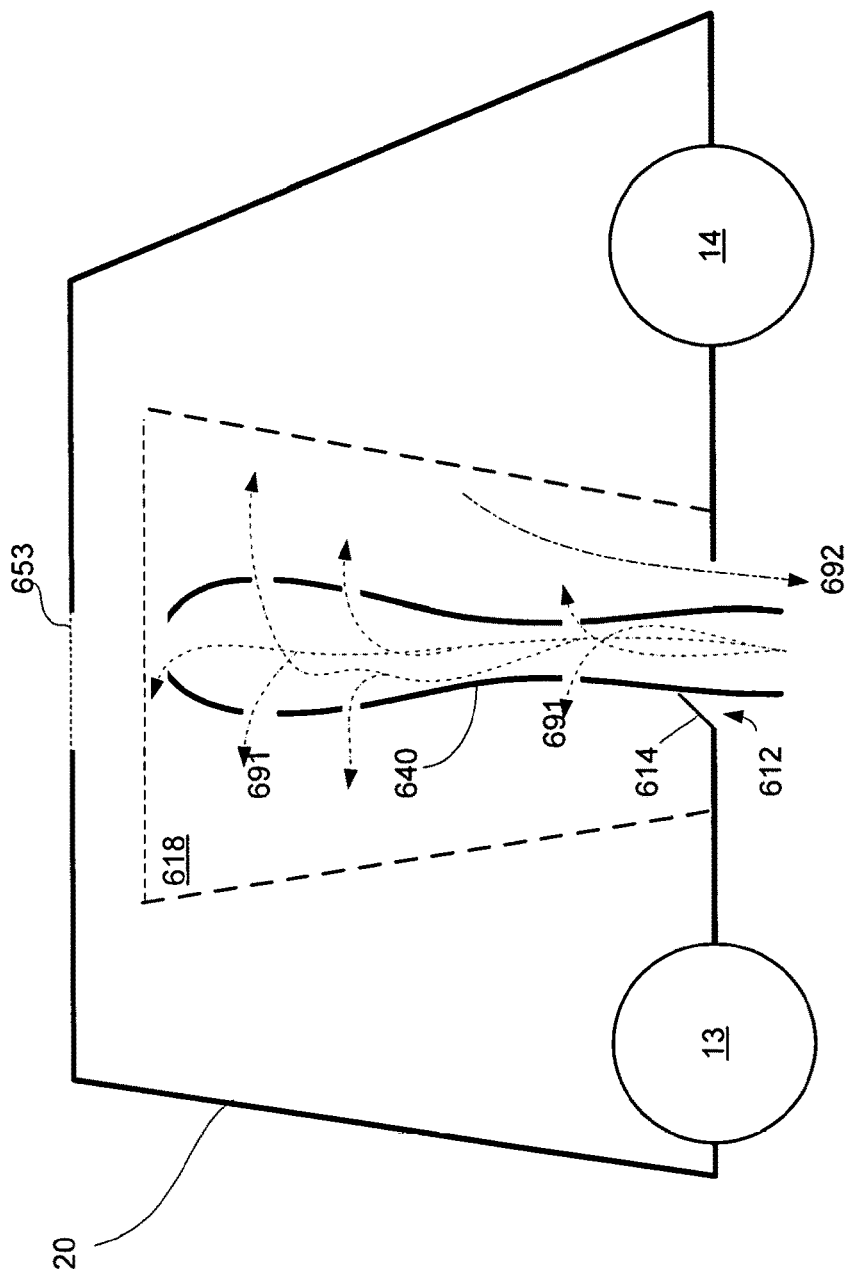
FIG. 45 illustrates a pool cleaning robot and a cleaning element according to at least one embodiment of the invention.

FIG. 45 illustrates pool cleaning robot 20 and a cleaning element such as an apertured bag 640 according to at least one embodiment of the invention.

The flow of water 691 and/or cleaning fluid through the aperture bag 640 may erect the aperture bag and cause jets of the water and/or cleaning fluid 691 to exit the aperture bag through apertures and clean the interior of filtering unit 618.

Multiple nozzles or openings may be employed with varying nozzle or apertures diameters along the apertured bag.

Debris and/or used water and/or cleaning fluid may exit the pool cleaning robot via opening 612 (see arrow 692).

FIG. 45 also shows wheels 13 and 14 of the pool cleaning robot and a valve 614 of the pool cleaning robot that is at an open position.

FIG. 46A illustrates pool cleaning robot 20, a cleaning element such as an aperture bag 640 and an additional cleaning element such as brush 650 according to at least one embodiment of the invention.

The brush 650 can assist the cleaning of the filtering unit 618 by contacting the filtering unit 618 or by being positioned at the proximity to the filtering unit 618 thereby contacting (and thus removing) debris stuck in the filtering unit 618. The brush 650 may be elevated and/or rotated by manipulator 652.

Debris and/or used water and/or cleaning fluid may exit the pool cleaning robot via opening 612 (see arrow 692).

FIG. 46A also shows wheels 13 and 14 of the pool cleaning robot and a valve 614 of the pool cleaning robot that is at an open position.

FIG. 46B illustrates a pool cleaning robot 20, a cleaning element 610 and sensor 657 according to at least one embodiment of the invention;

The sensor 657 does not belong to the pool cleaning robot and may belong to the docking station 100. The sensor 657 may sense the cleanliness of the filtering unit (for example by imaging parts of the filtering unit) and send information to a controller (such as controller 102) for determining parameters of the cleaning process. Sensor 657 may be moved within the filtering unit by manipulator 658.

Where more than one filtering unit is in place in a pool cleaner, for example, a second filter (not shown) with a second opening inlet, there could be provided a second or more cleaning unit 610 (not shown) such as a pop-up sprinkler 620 or aperture bags 640

It has been found that forcing the water to exit the pool cleaning robot during an exit process from the pool may speed up the exit process and may reduce a load imposed, during the exit process, on the pool cleaning robot and/or a docking station that may participate in the exit process.

Additionally or alternatively, the load may be reduced by allowing the pool cleaning robot to depart from the sidewall of the pool. Instead of trying to rotate the pool cleaning robot from a vertical position (when climbing a vertical sidewall of the pool) the pool cleaning robot is allowed to depart from the sidewall of the pool and start the exit process while being non-vertical. This reduces the force that is required to apply when the pool cleaning robot exits the pool.

When the pool cleaning robot cleans the pool an impeller of the pool cleaning robot is rotated at a first direction thereby causing the water to enter through a first opening, (optionally pass through a unidirectional valve), pass through the filtering unit (to be cleaned) and then exit through a second opening.

The pool cleaning robot may force the water (inside the pool cleaning robot) to exit the pool cleaning robot by reversing the direction of rotation of the impeller. Accordingly, the impeller will be rotated at a second direction (opposite or counter to the first direction).

Rotating the impeller at the second direction may cause the water within the pool cleaning robot to exit through the first opening—in case where the water can exit from the first opening. For example—when there is no unidirectional valve that prevents the passage of the water from the filtering unit to the first opening.

Rotating the impeller at the first direction may cause the water to exit through one or more other openings such as a third opening and/or a fourth opening and the like.

The water may exit the pool cleaning robot as a water jet or in any other manner.

FIGS. 29 and 30 illustrate jets of water 501 that exit from the pool cleaning robot from one or more openings (not shown). A non-limiting example of openings through which jets of water may exit are illustrated in US patent application serial number 2014/0230168 which is incorporated herein by reference in its entirety.

FIGS. 32 and 33 illustrate a rear door 27 that once opened allows the water to exit the pool cleaning robot through the rear door.

The openings may be formed in any part of the pool cleaning robot, may be of any shape and/or size. Especially, an opening through which water may exit may be positioned at the bottom of the housing, at the top of the housing and/or at any sidewall of the housing.

Any opening through which the water may exit may be continuously opened, may be opened only under certain circumstances (for example opened when the pool cleaning robot is at least partially outside the water, when the pool cleaning robot is at certain angle in relation to the horizon, and the like), may be closed while the pool cleaning robot is submerged and cleans the pool, and the like.

Each opening may be covered by a cover and/or seal and/or a door for closing the opening.

FIG. 50 illustrates method 5000 that may include step 5010 of moving the pool cleaning robot at a path that leads outside the pool, and step 5020 of forcing, during at least a part of the moving of the pool cleaning robot, water to exit the pool cleaning robot by rotating an impeller of the pool cleaning robot.

Step 5010 may include climbing, by the pool cleaning robot, on a sidewall of a pool while rotating the impeller at a first direction; wherein the climbing is followed by stopping, by the pool cleaning robot, the climbing on the sidewall of the pool and disengaging from the sidewall of the pool.

In the foregoing specification, the invention has been described with reference to specific examples of at least one embodiment of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the at least one embodiment of the invention described herein are, for example, capable of operation in other orientations than those illustrated or otherwise described herein.

Those skilled in the art will recognize that the boundaries between logic blocks are merely illustrative and that alternative at least one embodiment may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative at least one embodiment may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one as or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements the mere fact that certain measures are recited in mutually different claims does not indicate that a combination of these measures cannot be used to advantage.

Any system, apparatus or device referred to this patent application includes at least one hardware component.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A pool cleaning robot, comprising:
   a filtering unit for filtering water that passes through the pool cleaning robot; and
   a sensor for sensing a cleanliness of the filtering unit while the pool cleaning robot is submerged in water; wherein the sensor is a pressure sensor for sensing a pressure of fluid within the pool cleaning robot or an image sensor for imaging the filtering unit.

2. The pool cleaning robot according to claim 1 wherein the sensor is the pressure sensor.

3. The pool cleaning robot according to claim 2 wherein the sensing of the cleanliness is based on a mapping between pressure levels to cleanliness.

4. The pool cleaning robot according to claim 1 comprising a communication unit that is adapted to transmit information about the cleanliness of the filtering unit.

5. The pool cleaning robot according to claim 1 comprising a housing that has an inlet and an outlet; wherein the filtering unit is positioned the inlet and the outlet.

6. The pool cleaning robot according to claim 1 that is configured to determine and record a level of clogging of the filtering unit.

7. The pool cleaning robot according to claim 1 that is configured to classify a clogging of the filtering unit to a class out of multiple classes that range between severely clogged to containing some minor dirt.

8. The pool cleaning robot according to claim 1 comprising a drive system, an impeller and a pump motor.

9. The pool cleaning robot according to claim 1 wherein the sensor is the image sensor.

10. A method comprising:
filtering, by a filtering unit of a pool cleaning robot, water that passes through the pool cleaning robot; and
sensing, by a sensor, a cleanliness of the filtering unit while the pool cleaning robot is submerged in water;
wherein the sensor is a pressure sensor for sensing a pressure of fluid within the pool cleaning robot or an image sensor for imaging the filtering unit.

11. The method according to claim 10 wherein the sensor is the pressure sensor.

12. The method according to claim 11 wherein the sensing of the cleanliness is based on a mapping between pressure levels to cleanliness.

13. The method according to claim 10 comprising transmitting, by a communication unit of the pool cleaning robot, information about the cleanliness of the filtering unit.

14. The method according to claim 10 wherein the filtering comprises filtering water that was received via an inlet of an housing of the pool cleaning robot and outputting filtered fluid via an outlet of the housing.

15. The method according to claim 10 comprising determining, by the pool cleaning robot, and recording a level of clogging of the filtering unit.

16. The method according to claim 10 comprising classifying, by the pool cleaning robot, a clogging of the filtering unit to a class out of multiple classes that range between severely clogged to containing some minor dirt.

17. The method according to claim 10 wherein the pool cleaning robot comprises a drive system, an impeller and a pump motor.

18. The method according to claim 10 wherein the sensor is the image sensor.

19. The method according to claim 10 wherein the sensor belongs to the pool cleaning robot.

20. The method according to claim 10 wherein the sensor does not belong to the pool cleaning robot.

* * * * *